US007752705B2

(12) United States Patent
McDowell et al.

(10) Patent No.: US 7,752,705 B2
(45) Date of Patent: Jul. 13, 2010

(54) EXTRACTION CLEANING WITH HEATING

(75) Inventors: David E. McDowell, Grand Rapids, MI (US); Eric C. Huffman, Lowell, MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 1683 days.

(21) Appl. No.: 10/710,776

(22) Filed: Aug. 2, 2004

(65) Prior Publication Data
US 2005/0022333 A1 Feb. 3, 2005

Related U.S. Application Data

(63) Continuation-in-part of application No. 09/911,228, filed on Jul. 23, 2001, now Pat. No. 6,898,820, which is a continuation of application No. 09/589,973, filed on Jun. 8, 2000, which is a continuation-in-part of application No. 09/133,832, filed on Aug. 13, 1998, now Pat. No. 6,131,237, which is a continuation-in-part of application No. 09/112,527, filed on Jul. 8, 1998, now Pat. No. 6,167,587.

(60) Provisional application No. 60/055,510, filed on Aug. 13, 1997.

(51) Int. Cl.
*A47L 11/30* (2006.01)
(52) U.S. Cl. .............................. 15/320; 15/321; 15/322
(58) Field of Classification Search ................ 15/320, 15/321, 322, 355, 556
See application file for complete search history.

(56) References Cited

U.S. PATENT DOCUMENTS

| 4,397,057 | A | * | 8/1983 | Harbeck | 15/321 |
|---|---|---|---|---|---|
| 6,131,237 | A | * | 10/2000 | Kasper et al. | 15/320 |
| 6,167,587 | B1 | * | 1/2001 | Kasper et al. | 15/320 |
| 6,571,421 | B1 | * | 6/2003 | Sham et al. | 15/320 |
| 6,898,820 | B2 | * | 5/2005 | Kasper et al. | 15/320 |
| 7,380,307 | B2 | * | 6/2008 | Tsai | 15/320 |
| 2001/0039684 | A1 | * | 11/2001 | Kasper et al. | 8/147 |
| 2003/0075203 | A1 | | 4/2003 | Hansen et al. | |
| 2003/0097727 | A1 | * | 5/2003 | Keller | 15/345 |
| 2003/0233727 | A1 | | 12/2003 | Wheeler et al. | |
| 2005/0022333 | A1 | * | 2/2005 | McDowell et al. | 15/320 |

FOREIGN PATENT DOCUMENTS

| GB | 2285590 A | 7/1995 |
|---|---|---|
| WO | WO9848685 | 11/1998 |
| WO | WO0121054 A1 | 3/2001 |

* cited by examiner

*Primary Examiner*—Lee D Wilson
(74) *Attorney, Agent, or Firm*—McGarry Bair PC

(57) ABSTRACT

A portable extraction surface cleaner apparatus wherein a surface to be cleaned is heated to an elevated temperature and a cleaning fluid is applied to the surface to be cleaned sequentially or simultaneously. The cleaning fluid is removed from the surface by suction from a vacuum source. Power is applied alternatively or simultaneously to a heating element and to the vacuum source for recovering the deposited cleaning fluid.

38 Claims, 27 Drawing Sheets

EXTRACTION CLEANING WITH HEATING

CROSS REFERENCE TO RELATED APPLICATIONS

This application is a continuation-in-part of pending application Ser. No. 09/911,228, filed Jul. 23, 2001, now U.S. Pat. No. 6,898,820, issued May 31, 2005, which is a continuation of application Ser. No. 09/589,973, filed Jun. 8, 2000, which is a continuation in part of application Ser. No. 09/133,832, filed Aug. 13, 1998, now U.S. Pat. No. 6,131,237, which is a continuation in part of application Ser. No. 09/112,527, filed Jul. 8, 1998, entitled UPRIGHT EXTRACTION CLEANING MACHINE, now U.S. Pat. No. 6,167,587, and claims the benefit of U.S. Provisional Application Ser. No. 60/055,510, filed on Aug. 13, 1997, all of which are incorporated herein by reference in their entirety.

FIELD OF THE INVENTION

This invention relates to an extraction cleaning. In one of its aspects, the invention relates to an extraction cleaning machine having a solution heater for dispensing heated cleaning fluid to a surface to be cleaned. In another of its aspects, the invention relates to an extraction cleaning machine having a heated vapor generator for applying a heated vapor to a surface to be cleaned. In yet another of its aspects, the invention relates to an extraction cleaning machine having a heater for heating a water or cleaning fluid to an elevated temperature to an elevated temperature for dispensing a heated vapor to a surface to be cleaned. In still another of its aspects, the invention relates to an extraction cleaning machine having a solution heater and a vacuum source that are controlled for maximum heating efficiency.

DESCRIPTION OF THE RELATED ART

Upright extraction cleaning machines have been used for removing dirt from surfaces such as carpeting, upholstery, drapes and the like. The known extraction cleaning machines can be in the form of a canister-type unit as disclosed in U.S. Pat. No. 5,237,720 to Blase et al. or an upright unit as disclosed in U.S. Pat. No. 5,500,977 to McAllise et al. and U.S. Pat. No. 4,559,665 to Fitzwater.

The state of the art for water extraction cleaning machines utilizes one of two different technologies. First, water is mixed with a cleaning detergent and the resulting solution is sprayed onto the surface to be cleaned. The detergent includes chemical agents adapted to enhance the cleaning performance and dirt attraction of the cleaning solution. The vacuum motor is used to create a source of suction for withdrawing the cleaning solution and entrapped dirt back into the cleaning machine.

A more recent development in the water extraction cleaning industry is the use of steam as the cleaning agent. The cleaning machine incorporates a boiler or other means for generating steam. The steam is pumped to an applicator where it is brought into contact with the surface being cleaned. The steam systems have the advantage of creating a temperature which effectively kills a wide range of microbes, bacteria, microorganisms, and mites. However, the steam systems suffer from poor cleaning performance. Additionally, the high power requirement for generating steam does not allow ample remaining power for running a vacuum motor, so cleaning performance is further hindered. Conversely, conventional detergent cleaning systems are somewhat effective at cleaning surfaces, but could be made more effective by raising the temperature of the cleaning solution to some point below the boiling point. There is an optimal temperature at which cleaning performance is maximized without causing damage to carpets or setting stains. This temperature is around 150 degrees Fahrenheit.

The Chae et al. U.S. Pat. No. 5,502,872 discloses an electric vacuum cleaner having a steam discharge and cloth wiper. A water tank mounted on the handle dispenses water into an aspirator which atomizes the water into a stream of pressurized air from an impeller exhaust and then heats the atomized water to steam before discharging the steam/air mixture onto a surface to be cleaned.

The Jones et al. U.S. Pat. No. 4,114,229 discloses a surface cleaning apparatus in which a cleaning fluid is heated in a conduit in a control casing and then sprayed onto a surface to be cleaned. A suction nozzle in a base unit removes dirty water from the surface.

The Parise et al. U.S. Pat. No. 4,046,989, and Putt, U.S. Pat. No. 3,699,607, disclose floor-cleaning equipment in which a cleaning fluid is heated before it is sprayed onto a surface to be cleaned. Both systems appear to heat the cleaning fluid in a tank.

When heated cleaning fluid is applied to a surface that is at ambient temperature, the cleaning fluid is cooled by the carpet, thus decreasing the cleanability of the applied fluids. Heating the cleaning fluid to a higher temperature to compensate fir the surface cooling may overcome this problem, but with an increase in energy required for the operation.

Sometimes, one encounters spots on a carpet or other surface to be cleaned that have a stain or other difficult area to clean while conduction an ordinary cleaning process. Typically, the user must repeat the extraction process in a particular spot with limited success.

DE 195 22 893, published 8 Feb. 1996 discloses a canister extraction cleaning machine in which a cleaning solution can be heated in a high speed in line heater to a temperature below boiling or above boiling for application to a floor with a wand. This publication further discloses in another embodiment a canister extraction cleaning machine that has a solution supply for application of unheated solution onto a surface to be cleaned through a wand and further has a separate tank with a heater for heating water to steam. The separate tank is connected to the wand to deliver steam to the wand with or without cleaning solution.

SUMMARY OF THE INVENTION

According to the invention a unitary portable surface cleaning apparatus comprises a fluid dispensing system including at least one fluid supply tank and a fluid dispenser connected to the fluid supply tank for applying a cleaning fluid to a surface to be cleaned, a fluid recovery tank for holding recovered fluid, a suction nozzle, a working air conduit extending between the recovery tank and the suction nozzle and a vacuum source in fluid communication with the recovery tank and the suction nozzle for generating a flow of working air from the suction nozzle through the working air conduit and into the recovery tank to thereby recover fluid from the surface to be cleaned. A surface heater for applying heat to the surface to be cleaned.

The surface heater can be any type of surface heater, including radiant heat from, for example, one or more electrical radiant heating tubes, a vapor heater, for example, for heating air or for vaporizing liquid, such as water, or even the cleaning solution, or conceivably could be a heated liquid, which may or may not be the cleaning solution.

The surface heater should have the ability to raise the temperature of the surface to be cleaned well above room temperature, for example, in the range of 95-200° F., preferably, in the range of 100-130° F.

The cleaning fluid is preferably heated prior to the application of the cleaning fluid to the surface to be cleaned. The addition of heat to the surface facilitates cleaning of the surface because the heated cleaning fluid need not sacrifice any heat to the cooler surface to be cleaned during the cleaning process.

In one embodiment, the surface heater is connected to a source of fluid and has a second fluid dispenser for heating the fluid to a temperature above ambient temperatures and for applying the heated fluid to the surface to be cleaned. The fluid that is heated by the surface heater can be a liquid, such as water or an aqueous solution or can be a gas, such as air.

Further, the surface heater can include a vapor generator that is associated with a source of liquid and that is capable of vaporizing the liquid to form a heated vapor, and the surface heater can further include a vapor dispenser for application of a heated vapor to the surface to be cleaned. As used herein, the term "heated vapor" includes a vapor that is well above room temperature, for example above 120° F., preferably above 150° F., and can also include steam, or an aqueous gas at 212° F. or higher. The heated vapor typically is steam but other vaporized liquids, aqueous or organic, can be used. For example, vaporous dry cleaning fluids can be used in the invention as heated vapor.

In one embodiment, the surface heater is associated with the fluid dispensing system and is adapted to heat at least a portion of the cleaning fluid above its boiling point to form a heated vapor in the vapor generator.

The fluid dispensing system preferably includes a control element associated with the vapor generator for selectively controlling the delivery of cleaning vapor to the surface to be cleaned. In a preferred embodiment, the control element includes a valve having an inlet connected to the at least one fluid supply tank and a pair of outlets, one of the outlets is connected to the vapor generator and the other of the outlets is connected to the liquid dispenser, the valve is adapted to selectively control the flow of cleaning fluid from the at least one fluid supply tank to the vapor generator and to the liquid dispenser.

Further, the portable surface cleaning apparatus includes a canister and the at least one fluid supply tank, the recovery tank and the vacuum source are mounted in the canister. Further, a wand is connected to the vacuum source though a hose that forms a portion of the working air conduit. In one embodiment, the valve is mounted on the wand. The wand has a handle and the valve is mounted on the handle in another embodiment. In yet another embodiment, the control element further includes a control knob that is mounted to the handle and is connected to the valve.

In a further embodiment, a fluid control valve selectively controls the flow of cleaning fluid to the valve inlet. A trigger is pivotally mounted on the handle and is connected to the fluid control valve for selective operation thereof. Preferably, the valve is mounted to a lower portion of the wand. In another embodiment, a control knob is mounted to a lower portion of the wand and is connected to the valve for control thereof.

In a preferred embodiment, the vapor generator includes an electrical heating element. In addition, the electrical heating element and the vacuum source can be connected to a common electrical input and can be adapted to be powered by a common power source. The power source is preferably a standard 120 volt line. Further, a switch can be mounted between the power source, the vacuum source and the heater for alternating power to the heating element and to the vacuum source.

In yet another embodiment, the portable surface cleaning apparatus further comprises a base that is adapted to move across a surface to be cleaned and a handle pivotally mounted to the base for manipulating the base across the surface to be cleaned, and wherein the fluid dispensing system, the recovery tank, the fluid dispenser, the suction nozzle, the vacuum source and the vapor generator are individually mounted to one of the handle and the base.

In one embodiment, the valve, the liquid dispenser and the vapor dispenser are all mounted on the base. Further, a pump is provided between the at least one fluid supply tank and the valve inlet.

In another embodiment, the heater is associated with the at least one fluid supply tank and the vapor generator is formed in the at least one fluid supply tank, whereby the vapor generated in the at least one fluid supply tank forms a vapor pump for dispensing heated liquid from the fluid supply tank to the liquid dispenser.

In a preferred embodiment, the vapor is aqueous, including steam and a vaporized aqueous cleaning fluid.

In yet another embodiment, the portable surface cleaning apparatus further comprising a base that is adapted to move across a surface to be cleaned and a handle pivotally mounted to the base for manipulating the base across the surface to be cleaned, and wherein the fluid dispensing system, the recovery tank, the fluid dispenser, the suction nozzle and the vacuum source and the heater are mounted to one of the handle and the base; and wherein an above floor hose is attached at one end to the base, a wand is mounted to another end of the hose, and the vapor generator and the heating element are mounted to the wand for pre-treating the surface to be cleaned with the cleaning vapor.

In a preferred embodiment, a switch is mounted between the power source, the vacuum source and the heater for alternating power to the heating element and to the vacuum source. In this embodiment, a valve has an inlet connected to the at least one fluid supply tank, has a first outlet connected to the vapor generator and a second outlet connected to the liquid dispenser, whereby the valve can selectively direct cleaning fluid to the vapor generator, to the liquid dispenser, or to a combination thereof for application to the surface to be cleaned.

In yet another embodiment of the invention, a vapor conduit is provided between the vapor generator and the vapor dispenser, and the fluid dispensing system includes a fluid conduit between the at least one fluid supply tank and the fluid dispenser, and the fluid conduit passes through the vapor conduit in heat exchange therewith for heating the cleaning fluid in the fluid conduit.

Still further according to the invention, a unitary portable surface cleaning apparatus comprises a fluid dispensing system including at least one fluid supply tank, a liquid dispensing nozzle connected to the fluid supply tank through a fluid supply conduit for applying a cleaning fluid to a surface to be cleaned at a predetermined rate, a fluid recovery tank for holding recovered fluid, a suction nozzle, a working air conduit extending between the recovery tank and the suction nozzle, a vacuum source in fluid communication with the recovery tank and the suction nozzle for generating a flow of working air from the suction nozzle through the working air conduit and to the recovery tank to thereby recover fluid from the surface to be cleaned through the suction nozzle and working air conduit and into the recovery tank, a heating element associated with the fluid dispensing system for heating at least a portion of the cleaning fluid before it is applied to the surface to be cleaned, and a power source, preferably a standard 120 volt source, is connected to the heating element and the vacuum source. A movably mounted agitator is adapted to agitate the surface to be cleaned and is driven by an agitator motor in driving relationship to the agitator. According to the invention, a controller is positioned between the power source, the vacuum source, the agitator motor and the heater and is adapted to individually control power to the heating element, the agitator motor and to the vacuum source.

In yet another embodiment of the invention, at least one heater is adapted to heat a first portion of the cleaning fluid to a temperature below the boiling point and to heat a second portion of the cleaning fluid to a temperature above the vaporization temperature of the cleaning fluid. A vapor dispenser is connected to the at least one heater to dispense vaporized cleaning fluid to the surface to be cleaned. A mechanism is adapted to selectively deliver at least one of vaporized cleaning fluid and heated liquid cleaning fluid to the surface to be cleaned. In a preferred embodiment, the mechanism includes a valve.

Still further according to the invention, a method for cleaning a surface, such as a bare floor or a carpet, comprises the steps of heating the surface to be cleaned, and thereafter, applying a cleaning fluid to the heated surface to be cleaned, and recovering a soiled cleaning fluid from the surface to be cleaned. Preferably, the surface to be cleaned is scrubbed or agitated between the applying and the recovering step. Further, the recovery step preferably includes the step of applying a suction force to the surface to be cleaned.

In one embodiment, the heating step includes the step of applying a radiant energy to the surface to be cleaned.

In another embodiment, the heating step includes the step of applying a heated vapor to the surface to be cleaned. The heated vapor can be air heated to an elevated temperature or a vaporized liquid such as water or an aqueous solution, for example, a cleaning solution.

In another embodiment, the heating step includes the step of applying a liquid heated to an elevated temperature to the surface to be cleaned. In a preferred embodiment, the liquid that is heated can be the cleaning solution.

In one embodiment, the heating step includes the step of heating the surface to be cleaned to a temperature in the range of 95-200° F., preferably in the range of 100-130° F.

BREIF DESCRIPTION OF THE DRAWINGS

DESCRIPTION OF THE PREFERRED EMBODIMENT

Figure 1:
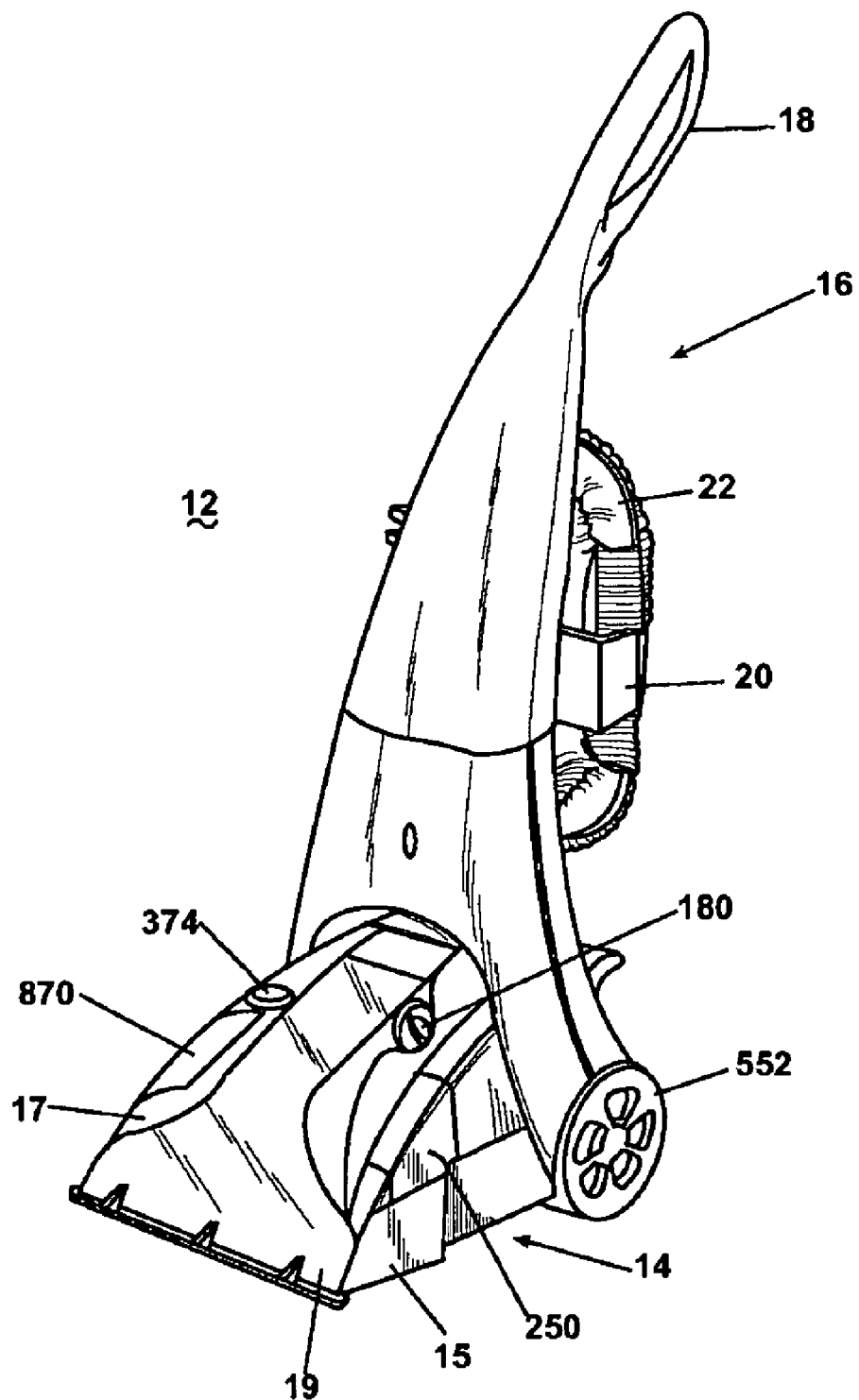
FIG. 1 is a perspective view of the extraction cleaning machine according to a first embodiment of the invention.

Referring now to the drawings and to FIG. 1 in particular, a first embodiment of an upright extraction cleaning machine 12 according to the invention is shown. The machine 12 is a portable surface cleaning apparatus including a base module 14 adapted to roll across a surface to be cleaned and an upright handle assembly 16 pivotally mounted to a rear portion of the base module 14.

Figure 2:
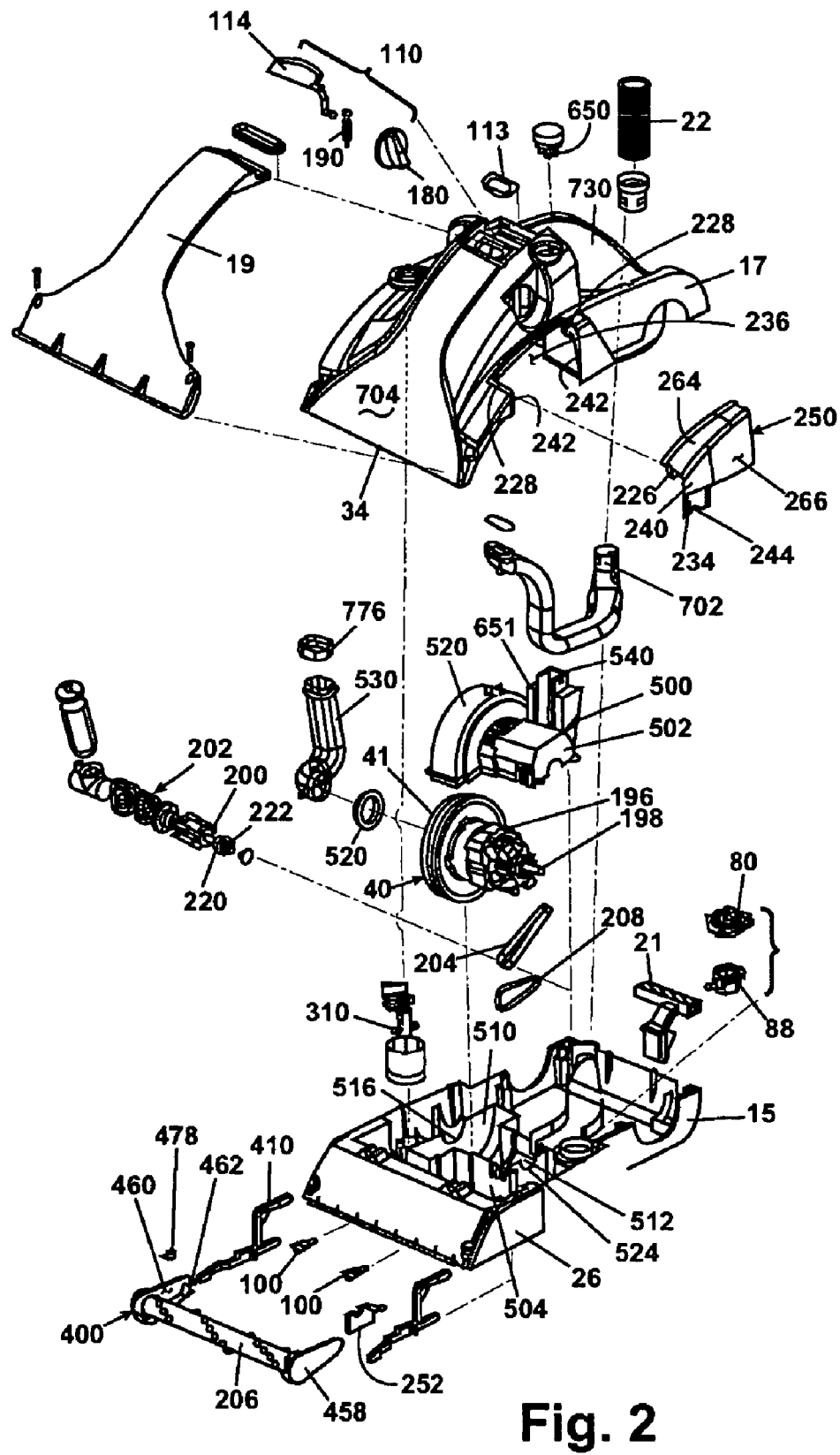
FIG. 2 is an exploded view of a base module of the extraction cleaning machine shown in FIG. 1.
Figure 3:
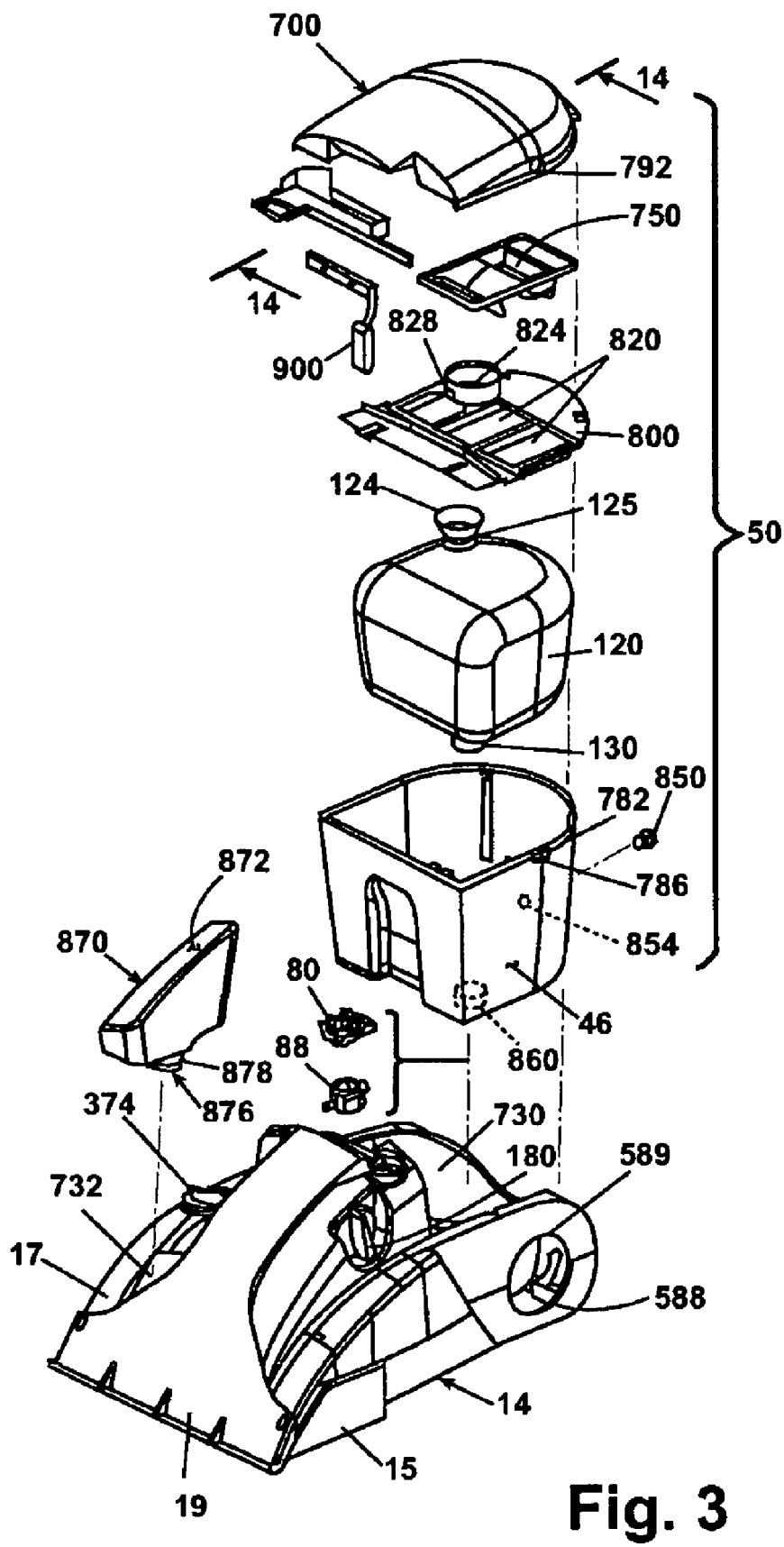
FIG. 3 is an exploded view of a base module and tank assembly of the extraction cleaning machine of FIG. 1.

As best shown in FIGS. 1-3, the base module 14 includes a lower housing portion 15 and an upper housing portion 17, which together define an interior for housing components and a well 730 for receiving a tank assembly 50. Further, a well 732 in the upper housing portion 17 receives a detergent supply tank 870, as best shown in FIG. 3. The upper housing portion 17 receives a transparent facing 19 for defining a first working air conduit 704 and a suction nozzle 34, which is disposed at a front portion of the base module 14 adjacent the surface being cleaned for recovering fluid therefrom. The handle assembly 16 has a closed loop grip 18 provided at the uppermost portion thereof and a combination hose and cord wrap 20 that is adapted to support an accessory hose 22 and an electrical cord (not shown) when either is not in use. A latch assembly 21 is pivotally mounted to the rear portion of the base module 14 adjacent the rotational union of the handle assembly 16 therewith for releasably locking the handle assembly 16 in its upright position.

As shown in FIG. 2, the base module 14 houses a drive motor 196 that is connected to a source of electricity by the electrical cord. A motor compartment 500 within the base module 14 is a clamshell-shaped housing for holding a motor assembly in place and preventing rotation thereof. The clamshell motor compartment 500 includes an upper half 502 and a lower half 504. The upper half 502 is removable from the lower half 504, which is integral to the extraction cleaner base module 14. Thus, a bottom wall of the lower half 504 is the bottom surface of the extraction cleaner base module 14. An arm 651 extends upwardly from the motor housing 500 in the base module 14 to support the flow indicator 650, which is mounted to an upper end thereof. An opening 653 in the upper housing portion 17 receives the flow indicator 650 when that portion is mounted to the lower housing portion 15.

The motor compartment 500 includes a large circular impeller fan housing 510 and a smaller motor housing 512, further having a generally T-shaped cross section. The impeller fan housing 510 surrounds an inner housing 41 defining a vacuum source 40, which is created preferably by an impeller (not shown) disposed within the housing 41. The housing 41 includes a large aperture 516 for mounting a vacuum intake duct 530, which is sealed to the aperture 516 by a gasket 520. The vacuum intake duct 530 connects the vacuum source 40 to an air/water separation chamber 750 (shown in FIGS. 3, 14, 14A, 14B and 15) in a lid 700 on the tank assembly 50, as well as the suction nozzle 34 on the front portion of the base module 14 and a suction nozzle (not shown) on a distal end of the accessory hose 22. The smaller end 512 includes a small aperture 524 for receiving therethrough a motor drive shaft 198. A stretch belt 204 is received on the motor drive shaft 198 outside of the clamshell motor compartment 500. Further, an upper surface 520 of the motor compartment 500 supports and secures an accessory hose intake duct 540 partially defining a second working air conduit 706 (as shown best in FIGS. 12-14), which connects the suction nozzle on the distal end of the accessory hose 22 to the vacuum source 40.

Figure 5:
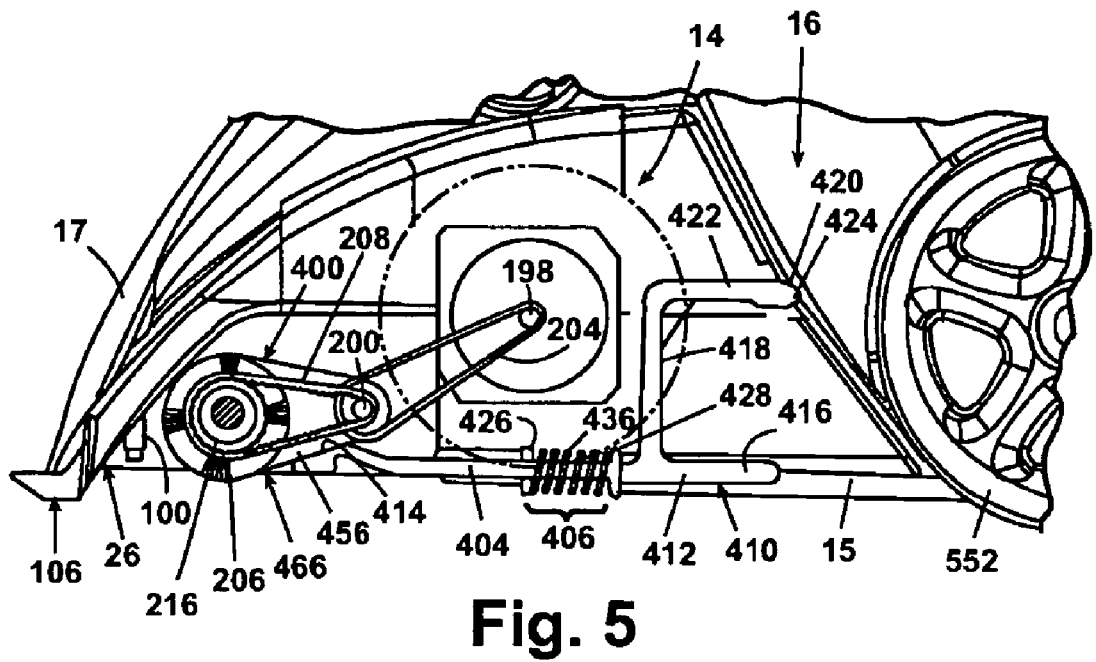
FIG. 5 is a partial sectional side view of the foot module of the extraction cleaning machine of FIG. 1.
Figure 6:
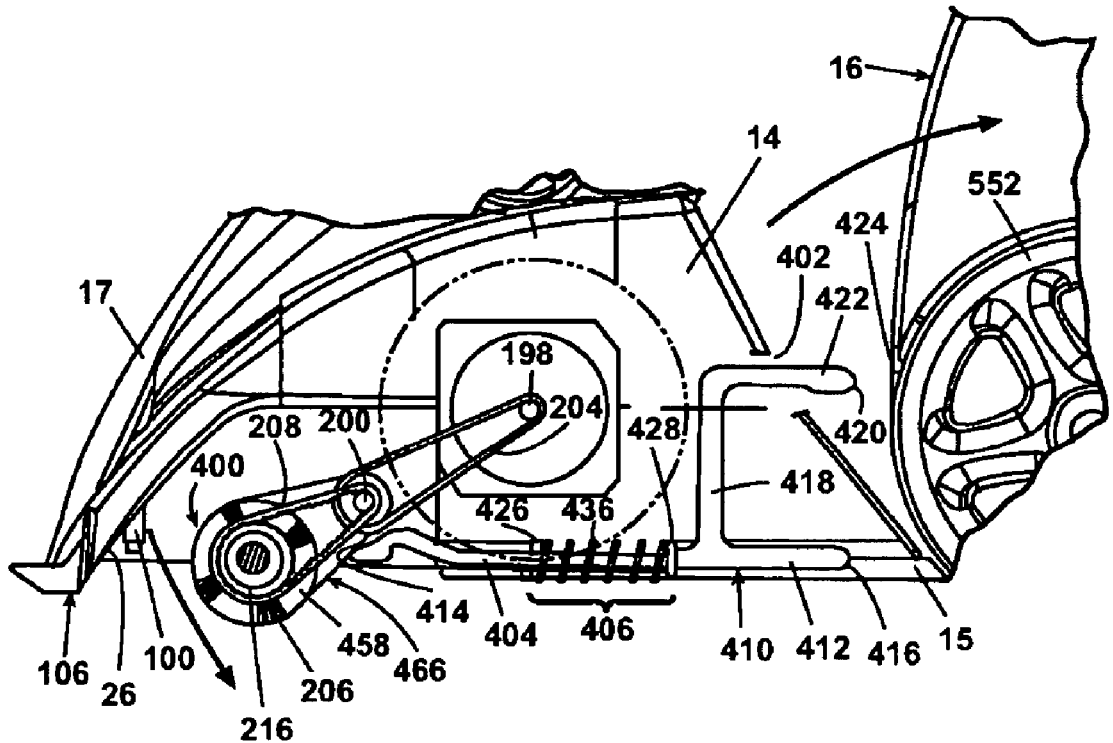
FIG. 6 is a partial sectional side view of the extraction cleaning machine of FIG. 1 with the handle assembly in a tilted position.

The drive shaft 198 of the drive motor 196 is connected to an interim drive shaft 200 of a solution pump 202 by the stretch belt 204, which in turn, is connected to a rotatably mounted agitation brush 206 by a timing belt 208, as best illustrated in FIGS. 5 and 6. On the opposite side of the motor 196, the motor drive shaft 198 supports the impeller (not shown) within the impeller housing 41, which provides the vacuum source 40 and is mounted inside the housing 510 of the motor compartment 500. With this configuration, a single drive motor 196 is adapted to provide driving force for the impeller, the solution pump 202, and the agitation brush 206.

As best seen in FIGS. 2, 5, 5A, and 6, the rotatably mounted agitation brush 206 is adapted for floor-responsive adjustment by a floating brush assembly 400 mounted within an agitation brush housing 26 disposed within a forward portion of the base module 14. The floating movement of the agitation brush 206 is a horizontally oriented arcuate path for reciprocation toward and outward of the agitation brush housing 26. Ends 452 of an agitation brush shaft 206 are received in bearings 454, which in turn, are press fit into inwardly extending bosses 456 to provide a pair of opposed articulating arm members 458. Alternatively, stub shafts (not shown) can extend from the arm members 458 and the ends 452 can be replaced with bearings similar to 454 for rotational installation of the brush 206 on the arm members 458.

Each arm member 458 comprises a back plate 460 with a pivot pin 462 provided at the rear of the plate 460. In addition, a laterally extending belt guard 466 is preferably integrally formed with the articulating arm 458. The belt guard 466, which extends laterally inwardly enough to cover the timing belt 208, minimizes the lodging of threads and other foreign material in the timing belt 208 and protects the carpet or other surface positioned below the base assembly 14 from the rotating belt 208.

Figure 7:
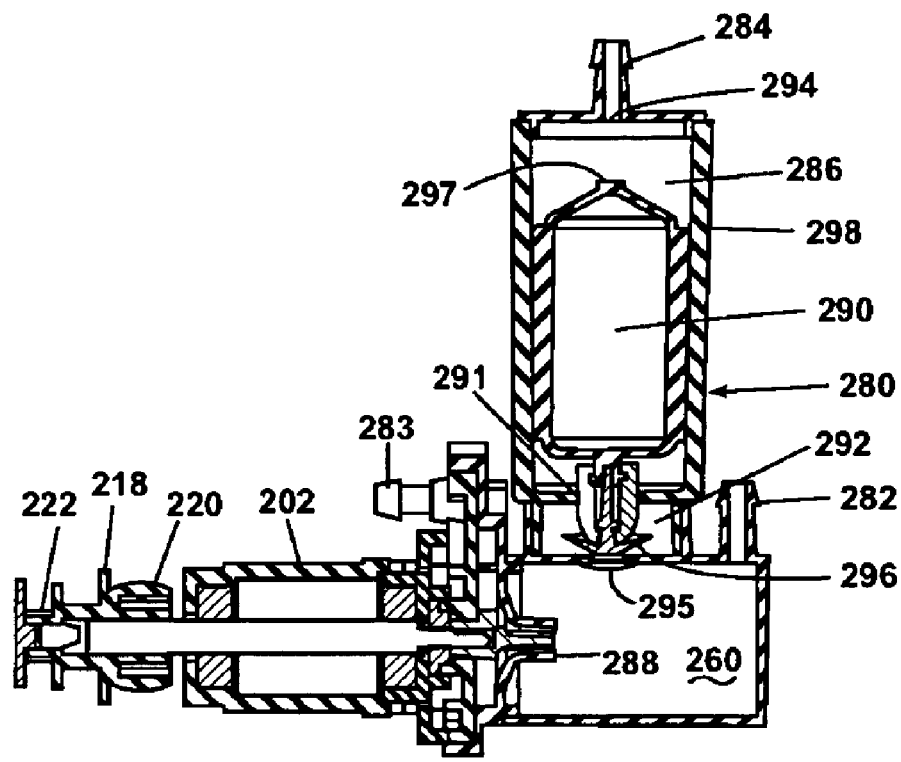
FIG. 7 is a side sectional view of the pump and pump priming assembly of the extraction cleaning machine of FIG. 1 with a plunger in a first position.
Figure 9:
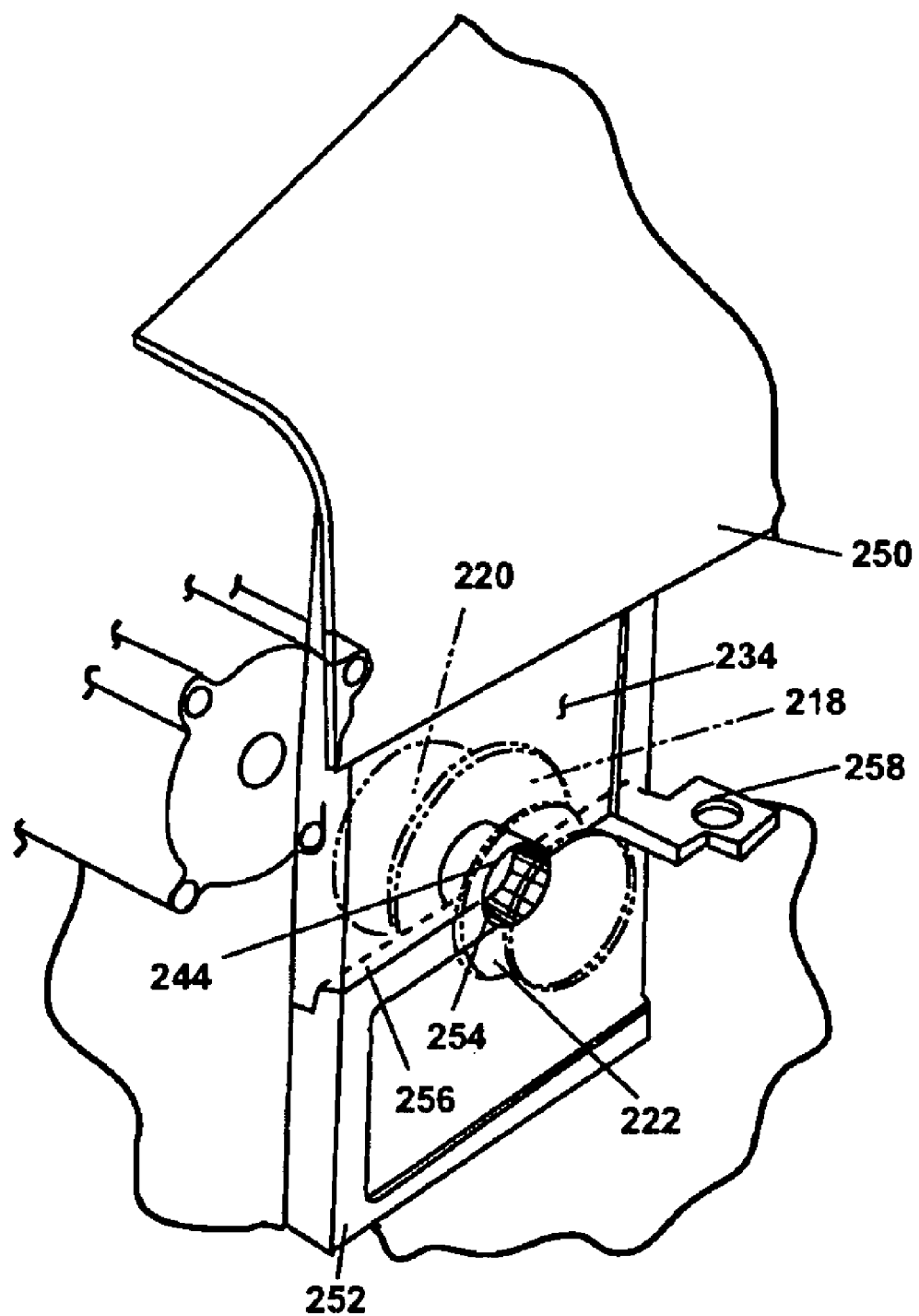
FIG. 9 is a partial perspective view of the belt access door assembly of the extraction cleaning machine of FIG. 1.

As best shown in FIGS. 5-6, 9, the timing belt 208 is received through a pulley 216 mounted at one end of the brush 206 and a pulley 222 on the interim drive shaft 200 of the pump 202, which includes a separate pulley 220 through which is received the stretch belt 204, which, in turn, extends around the drive shaft 198 of the motor 196. As best shown in FIGS. 7 and 9, the radius of the pulley 220 is larger than the radius of the pulley 222. Further, the pulley 220 has a convex cross section of its periphery, whereby it is adapted to receive the smooth stretch belt 204, while the pulley 222 has a toothed perimeter adapted for registration with the teeth in the timing belt 208.

Figure 5A:
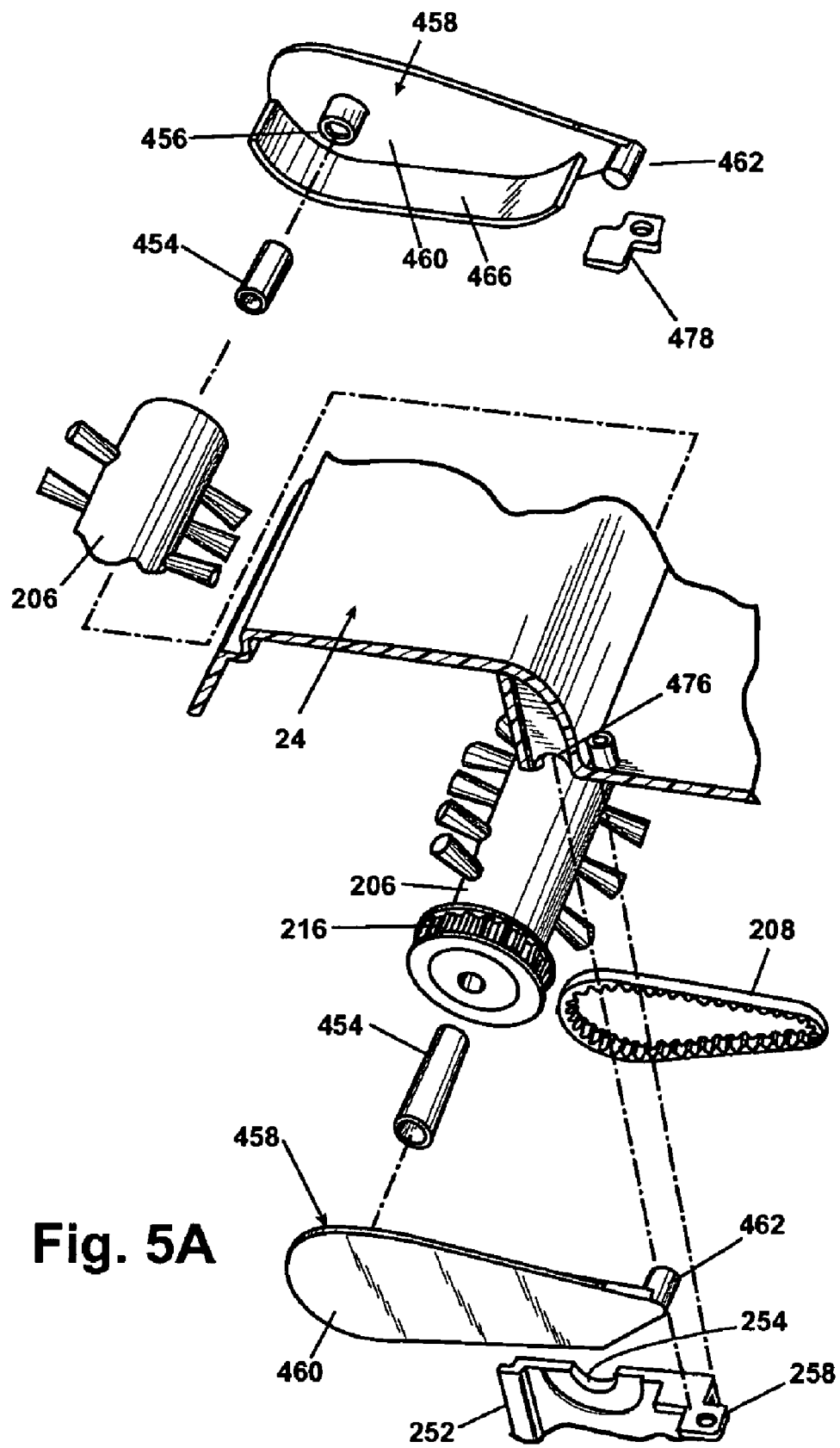
FIG. 5A is an exploded view of a floating brush assembly for the extraction cleaning machine of FIG. 1.

The pivot pins 462 of the arm member 458 are rotatably supported secured in a bearing (not shown) mount integrally formed with an internal wall of the agitation brush housing 26. Further, the pivot pins 462 are held in the bearing by a support 478 on the non-belt side of the base module 14 and the an arm 258 of the second belt access door 252 on the belt side of the base module, as best shown in FIG. 5A. Both the arm 258 and support 478 are secured to the agitation brush housing 26 by a conventional fastener (not shown) inserted through an aperture in each part. The arm members 458 are preferably limited in their downward movement relative to the agitation brush housing 26 by the length of the timing belt 208 as well as the engagement of the brush guards 466 with the arm 258 and the support 478. As the floating brush assembly 400 extends further and further downwardly, the belt 208 will stretch and resist further downward movement. Eventually, the brush guards 466 on each arm 458 will contact respectively the arm 258 and the support 478, which prevents any further downward movement.

With this floating agitation brush assembly 400, the cleaning machine 12 according to the invention can almost instantaneously adapt to varying carpet naps or other inconsistencies on the surface being cleaned. The arm members 458 also allow the rotating brush 206 to drop below the normal floor plane, as shown in FIG. 6, to, for example, provide contact with a bare floor.

Figure 5B:
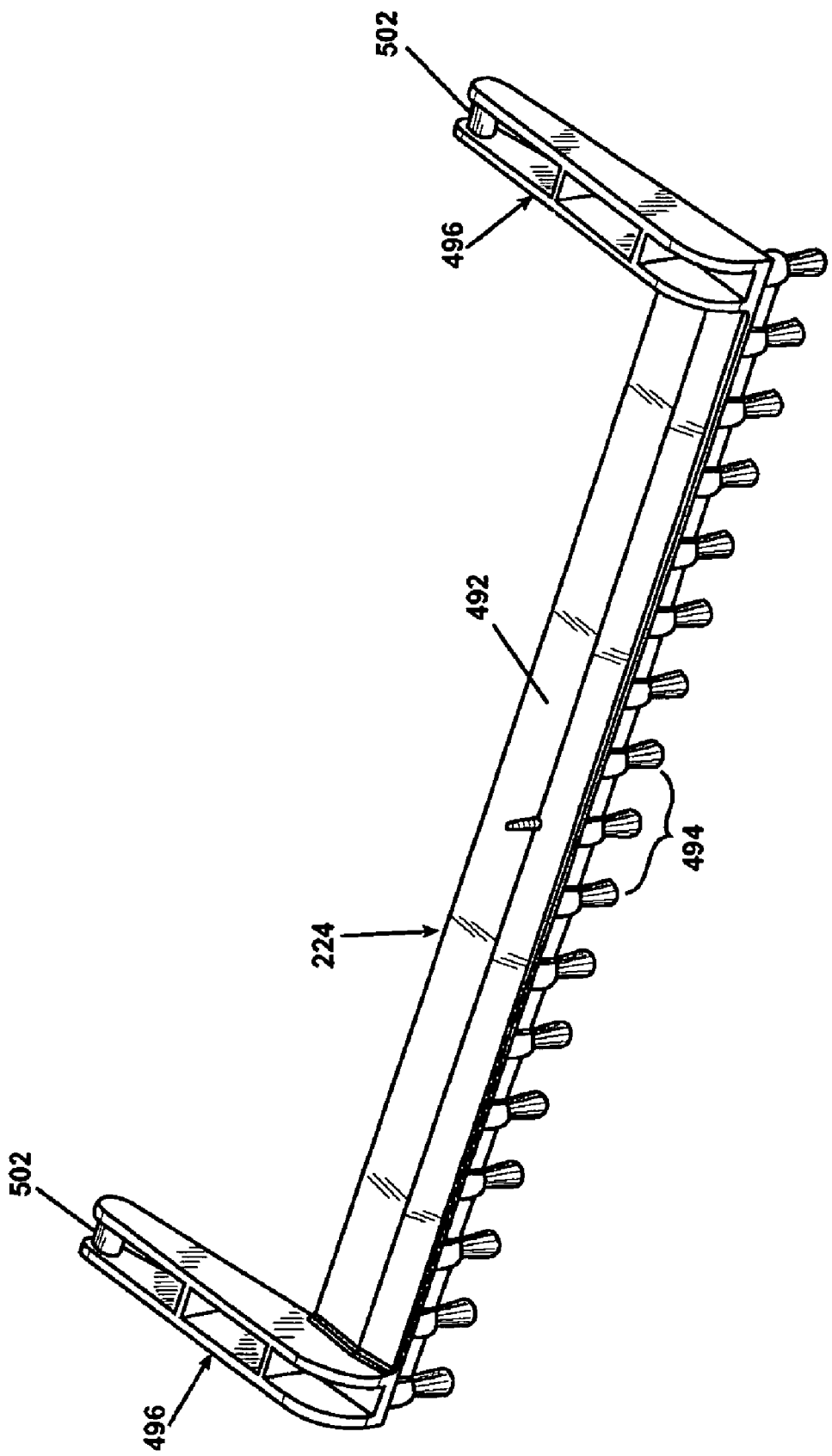
FIG. 5B is a perspective view of an alternative brush assembly for the extraction cleaning machine of FIG. 1.

As an alternative to the floating, rotatably mounted agitation brush 206, a floating strip agitation brush 224 could be incorporated into the cleaning machine 12, as seen in FIG. 5B. In this embodiment, the strip brush 224 comprises a linear brush portion 492 with bristles 494 extending downwardly therefrom, and a pair of integrally molded arms 496 having pivot pins 502, which can mount to the arm members 458 in place of the pivot pins 462 supporting the agitation brush 206. With this structure, the strip brush 224 can move vertically in response to changes to the carpet nap or other inconsistencies in the floor being cleaned.

As shown in FIGS. 2, 5 and 6, an elevator assembly 410 comprises a central support member 412 having at one end an L-shaped actuating arm 418, and at another end, the ramped surface 414 on a forward arm 404 opposed by a guide 416. Between the guide 416 and the ramped surface 414 is mounted a spring assembly 406, which biases the assembly 410 rearward toward the handle assembly 16. The spring assembly 406 includes a spring 436; a stop 426, which is attached to the base module 14 and through which the forward arm 404 travels; and a flange 428, which is integral with the forward arm 404. The spring 436 is held between the flange 428 and stop 426, and biases the assembly 410 rearward relative the stop 426 through force on the flange 428.

The arm 418 extends from within the base module 14 where it is mounted, through an aperture 402, towards the handle assembly 16. The actuating arm 418 is forced horizontally forward when the rotatably mounted handle 16 on the base module 14 is put in the upright position, which forces an upper portion 422 of the actuating arm 418 in a horizontal and forward direction. More specifically, as shown in FIG. 5, a curved surface 424 on the handle assembly 16 strikes a rounded distal end 420 of the L-shaped actuating arm 418 when the handle assembly 16 is put in its storage or non-use position. When the handle assembly 16 is pivoted rearwardly for use, as shown in FIG. 6, the curved surface 424 shifts rearwardly and the spring-biased elevator assembly 410 follows, with end 420 riding the curved surface 424, until the elevator assembly 410 reaches a rearward, rest position.

Thus, forward movement of the actuating arm 418 forces the support member 410 and ramped surface 414 forward, wherein the ramped surface 414 contacts the underside of the brush guards 466 on each arm 458, thereby raising the floating brush assembly 400 as the elevator assembly 410 moves from a rearward position to a forward position in the base module 14. That is, as the ramped surface 414 moves towards the front of the base module 14, the agitation brush assembly 400 slowly rises as the brush guards 466 ride the ramped surfaces 414. Such a construction eliminates the need for a manual arm for lowering and raising the agitation brush assembly 400 for storage or use of the accessory hose 22, thereby eliminating risks of damage to the brush assembly and protecting the carpet from the agitation brush assembly 400 resting thereon. When the handle 16 is moved to the in-use position, the spring assembly biases the elevator assembly to its normal, rearward position.

Figure 4:
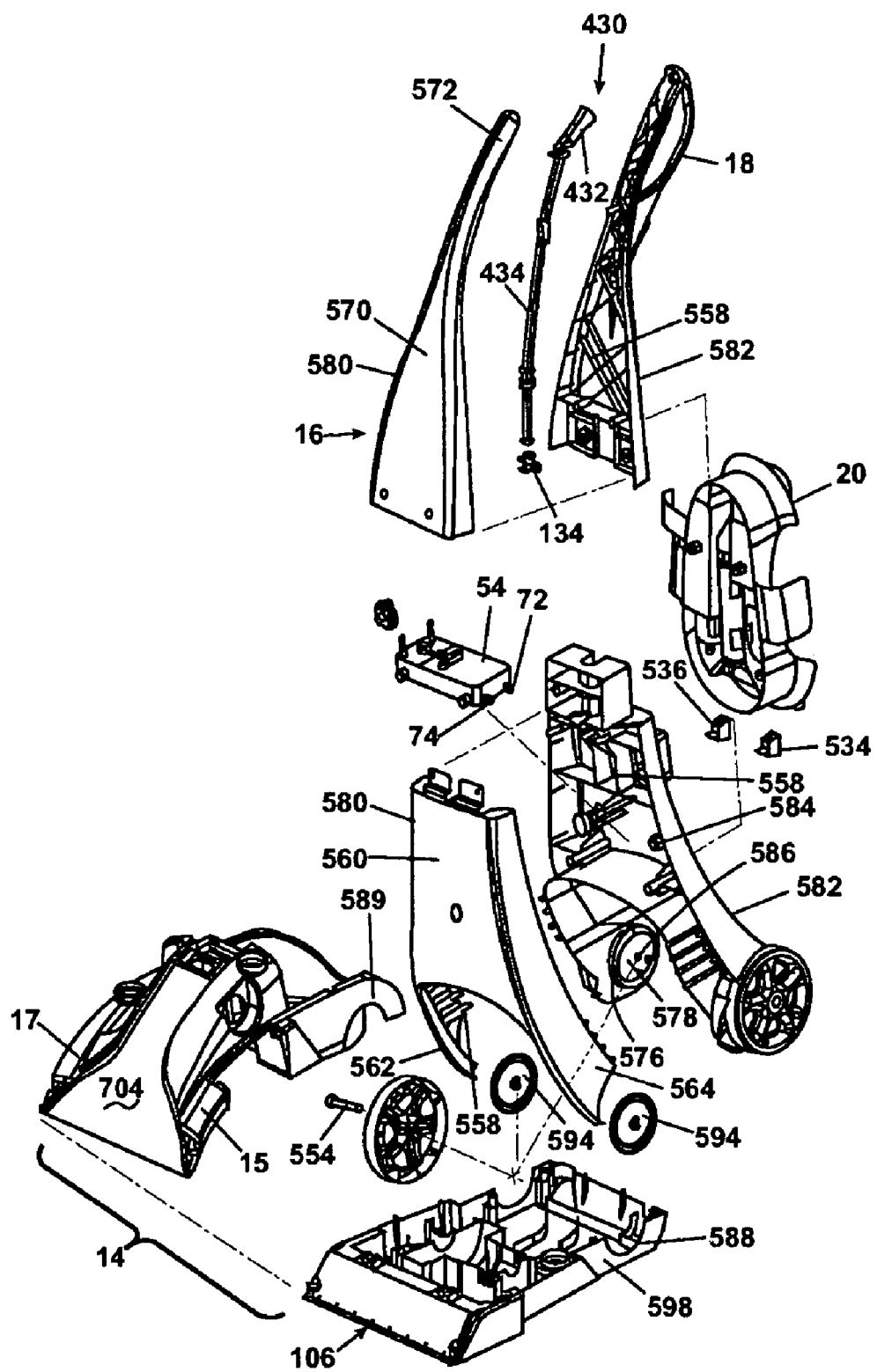
FIG. 4 is an exploded view of a handle assembly and portions of the base module for the extraction cleaning machine of FIG. 1.

As seen best in FIGS. 1 and 4, the base module 14 is supported at the rear portion thereof by a pair of opposed rear wheels 552. The handle assembly 16 includes a U-shaped lower portion 560 having opposed arms 562 and 564 including cylindrical bearings 578 for mounting the handle assembly 16 to the base module 14 and supporting axles 554 on a common axis for rotatably mounting the wheels 552 to the extraction cleaner base module 14. More particularly, the handle assembly 16 tapers from its wide, lower portion 560 to a thinner handle portion 570, having a thin handgrip portion 572, including the closed loop grip 18 at its uppermost end, by which the user moves the extraction cleaner. The bearing 578 include a central circumferential groove 576 for receiving arcuate portions 588, 589 of the base module 14 whereby rotation of the handle assembly 16 is facilitated.

The handle assembly 16 further comprises a front portion 580 and a rear portion 582 defining a substantially hollow interior supported by multiple ribs 558. Mounts 584, disposed radially on the interior of the front and rear portions 580 and 582 support an in-line heater 54, as will be described in detail below. The substantially flat front portion 580 is secured to the mated rear portion 582 by conventional fasteners, such as screws. The rear portion 582 further includes the combined accessory hose and electrical cord mount 20.

Returning to the lower portion 560, the arms 562, 564 comprise portions of both the front portion 580 and the rear portion 582. When the assembly 16 is secured together, these arms 562, 564 pivot about the bearing 578 integrally formed with the arms 562, 564. The bearings 578, in turn, receive axles 554, on each side, respectively, for mounting wheels 552. The axles 554 extend through the wheels 552, apertures 586 through the rear portion 582 of the lower arms 562, 564, and the bearings 578 integrally formed with the arms 562, 564. The axles 554, 556 are secured by large diameter axle mounting clips 594, disposed, when installed, adjacent the bearings 578 and within the base module 14. A side edge 598 of the extraction cleaner base module 14 includes an arcuate surface 588 to accommodate the handle bearings 578 secured on inside portions of each arm 562, 564 of the rear portion 582.

Once the handle assembly 16 is mounted to each base module 14, with the axles 554 secured by the mounting clips 594, the extraction cleaner upper housing portion 17 is secured to the lower housing portion 15. The upper housing portion 17 also has an arcuate surface 589 formed in a side thereof for accommodating and securing the integral bearings 578 of the arms 562, 564. More specifically, the arcuate surfaces 588, 589 of the side walls of the housings 15, 17 are received in the central circumferential groove 576 formed in the circumference of each integral bearing 578. Thus, when the base module 14 is formed of the housings 15, 17, the bearings 578 of the arms 562 are secured therebetween such that they can only rotate between an upright, stored position and an in-use position and the wheels are mounted to axles 554, 556 received through apertures in the bearings 578 and secured by mounting clips 594.

The concentric wheel axle and handle pivot transfers all the force on the handle assembly 16 to the wheels 552 to keep downward force on the suction nozzle 34 constant. Further, the tank assembly 50, as shown in FIG. 3, center of gravity is close to the wheel center so that changing tank volume does not alter the downward force on the suction nozzle 34 and allows the weight of the tank assembly 50 to be carried on the wheels 552 fairly evenly. Also, the handle assembly 16 supports very little weight and therefore keeps the weight that the user feels through the handle assembly 16 to a minimum. This creates an upright extraction cleaning machine 12 that is easy to use and less tiring for the operator.

The handle assembly 16 is releasably locked against rotation from its upright position by a latch assembly 21, which is pivotally mounted to the rear portion of the base module 14 adjacent the rotational union of lower leg 564. The latch assembly 21 includes an upright lower portion which is pivotally mounted to the base module 14 at a rear corner thereof and an upper portion which extends upwardly and rearwardly of the lower portion. A molded-in spring arm extends rearwardly from the lower portion of the latch assembly 21 and bears against a rear portion of the base module 14 to bias the lower portion forwardly and against the rear portion of the lower leg 564. The upper end of the lower portion of the latch assembly 21 forms a horizontal latching surface which bears against the rear portion of the lower leg 564 and engages projections thereon to lock the handle in the upright position in a conventional fashion. Thus, as the handle assembly 16 is pivoted upright, the rear portion of the lower leg 564 rides along the horizontal latching surface until the edge catches the projection on the rear portion of the lower leg 564, at which point the handle assembly 16 is locked upwardly. To release the latch assembly 21, the user pushes the step downwardly and against the bias of the molded-in spring to release the horizontal latching surface from the projection. The latching mechanism is conventional and forms no part of the invention of this application. Any conventional latching mechanism can be used with the handle and base module in the invention.

The tank assembly 50 is removably supported on the rear of the base module 14 and defines both a fluid supply tank and a fluid recovery tank therein via a flexible bladder 120 separating a fluid supply chamber 49 from a recovery chamber 48. An air/water separator lid 700 seals the top of the tank assembly 50, which includes a valve mechanism 80 on a bottom portion for controlling the flow of cleaning solution fluid from the fluid supply chamber 49. The base module 14 includes a valve seat 88 complementary to the valve mechanism 80, and the bottom portion of the tank assembly 50 and the valve seat 88 are substantially complementary to one another so that the upwardly extending valve seat 88 is substantially surrounded by and received in the bottom of the tank assembly, as will be described further below.

Figure 16:
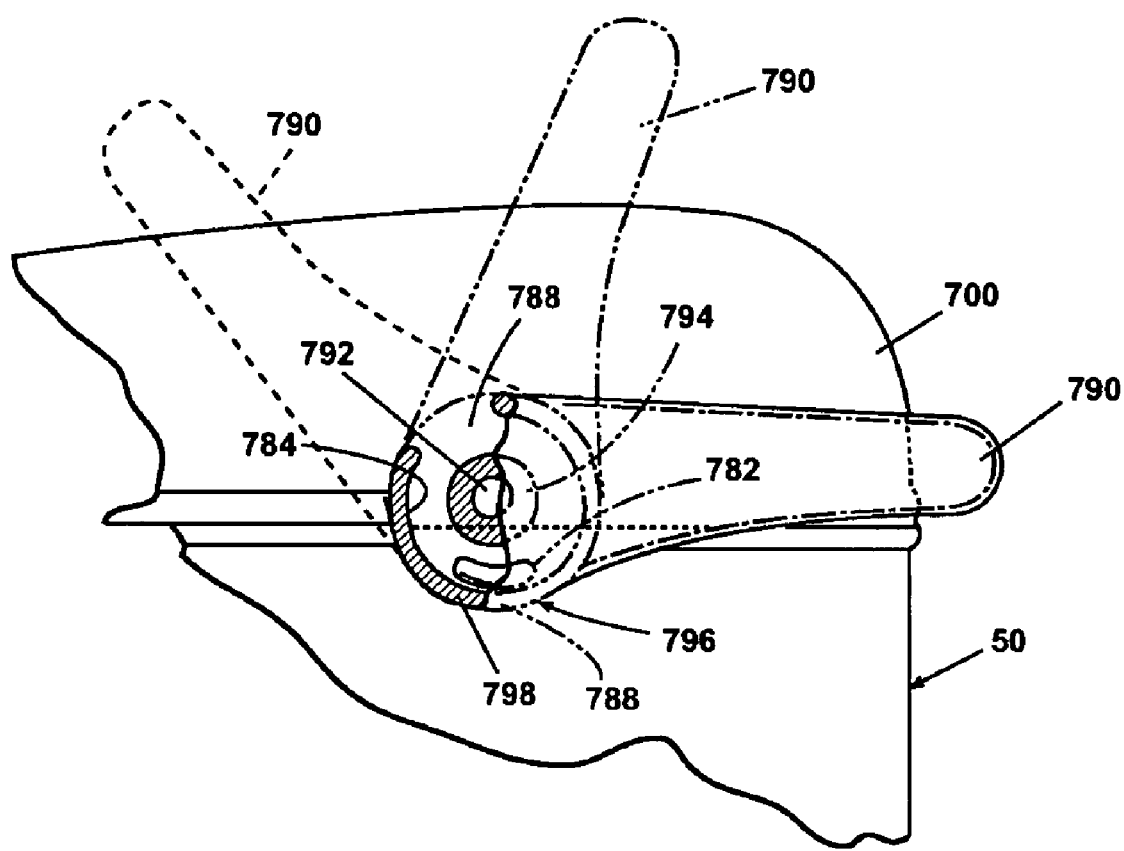
FIG. 16 is a partial sectional view of the tank assembly and handle assembly of the extraction cleaning machine shown in FIG. 1.

The lid 700 is secured to the tank assembly 50 by a rotatable handle 790, as best shown in FIG. 16, which can be moved between a storage position, in which the tank 50 is sealed by the lid 700 and the handle 790 is disposed rearwardly horizontal (as shown in solid lines); a transport position, in which the tank 50 is sealed and the handle 790 extends vertically upward (shown in phantom lines) for ease in carrying by the user; and a service position, in which the lid 700 can be removed from the tank assembly 50 and the handle 790 is disposed forwardly at an acute angle relative the lid (shown in dashed lines). The U-shaped tank handle 790 rotates about a pivot 792 projecting from a side of the lid 700. The pivot 792 is received in a bushing 794 disposed centrally in a circular mounting portion 796 at the ends of the handle 790. An arcuate wall 798 extending transversely from the mounting portion 796, integral therewith, and having an opening 788 surrounds the bushing 794. When the handle 790 is rotated about the pivot on the lid, an inside surface 784 of the wall 798 engages a tab 786 extending transversely from an upper lip 782 of the tank assembly 50 for locking the lid 700 to the tank assembly. The surface 784 of the wall 798 engages the tab 786 when the handle 790 is in either the storage or transport position. When in the service position, the tab 786 is aligned with the opening 788 in the wall 798, whereupon the lid 700 can be removed from the tank assembly 50.

Figure 14:
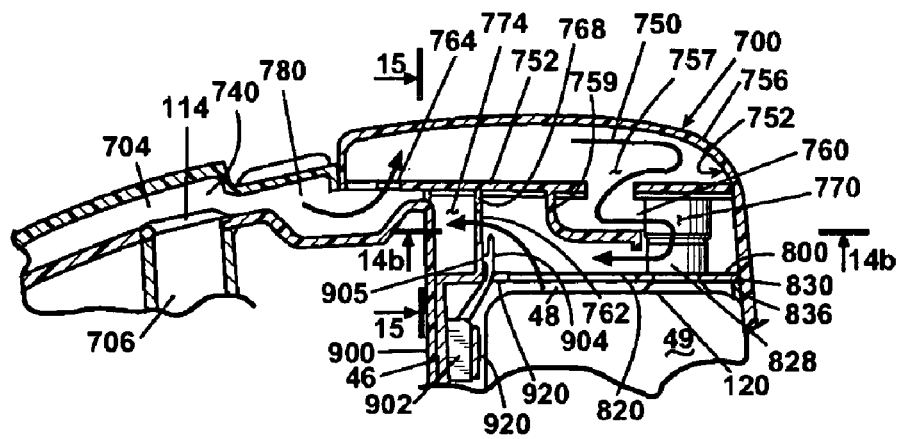
FIG. 14 is a sectional view of the air/water separator lid along line 14-14 of FIG. 3.
Figure 15:
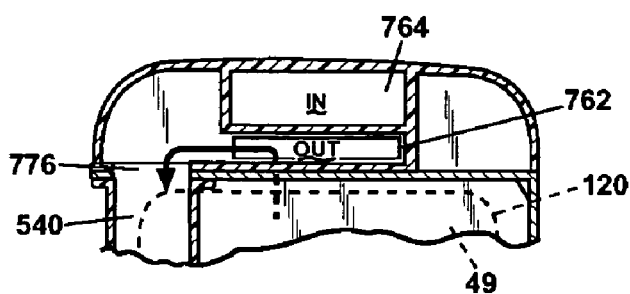
FIG. 15 is a sectional view of the air/water separator lid along line 15-15 of FIG. 14.

As best shown in FIGS. 3, 14, 15, a flexible bladder 120, which is used as a fluid supply tank, is mounted inside the rigid tank assembly 50. Thus, the tank assembly 50 is divided into a recovery tank and a fluid supply tank defined as two fluid chambers separated by the bladder 120: a fluid supply chamber 49, comprising the interior of the bladder 120, and a fluid recovery chamber 48, comprising the volume between the flexible bladder 120 and the rigid walls of the tank housing 46. The bladder 120 is molded from a pliable thermoplastic material and is collapsible when empty to accommodate recovered fluid in the volume between the bladder 120 and the tank housing 46. Initially, the bladder 120 is full of water or cleaning solution and occupies the vast majority of the volume within the tank housing 46. As the user sprays the cleaning solution onto the surface to be cleaned, the volume of fluid in the bladder 120 is reduced corresponding to the volume of solution sprayed on the surface. During suction, recovered dirt and water are received in the tank housing 46 in the volume between the bladder 120 and the tank housing 46. The volume available in the bladder 120 due to application of the cleaning solution is made available to recovered fluid by the pressure of the recovered fluid collapsing the bladder 120, thereby forcing air out of the bladder 120. Because recovery of the used cleaning solution is always less than 100% of the solution applied, there will always be ample room inside the tank housing 46 once the cleaning solution has been applied to the surface.

Figure 17:
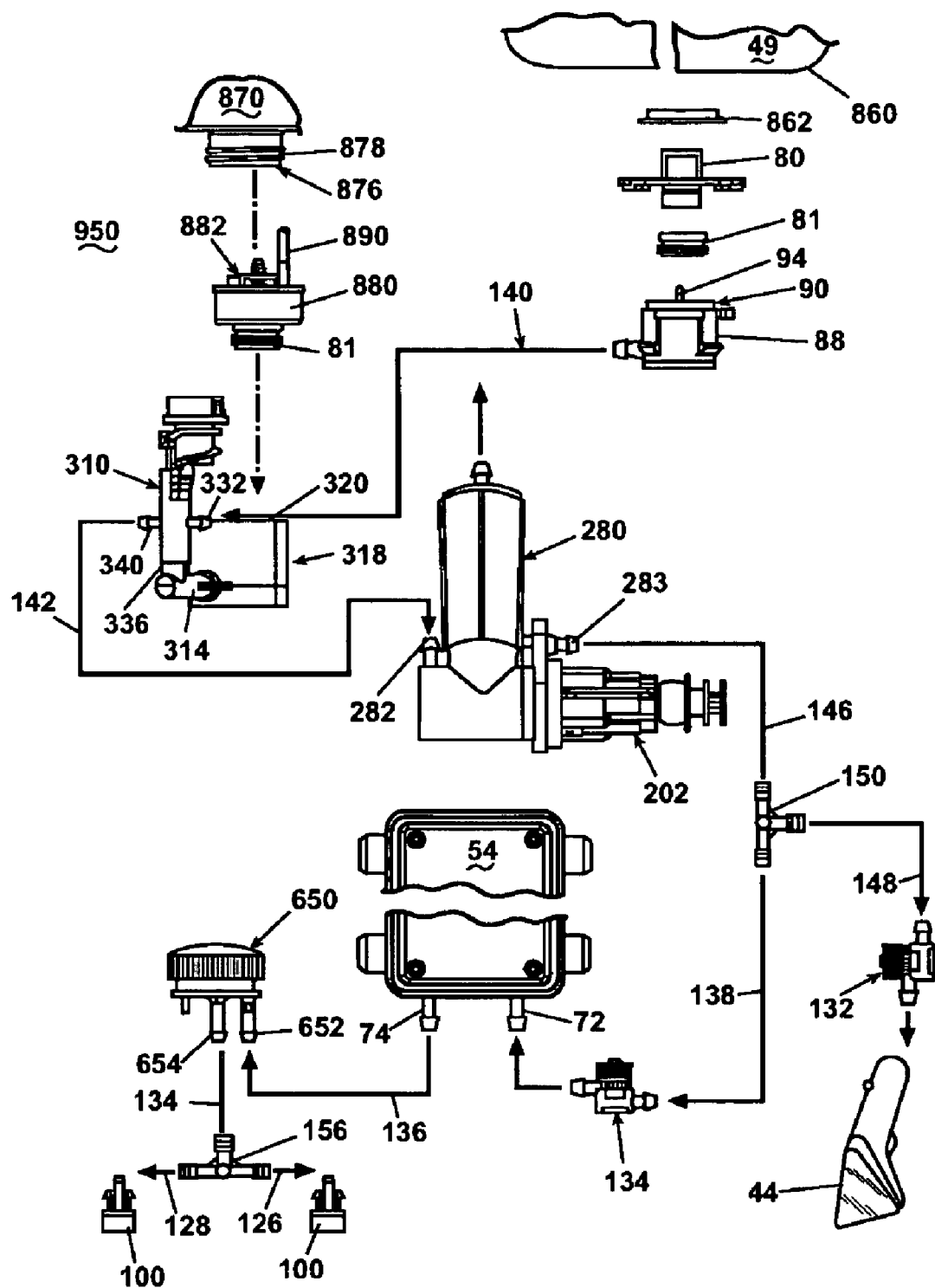
FIG. 17 is a fluid flow diagram for the extraction cleaning machine of FIG. 1.

The bladder 120 is disposed within the tank assembly 50 between a bottom surface 860 of the rigid tank housing 46 and a snap-in baffle plate 800, which will be explained in further detail below. An aperture 824 in the baffle plate 800 has a diameter approximately matching that of a small diameter end 125 of a funnel-shaped filling spout 124 of the bladder 120. Further, an upstanding collar 828 surrounds the aperture 824. A cylindrical shroud 770, as best shown in FIG. 17, is mounted on the inside of the air/water separator lid 700 and extends downwardly therefrom to capture the filling spout 124. Thus, the increasing diameter outside surface of the funnel-shaped filling spout 124 is retained in the aperture 824 and supported by the collar 828, thereby holding the flexible bladder 120 in an upright position in the tank housing 46 between the bottom surface 860 and the baffle plate 800 therein. As space between the upstanding collar 828 and the downwardly extending shroud 770 defines a fluid passageway between the fluid supply chamber 49 and the recovery chamber 48, whereby the fluid supply chamber 49 and the recovery chamber 48 maintain the same pressure, negative or otherwise.

The flexible bladder 120 includes an outlet 130 disposed in a lower corner of the flexible bladder 120. The outlet 130 is mated with an outlet aperture 862, as best viewed in FIG. 16, in the bottom surface 860 of the rigid outer shell for supplying fluid to a fluid application system 950 and securing the bladder 120 to the rigid bottom surface 860 of the tank housing 46.

The funnel-shaped filling spout 124 of the bladder 120 facilitates filling the bladder 120 and equalizing air pressure between the fluid supply chamber 49 and recovery chamber 48. The filling spout 124 is always open, so as to vent air from the bladder 120 as it collapses in volume and the usable volume within the rigid outer walls of the tank housing 46 expands in volume. Further, the open filling spout 124 ensures that both chambers 48, 49 are at substantially the same atmospheric pressure, which is preferably negative relative to standard atmospheric pressure because of the communication of the vacuum source 40 to the tank assembly 50 via the air/water separator lid 700, as will be explained further below. The volume of the bladder 120 is preferably one gallon.

As best shown in FIG. 17, the valve mechanism 80 is provided within the outlet aperture 862 through the bottom surface 860 of the tank housing 46 and the aligned outlet 130 in the bladder 120 for controlling the flow of cleaning solution fluid from the fluid supply chamber 49. The valve mechanism 80 comprises a valve member (not shown) mounted within the aligned aperture 862 and outlet 130, which together are selectively covered by the valve member to enable or prevent the flow of fluid to the fluid application system 950.

The base module 14 includes a valve seat 88, shown best in FIG. 17, that has a fluid reservoir 90 adapted to receive fluid through the fluid aperture 862 and conduct this fluid to one end of the conduit 140, the other end being mounted to a clean water inlet 332 of a mixing valve assembly 310. The bottom wall 860 of the tank housing 46 and the valve seat 88 are substantially complementary to one another so that the upwardly extending valve seat 88 is substantially surrounded by and received in the bottom wall 860. A projection 94 is provided in the fluid reservoir 90 and is adapted to contact a head of a shaft of the valve member (not shown). A spring received on the shaft of the valve member is adapted to bias the valve member into the closed position thereby preventing the flow of fluid through the fluid apertures. When the tank housing 46 is seated on the base module 14, the head of the valve member contacts the projection 94 and deflects the valve upwardly thereby permitting the flow of fluid around the valve, through the fluid apertures into the fluid reservoir 90 of the valve seat 88, and to the fluid application system 950. A gasket 81 seals the junction between the valve mechanism 80 and the seat 88. When the tank housing 46 is removed from the base module 14, the projection 94 is removed from contact with the head 96 of valve member. Therefore, the spring biases the valve downwardly into the closed position thereby preventing the flow of fluid through the fluid aperture 862 to the fluid application system 950.

The fluid application system 950 conducts fluid from the fluid supply chamber 49 to fluid dispensing nozzles 100, which are mounted in the brush housing 26 of the base module 14, and a fluid dispensing nozzle (not shown), which is mounted on an accessory cleaning tool (not shown), as best illustrated in FIG. 17. From the fluid supply chamber 49, clean water is conducted through conduit 140 to an inlet 332 to the mixing valve assembly 310, which also includes a detergent inlet 336 that is fluidly connected to a detergent supply tank 870 by a conduit 314. Mixed detergent and clean water form a solution that exits the mixing valve assembly 310 via an outlet 340, which is fluidly connected by a conduit 142 to a pump priming system 280 disposed adjacent the pump 202. An inlet port 282 for the pump priming system 280 is connected to the conduit 142, and pressurized fluid is expelled from the pump 202 through a pump outlet port 283, which is fluidly connected via a conduit 146 to a T-connector 150. The T-connector 150 supplies pressurized fluid to both the accessory tool (not shown) and the heater 54 via conduits 148, 138, respectively. The conduit 148 includes a grip valve 132 by which the user can manually displace a valve member, thereby enabling the flow of non-heated, pressurized fluid to the spray tip on the accessory tool.

The conduit 138 includes a trigger valve 134 having a displaceable valve member that can be actuated by a trigger assembly 430, as best shown in FIG. 4, for selectively supplying the in-line heater 54 with pressurized cleaning solution. The trigger assembly 430 includes a switch 432 mounted conveniently within the closed loop grip 18 of the upright handle assembly 16, through which the user can depress the switch for actuating a manual link 434 for displacing the valve member in the trigger valve 134, thereby allowing fluid to flow to the inlet port 72 of the in-line heater 54.

Heated while passing through the heater 54, the fluid exits the in-line heater 54 via an outlet port 74, which is fluidly connected via a conduit 136 to an inlet 652 for a flow indicator 650. An outlet 654 for the flow indicator is fluidly connected to a T-connector 156 via a conduit 134. The T-connector 156 supplies fluid dispensing nozzles 100, which are mounted in the brush housing 26 of the base module 14, and supplied with heating cleaning solution via conduits 126, 128.

A detergent supply tank 870, as best illustrated in FIG. 3, is received within a well formed in the upper housing 19 of the base module 14. The supply tank 870 includes a top surface 872 shaped complimentary to the exterior of the upper housing 17. A bottom surface 874 of the supply tank 870, as best shown in FIG. 17, includes an aperture 876 surrounded by a threaded spout 878, which receives a mated threaded cap 880 having a valve mechanism 882 therethrough. The valve mechanism 882 will not be described here as its structure and function mimics that valve mechanism 80 described above for the tank assembly 50, as it too seats on a projection 94 in a valve seat 318 for displacing the valve mechanism 882. The valve seat 318 of the mixing valve assembly 310 includes a fluid reservoir 320 for receiving and conducting fluid to one end of an L-shaped conduit 314, the other end being mounted to a detergent inlet 336 of the mixing valve assembly 310. The threaded cap 880 also includes an air return conduit 890 mounted therethrough for equalizing the pressure inside the detergent supply tank 870 with the outside atmosphere.

Figure 10:
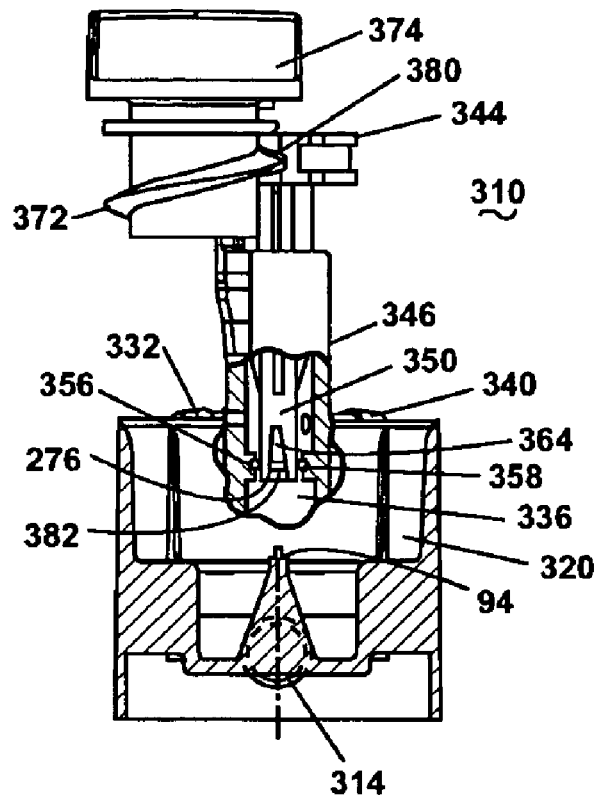
FIG. 10 is a partial sectional view of the auto-mix valve of the extraction cleaning machine of FIG. 1 with a valve stem in a first position.
Figure 11:
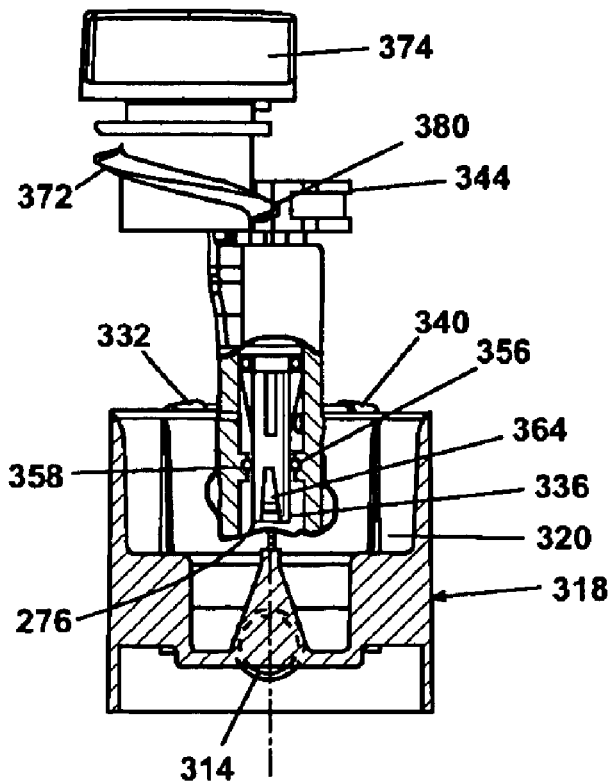
FIG. 11 is a partial view of the auto-mix valve of the extraction cleaning machine of FIG. 1 with a valve stem in a second position.

The mixing valve assembly 310 is positioned intermediate the tank assembly 50 and the solution pump 202. Preferably, the mixing valve 310 is a variable mixing valve to accommodate differing mixtures of detergent and clean water. As seen in FIGS. 10, 11 and 17, the variable mixing valve 310 comprises a valve body 330 having a clean water inlet 332 that is fluidly connected to the fluid supply chamber 49 and a detergent inlet 336 that is fluidly connected to a detergent supply tank 870 by the valve seat 318 and, via the fluid reservoir 320, the L-shaped conduit 314. The mixed solution outlet 340 is also formed on the valve body 330 and is adapted to conduct the clean water and detergent mixture, i.e., the cleaning solution, from the mixing valve 310 to a fluidly connected pump priming system 280 adjacent the inlet of the pump 202.

The valve assembly 310 includes an end cap 344 mounting a coaxial plunger 350 in a central body portion 346. The end cap 344 partially receives a thread 372 of a knob 374 such that the plunger 350 can be raised or lowered in the valve body 346 when the knob 374 is turned.

The plunger 350 includes an annular groove 356 formed in a distal end 276 thereof. The groove 356 is received within an O-ring 358. The distal end 276 and O-ring 358 are adapted to create a fluid seal inside the circular valve body 346 when the plunger 50 is in its lowermost portion, as shown in FIG. 11, and define a mixing chamber 360 when the plunger 350 is raised from its lowermost position, as shown in FIG. 10.

The distal end 276 of the plunger 350 further includes a tapered groove 364, which is tapered so that the groove has a greater cross-sectional area immediately adjacent the head end 276 than it does a distance spaced upwardly therefrom. The tapered groove is positioned in the detergent inlet 336 opening to control the flow of detergent therethrough. That is, the tapered groove 364 accommodates varying flow rates of detergent from the detergent supply 870, through the conduit 318, and through the detergent inlet 336 into the valve body 346. The lower the plunger 350 is seated in the inlet 336, the less the area of exposure of the tapered groove 364 in the valve body 346, thereby limiting the flow of detergent thereto.

The control knob 374 is mounted on an outside wall of the upper housing of the extraction cleaner for controlling the water to detergent ratio in the cleaning solution delivered to the fluid application system 950. The control knob 374 is mounted adjacent the end cap 344 and includes a thread 372 that is received in a groove 380 of the end cap 344, so that turning the knob 374 lowers or raises the plunger 350 in the valve body 346. In a first position shown in FIG. 10, with the plunger 350 extended upwardly from the valve body 346, the maximum cross-sectional area of the tapered groove 364 is exposed to define an inlet aperture 382 into the valve body 346. Therefore, the maximum amount of detergent will be drawn into the valve body 346 to mix with clean water supplied via inlet 332, and ultimately discharged to the pump assembly 280 and fluid dispensing nozzles 100. The other extreme position of the plunger 350 lowers the tapered groove 364 from the mixing chamber 360 completely so if there is no aperture 382 and thus no fluid flow communication between the detergent inlet 336 and the valve body 346. Therefore, only water will be directed to the pump assembly 280 and spray tips.

As should be evident, rotation of the threaded knob 374 will provide an infinite number of detergent-to-water mixing ratios between the two extremes described above. In the preferred embodiment, however, the housing adjacent the knob 374 is marked with three concentration indicators: The first indicator is a water only or "rinse" position; second, a maximum detergent-to-water mixing ratio where the tapered groove 364 is fully exposed in the valve body 346; or third, a standard mixing ratio approximately half way between the extremes described previously. Of course, any variation of the indicated concentration positions can be employed by simply rotating the knob 374 to a position between any two indicated positions. The extreme positions are defined by the shape of the length of the thread 372, which includes opposite ends defining a pair of extreme positions for limiting the rotation of the knob 374 relative the cap 344.

In use, the knob 374 is intended to be positioned at the standard mixing ratio position for the vast majority of cleaning operations. When a high-traffic or heavily stained area is encountered, the knob 374 can be rotated to the maximum detergent position. If a clean-water rinsing operation is desired, then the knob 374 can be rotated to the water only position.

As best illustrated in FIG. 17, the mix of detergent and water is delivered via conduit 142 to the inlet port 282 for the pump priming system 280, which is disposed adjacent an inlet nose 288 of the pump 202. Thus, in operation, the drive motor 196 is activated, thereby imparting rotation through the drive shaft 198 to the interim drive shaft 200, and the pump 202 is primed, as will be explained below. Rotation of the interim drive shaft 200 causes the pump 202 to pressurize the fluid received from the fluid supply chamber 49, via the mixing valve assembly 310 and priming assembly 280. Further, rotation of the interim drive shaft 200 causes the agitation brush 206 to rotate. Pressurized fluid flowing from a pump outlet port 283 is conducted to the inline heater 54, a flow indicator 650, and then a plurality of conventional fluid dispensing nozzles 100 provided near the front of the base module 14 adjacent the agitation brush 206. The pressurized cleaning solution sprays down onto the surface to be cleaned in a fan-shaped pattern extending substantially the entire width of the base module 14. A fluid outlet port 74 of the in-line heater 54 is also fluidly connected to a conduit 144, which is integrated into the accessory hose 22. Fluid flows through the conduit 144 to the accessory hose cleaning tool (not shown) provided at the terminal end of the hose 22. With this configuration, pressurized cleaning solution is available on demand for both the accessory cleaning tool and the fluid dispensing nozzles 100.

Referring to FIGS. 2, 5 and 6, the drive shaft 198 of the drive motor 196 is interconnected to the interim drive shaft 200 of the centrifugal solution pump 202 by the stretch belt 204, which allows dry, high speed operation and operates as a clutch during brush roll-jam conditions. The interim pump shaft 200 is interconnected to the rotatably mounted agitation brush 206 by the timing belt 208, which allows a slower, high torque wet operation.

The interim pump drive shaft 200 functions as an interim drive providing a step down from the drive shaft 198 to the stretch belt 204 and the timing belt 208 to the agitation brush 206. Because of the step down structure, the drive motor 196 can be a high-efficiency, high-speed motor (30,000 plus rpm), which is stepped down at the interim drive pump shaft (approximately 12,000 rpm), and further stepped down at the agitation brush 206 (approximately 3,500 rpm).

Figure 8:
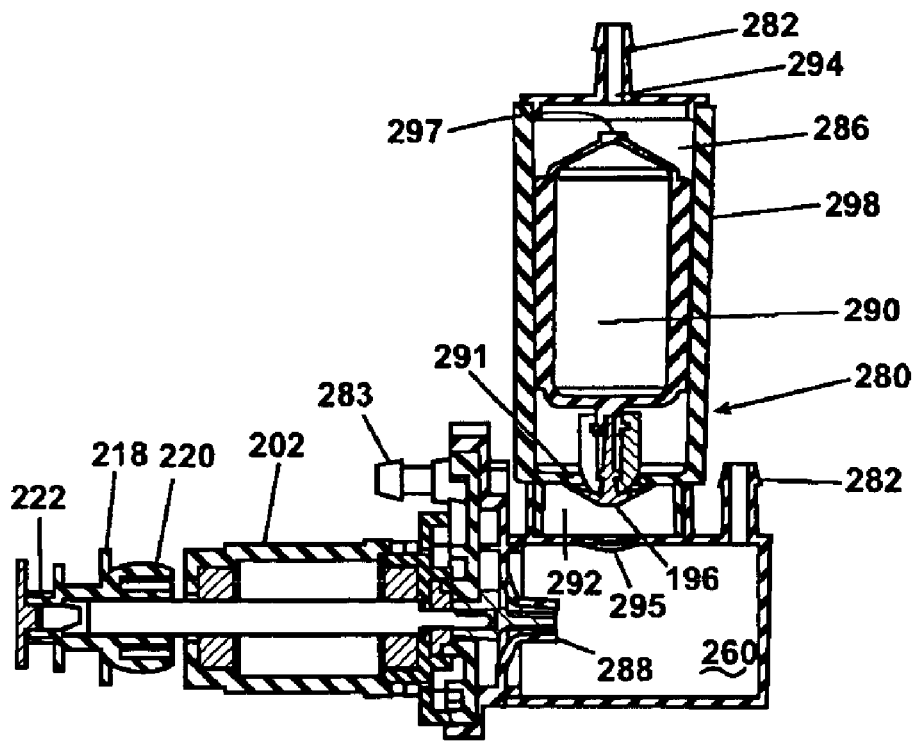
FIG. 8 is a side sectional view of the pump and pump priming assembly of the extraction cleaning machine of FIG. 1 with a plunger in a second position.

The pump shaft 200 includes the pair of coaxial spaced-apart pulleys 220, 222, as best seen in FIGS. 2, 8-9, for receiving each respective belt 204, 208, with a radially extending baffle 218 disposed between the pulleys so that the inwardly disposed stretch belt 204 is insulated from the wet environment in which the outwardly disposed timing belt 208 operates to drive the agitation brush 206. A barrier coplanar with the radial baffle 218 insulates the environments from each other as formed by the juncture of a pair of belt access doors 250, 252, as will be described below. The stretch belt 204 also functions as a clutch when the agitation brush 206 is jammed. Because the agitation brush 206 is connected to the interim pump drive shaft, and the interim pump drive shaft 200 is connected to the motor drive shaft 198, there must be some mechanism to provide relief to the motor 196 when the agitation brush 206 is jammed. This relief occurs at the drive shaft 198, which will turn inside the stretch belt 204 without rotating the stretch belt 204 when the interim pump shaft 200 stalls due to an agitation brush 206 jam.

As best shown in FIGS. 5-9, the timing belt 208 is structurally walled off from the stretch belt 204 by the barrier defined in part by the first belt access door 250, second access door 252, and the baffle 218. Removing the first belt access door 250 provides access to the timing belt 208 connecting the pump drive shaft 202 and the agitation brush 206. Access to the stretch belt 204 connecting the motor drive shaft 198 to the pump drive shaft 202 is provided only when the second belt access door 252, disposed within a brush housing 26, is removed. As illustrated in FIG. 2, the first belt access door 250, having a substantially L-shaped cross-section, includes a substantially vertical portion 266 and an angular, but substantially horizontal portion 264. As best shown in FIG. 9, the second belt access door 252 is rectangular, including an arcuate groove 254 in a front portion of a top surface 256 and a transversely extending arm 258 in a rear portion of the top surface. The arm 258 secures the second door 252 in place in the brush housing 26 and supports the pivot pin 462 on the pivot arm 460 of the floating brush assembly, as best shown in FIG. 5A.

More specifically, as shown in FIG. 2, the substantially vertical portion 266 of the first door 250 includes sides 240 that are received in a mated recess 242 surrounding an access aperture 236. Further, the first door 250 includes a depending flange 234 mounted to and spaced apart from a back portion of the door 250 and extending downwardly parallel to the door 250 and further including an arcuate groove 244 in a lower end. Each side of the substantially horizontal portion 264 includes a flexible tab 226 on each side that is received in a respective slot 228 disposed on the substantially horizontal face 222 of the upper housing 17 at each end of the access aperture 236 that receives the first belt access door 250. Thus, as the first belt access door 250 is slid into place, the depending flange 234 extends behind the upper housing 17 defining the access aperture 236, the sides are received in grooves 242 in the upper housing 17 surrounding access aperture 236, and the tabs 226 engage the slots 228 formed on the substantially horizontal portion 248 of the housing, whereby the first access door 250 is secured in place. The first access door 250 can be removed from the aperture 236 by flexing the tabs 226 inwardly to release them from their receiving slots 228. As shown in FIG. 9, the inner depending flange 234, including groove 244, mates with the radially extending baffle 218 between the pulleys 220, 222 on the shaft 200 and the arcuate groove 254 in the arm 258 of the second belt access door 252 to separate the motor/pump stretch belt 204 from the pump/agitator timing belt 208.

The pump priming system 280 is disposed adjacent the pump inlet nose 288, and draws from the fluid supply chamber 49 and the detergent tank 870. The fluid supply chamber 49 is under negative pressure because it is in fluid communication with the recovery chamber 48 and the vacuum source. Once primed, the pump 202 draws solution from the mixing valve assembly 310, and delivers the mixture to a spray tip 100 or an accessory tool 44 for spraying on the surface to be cleaned. When the pump 202 stops, the solution in the supply conduit is drawn into the low-pressure fluid supply chamber 49 and away from the pump 202. A centrifugal pump is incapable of developing sufficient pressure to prime itself by overcoming the negative tank pressure.

With reference to FIG. 7, a pump priming assembly 280 as described herein overcomes this problem. The pump-priming assembly 280, includes a priming chamber 260 for flooding the inlet nose 288 of the pump 202, an inlet port 282 for the chamber 260 that is fluidly connected to the nose 288 of the pump 202, and a pump outlet port 283. A vacuum port 284 is fluidly connected to the vacuum source 40, or a portion of the recovery chamber 48 that is in fluid communication with the vacuum source 40.

The pump-priming assembly 280 also includes a hollow valve body 298 having a plunger chamber 286 and a valve chamber 292. A valved opening 295 joins the valve chamber 292 and the priming chamber 260. An outlet opening 291 joins the valve chamber 292 and the plunger chamber 286. Also, an aperture 294 is formed at an upper inside portion of the valve body 298 to fluidly connect the valve body 298 and the outlet 284. An elongate buoyant plunger 290 having a top portion 297 at one end and a rubber umbrella valve 296 at the other is received for reciprocal movement inside the valve body 298. More specifically, the umbrella valve 296 reciprocates between the valved opening 295 and the outlet opening 291 and within the valve chamber 292. Thus, the plunger chamber 286 substantially houses the elongate plunger 290, while the valve chamber 292 houses the umbrella valve 296, which is coaxially attached to the elongate plunger 290 for reciprocal axial movement therewith.

In operation, the pump 202 will be primed with fluid from the fluid supply chamber 49 by activating the pump 202 and the vacuum motor 196, which will exert negative pressure on the vacuum outlet 284, thereby drawing any air out of the priming chamber 260 and plunger chamber 286, and further overcoming the negative pressure exerted on the fluid in the conduits 140, 142 connecting the fluid supply chamber 49 to the pump 202. The air will be drawn through the valve body 298 into the vacuum impeller fan housing 510. Preferably, the weight and dimension of the plunger 290 is coordinated with the amount of negative air pressure applied to the pump priming assembly 280 from the vacuum source 40 so that the negative air pressure applied to the plunger chamber 286 is insufficient by itself to draw the plunger 290 upwardly and seal the outlet opening 291.

As the vacuum motor operates to draw the air from the system, fluid fills the chamber 260 and enters the chambers 292, 286. Eventually, the fluid level will fill the valve chamber 292 and rise inside the plunger chamber 286, pushing the plunger 290 upwardly causing the umbrella valve 296 to seal the outlet opening 291, thereby preventing water from rising further in the plunger chamber 286 and being sucked into the vacuum source 40. Because the pump nose 288 is submersed at this point, water enters the pump 202 and primes it. As the pump 202 sucks water from the priming chamber 260, the plunger 290 is drawn downward in the plunger chamber 286, and the umbrella valve 296 descends therewith in the valve chamber 292 to activate a seal in the opposite direction, as the umbrella valve 296 seats in the valved opening 295. The reverse seal prevents air from being sucked into the priming chamber 260 from the fluidly connected chambers 292, 286. This cycle repeats each time a trigger 432 in the closed loop handle 18 is activated or the unit is powered off and on again. Once the reverse seal has been established, the chamber 260 should remain filled, the nose 288 of the pump 202 flooded, and, thus, the pump 202 sufficiently primed for normal operation.

From the pump 202, the pressurized fluid flows through a conduit 146 to a T-connector 150 for supplying both floor nozzles 100 and an accessory tool 44. The T-connector 150 includes outlets 152, 154 for supplying both the in-line block heater 54, and a floor spray nozzle 64, or an accessory cleaning tool 44, respectively. Specifically, the first outlet 152 of the T-connector 150 is connected to fluid conduit 148 that is adapted to supply non-heated and pressurized cleaning solution to a spray nozzle (not shown) on an accessory cleaning tool (not shown) mounted at the terminal end of the accessory hose 22. The second outlet 154 is fluidly connected via a conduit 138 to the in-line block heater 54, shown best in FIG. 18.

Figure 18:
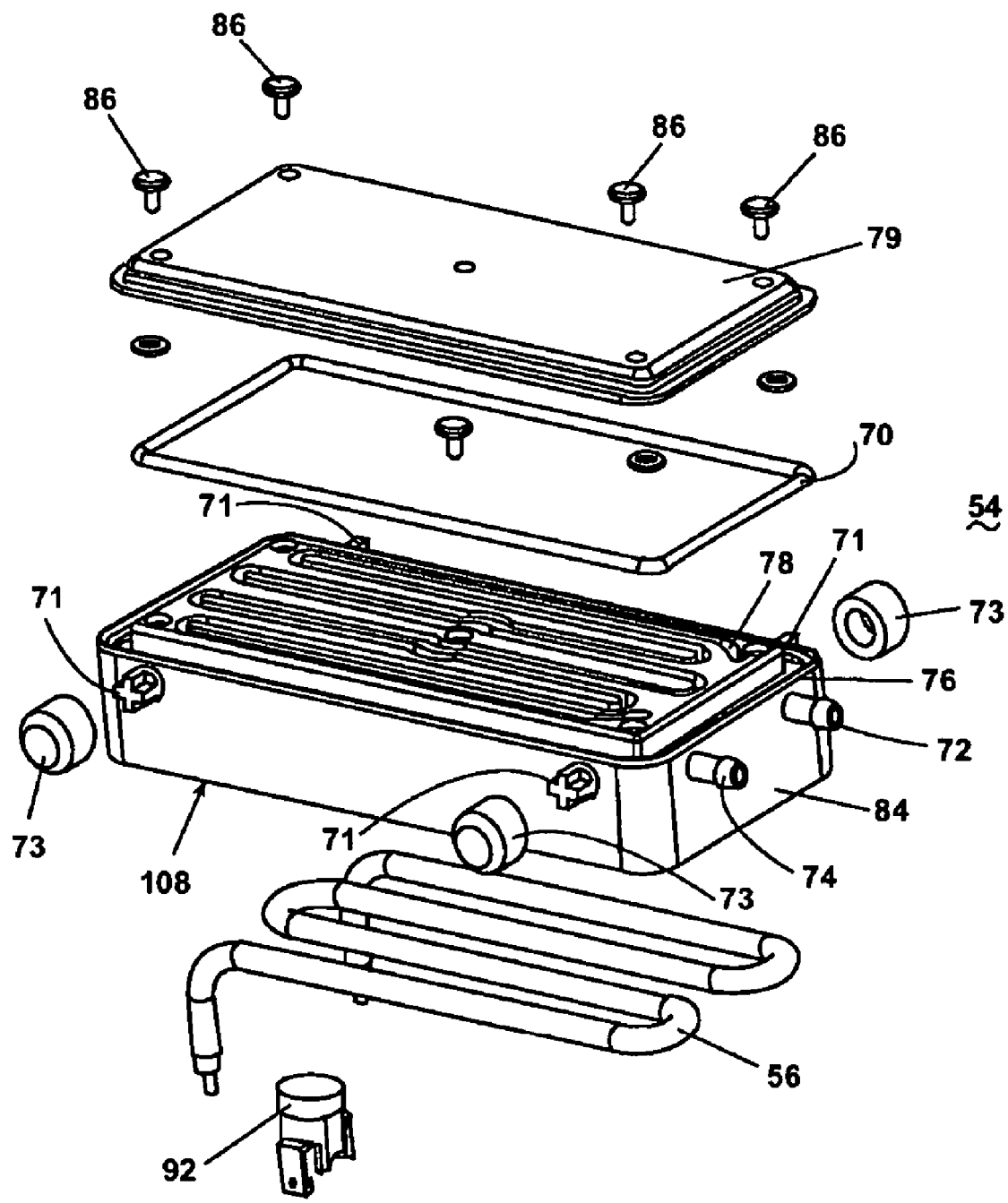
FIG. 18 is an exploded view of the in-line heater of the extraction cleaning machine of FIG. 1.

The in-line block heater 54 receives pressurized cleaning solution from the pump 202, via the T-connector 150, and further has a heating element 56 that is electrically connected to a source of electricity (not shown). As shown in FIG. 18, the heater 54 includes an aluminum body 84 having an inlet port 72, an outlet port 74, a heating element 56 disposed within the aluminum body 84, and a serpentine channel 78 formed in a top face 76 of the block heater 54. A cover 79, via a gasket 70 seals the top face 76, and thus the channel 78, and fasteners 86. The heating elements 56 located in the aluminum body 84 of the block heater 54 uniformly heat the fluid as it passes through the channel 78 across the block heater 54. The channel 78 includes an outlet port 74 through which heated fluid exits the channel 78 to the conduit 136. The heater 54 is mounted within the handle assembly 16 via shafts 71 and plugs 73 to bosses (not shown) in the handle assembly 16.

The size of the aluminum body 84 and the heating elements 56 are selected to effectively deliver approximately 500 watts of power to the heating block 54 to heat the cleaning fluid in the serpentine channel 78 to a temperature of about 150-180 degrees. during the dry cycle of the cleaner and apply that heated cleaning fluid during the wet cycle, as will be described more completely below. Use of approximately 500 watts of power for the heater 54 leaves sufficient power from a convention 120 volt power line for the vacuum motor, agitation brush and pump while heating the solution to the target temperature with a minimal warm-up time of approximately one minute. To enhance this process, hot tap water (defined as approximately 110-120 degrees Fahrenheit) can be dispensed into the reservoir from a household tap. The solution that passes through the in-line block heater 54 is heated approximately 30 to 35 degrees to reach a target temperature of approximately 150 degrees Fahrenheit. A thermostatic controller is preferably mounted to a face of the heater 54 to limit the block temperature to 180 degrees Fahrenheit. In one embodiment, the solution that passes to the upholstery attachments does not get the temperature boost. A non-heated solution is generally preferred for upholstery, which is more sensitive to heat damage. Alternatively, both on-the-floor and above-the-floor cleaning operations use heated cleaning fluid. In a further variation, the above-the-floor tool selectively uses heated cleaning fluid in its cleaning operation. Of course, the heater is separately switched and can be deactivated for non-heated operations.

Powered by approximately 500 watts, the in-line block heater 54 will boost the temperature of water 16 degrees Fahrenheit on a continuous basis at 850 milliliters a minute. Since an approximately 30-degree temperature increase is desired, it is necessary to store heat energy in the aluminum body 84 of the in-line heater block 54 during the dry cycle and deliver it to the solution during the wet cycle. The recommended cleaning process with the extraction cleaning machine 12 described herein is two wet strokes, defined as movement of the extraction cleaning machine 12 while cleaning solution is sprayed from the nozzles 100 to the carpet being cleaned, followed by two dry strokes, defined as cleaning solution and dirt removal through the suction action of the suction nozzle 34. There is thus an opportunity to effectively deliver 1000 watts of heat energy to the solution by storing 500 watts during the dry cycle. Furthermore, a typical cleaning stroke is about 10 seconds maximum, so the heat reservoir must have the capacity to store 500 watts for approximately 20 seconds, which equals approximately 10,000 joules of energy. If a higher temperature was desired, for example, up to 200 degrees Fahrenheit, a greater time period, for example, 30 seconds, may be allowed or a larger block may be used to allow cleaning fluid to remain in the block longer.

The heating element 56 is embedded into the aluminum body 84, which is of ample mass to store the energy at some temperature below the boiling point of water (212 degrees Fahrenheit). The larger the mass of aluminum, the smaller the differential temperature needs to be to store the required energy. On the other hand, the larger the mass, the longer the initial heat-up period becomes. The heater 54 according to the invention heats the cleaning fluid to a temperature between 130 degrees and 180 degrees Fahrenheit, and preferably between 150 degrees and 180 degrees Fahrenheit. There is an optimal size of aluminum block that is calculated based on a thermostat shut-off point of 180 degrees Fahrenheit. This block temperature keeps stagnant water from boiling and also heats the solution that passes through the serpentine channels 78 on the block face 76 to a temperature between 150 degrees and 180 degrees Fahrenheit, and typically approximately 150 degrees Fahrenheit during suggested use, before leaving the in-line block heater 54 through outlet port 74. In a preferred embodiment, it has been found that an aluminum block having a size of about 3" times 6.5" times 1.25" and a mass of about 0.8 Kg forms a suitable block for heating a solution to the desired temperature of about 180 degrees Fahrenheit within about one minute start up time and about 30 seconds during normal operation and for storing about 10,000 joules of energy. The block is made with a serpentine channel essentially filling one face of the block for the solution conduit and has an electrical resistance element of a serpentine configuration embedded in the block to continuously deliver about 500 watts of electrical heating energy to the block.

In operation, when the heater 54 is initially energized electrically, it heats to its thermostatically controlled shut-off temperature in approximately one minute. A temperature sensor or thermostat 92 is included on a lower face 108 of the body 84. During use, the cleaning solution passes through the heating channel 78 in the in-line block heater 54, drawing energy from the aluminum body 84 and from the heating element 56 embedded therein adjacent the underside of the solution channel 78. The aluminum body 84 cools somewhat during the 20 second cycle and reaches a temperature slightly below its starting temperature. During the dry cycle, the aluminum body 84 is reheated to its previous temperature of approximately 180 degrees Fahrenheit. The heated solution leaving the in-line block heater 54 is applied to the carpet after passing through the conduit 136 to the flow indicator 650, and the conduit 134 from the indicator 650 to the fluid dispensing nozzles 100, which are positioned between the agitation brush 206 and the suction nozzle 34.

In an alternative embodiment of the invention, a heater can be used to heat exhaust air from a fan directed to a fluid distributor in a discharge nozzle. For example, in U.S. Pat. No. 5,500,977 to McAllise et al., incorporated herein by reference, the cleaning solution distributor is position within the discharge nozzle and exhaust air from the fan exiting through the nozzle is divided into two airstreams, each disposed oppositely relative the fluid distributor. As the airstreams approach lips formed at the exit end of the discharge nozzle, the airstreams are directed toward one another and converge immediately downstream of an exit opening of the discharge nozzle. Cleaning solution flows by gravity from the fluid supply tank and into the turbulent airflow created by the converging airstreams exiting the discharge nozzle. According to one embodiment of the invention, the airflow is heated by a heater including a heating element disposed in the airstream, either before the airstreams are separated or while the airstreams separately traverse along opposite sides of the fluid distributor.

For this latter embodiment of the invention, the size of the heating elements are selected to effectively heat the air, and thus the cleaning fluid, to a temperature between 130 and 180 degrees Fahrenheit. Again, use of approximately 500 watts of power for the heater leaves sufficient power from a conventional 120 volt power line for the vacuum motor and agitation brush while heating the solution to the target temperature with a minimal warm-up time of approximately one minute to allow the heating element to reach operating temperature. To enhance this process, hot tap water (defined as approximately 110-120 degrees Fahrenheit) can be dispensed into the fluid supply tank from a household tap. The fluid that passes through the nozzle need only be heated approximately 10 degrees to 30 degrees to reach a target temperature of approximately 150 degrees Fahrenheit. A thermostatic controller is preferably mounted to the heater to limit the heating element temperature to 180 degrees F.

Figure 20:
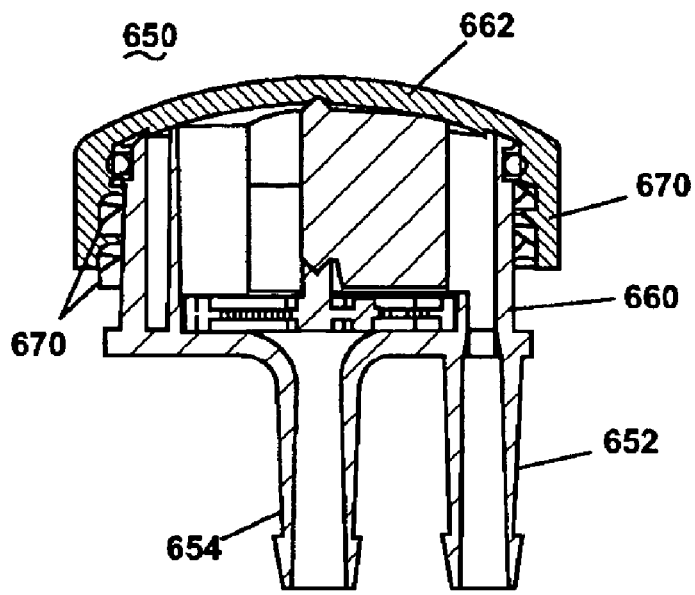
FIG. 20 is a side sectional view of the fluid flow indicator of FIG. 19.
Figure 19:
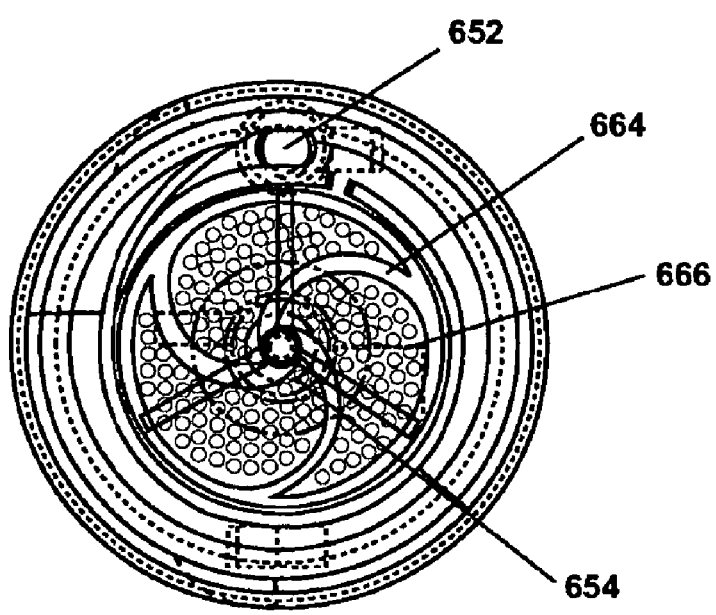
FIG. 19 is a top view of the fluid flow indicator of the extraction cleaning machine of FIG. 1.

The flow indicator 650 is placed in the fluid flow path to provide a visible indication of fluid flow to the fluid dispensing nozzles 100. As shown in FIGS. 19 and 20, the flow indicator 650 is mounted to an upper end of the arm 651, which extends upwardly from the motor housing 500 in the base module 14. An opening 653 in the upper housing portion 17 receives the flow indicator 650 when that portion is mounted to the lower housing portion 15. Alternatively, the flow indicator 650 can be mounted to the handle assembly 16 in a position to be easily viewed by the operator. The flow indicator 650 comprises a circular body 660 having an inlet 652, outlet 654, and a clear lid 662 having a threaded lip 670. As seen in FIG. 20, the indicator body 660 preferably houses an impeller 664 superjacent a screen filter 666, both of which are superjacent the fluid inlet 652 and the fluid outlet 654. The fluid inlet 652 is near the periphery of the body 660 and the outlet 654 is disposed centrally. The lid 662 has threads 670 on the outside of the body 660.

The lid 662 is clear, preferably made from the transparent plastic, so that the user can see the fluid flowing into the indicator 650 and rotating the impeller 664. Alternatively, one or more articles, such as a ball or disk can be mounted within the indicator body 660 and subjacent the lid 662, whereby the operator can determine if there is fluid flow by movement of the article. Further, while a body 660 mounting an impeller 664 is the preferred flow indicator, other suitable indicators include a float ball, spring plunger, or gravity plunger.

A float ball-type flow indicator can include a flow conduit having a T-shaped portion having a transversely oriented tube extending from a cylindrical body defining the fluid flow path. A ball or other article can be mounted at the junction of the transverse tube and cylindrical body for reciprocation within the transverse tube. When fluid is flowing through the cylindrical body, the ball or article moves into the transversely oriented tube, whereupon it is visible to the operator and indicates proper fluid flow.

A spring plunger-type flow indicator can include a light spring to bias a ball, plunger, or other article in a housing having a window visible to the operator. With fluid flowing through the housing, the ball, plunger, or other article moves against the bias of the spring to become visible in the window, thereby indicating to the operator that fluid is flowing properly. Alternatively, the ball, plunger, or other article can always be partially visible, and include portions corresponding to proper fluid flow, such as green for proper fluid flow and red for no fluid flow, whereby fluid flow causing movement of the ball, plunger, or other article against the spring bias would change the portion of the ball, plunger, or other article visible to the operator through the window, thereby indicating proper fluid flow.

A gravity plunger-type flow indicator can include a housing having a ball or other article mounted on a ramp adjacent a window. As fluid flows through the housing, the ball or other article is forced up the ramp, whereby it is visible to the operator to indicate proper fluid flow. Alternatively, like that for the spring plunger, a portion of the ball or other article previously not visible through the window can be visible when fluid flows through the housing to indicate to the operator that fluid flow is proper.

After pressurized fluid leaves the in-line heater 54, it enters the inlet 652 of the flow indicator 650 under pressure, such that it causes the impeller 664 to rotate in a clockwise direction as pictured in FIG. 20. The fluid rotates the impeller 664 until it reaches the center of the body 660, where it is forced through the screen filter 666 and outlet 654 by the continuous flow of pressurized fluid into the flow indicator body 660.

The screen filter 666 prevents any debris from exiting the flow indicator 650. Any debris trapped by the screen filter 666 remains visible to the operator through the lid 662. The operator can simply clean the flow indicator 650 by removing the threaded lid 662 and lifting the screen filter 666 from within the body 660 for cleaning. The screen filter 666 preferably includes apertures defined by the screen of a diameter smaller than the diameter a passageway through the spray nozzle 64. This is of particular importance if the spray nozzle is not easily serviceable by the operator or a service provider. Further, when using an in-line heater 54, a screen filter 666 is a precaution against plugging the passageway through the spray nozzle 64 from scales forming in the heater 54.

Figure 12:
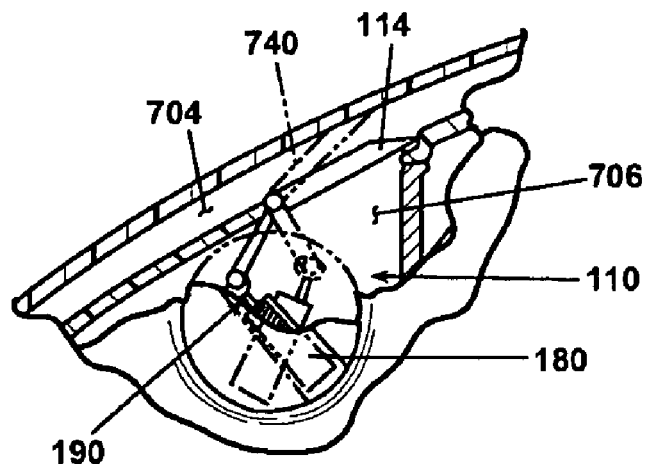
FIG. 12 is a partial side sectional view of a diverter valve with the valve plate shown in a first position and in phantom for a second position for the extraction cleaning machine of FIG. 1.
Figure 13:
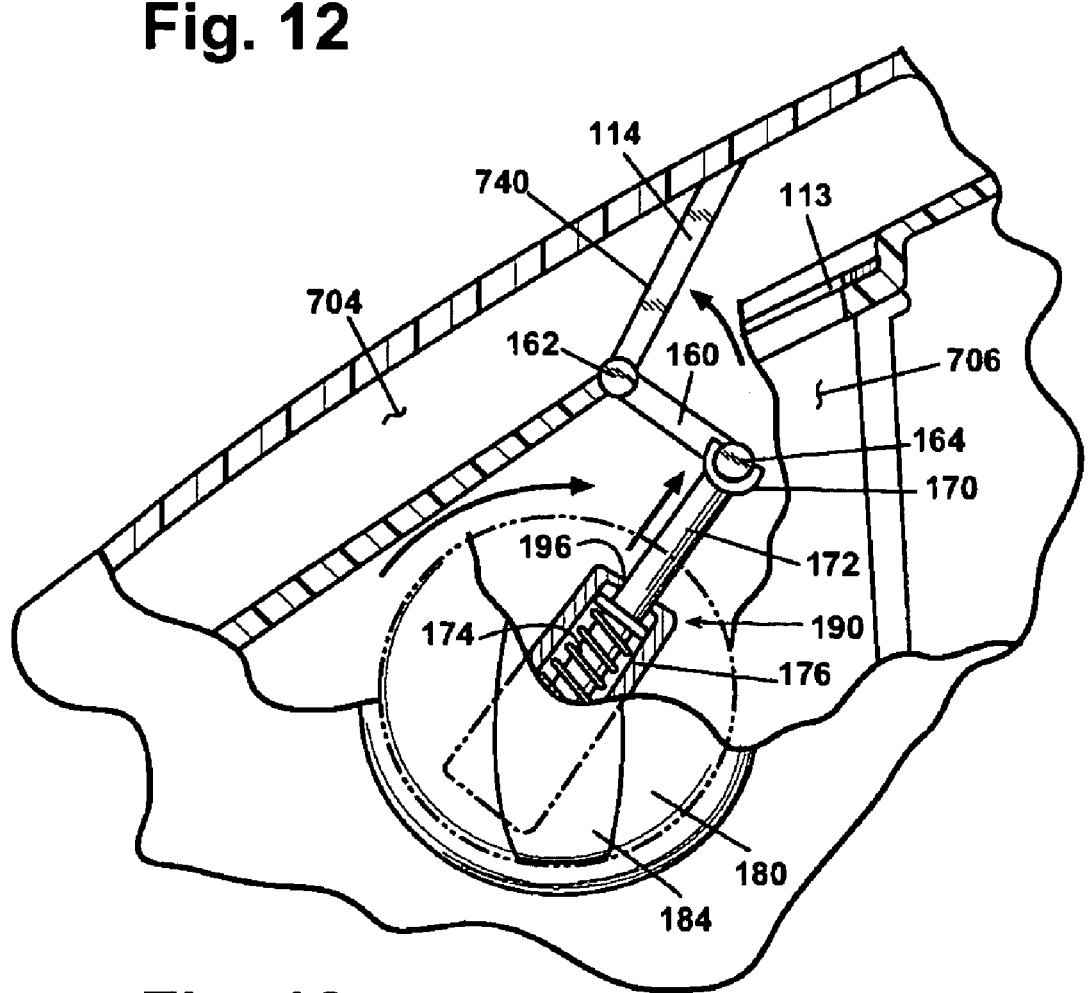
FIG. 13 is a partial side view of the valve assembly of FIG. 12 with the valve plate in the second position.

After the cleaning solution has been applied to the surface to be cleaned via the spray nozzle 64, or multiple spray nozzles 64, the used cleaning solution and entrapped dirt are removed from the surface being cleaned through the suction nozzle 34, which opens into the first working air conduit 704 extending along the top of the base module 14 between the upper housing portion 17 and the transparent facing 19, as best shown in FIGS. 2, 12 and 13. The first working air conduit 704 terminates at a junction 740 with the second working air conduit 706, which is defined by passageway communicating the vacuum source 40 with the suction nozzle (not shown) on the distal end of the accessory hose 22. With this configuration, the drive motor 196 creates the vacuum source 40 that is applied to the surface being cleaned through either working air conduit 704, 706.

The terminal end of the accessory hose 22 is secured to a hose mounting 702 at a distal end of the accessory hose intake duct 540 partially defining the second working air conduit 706, which extends, in a U-shape, to the junction 740 with the working air conduit 704, as best seen in FIGS. 1 and 12. A flapper valve 114 pivots at the junction 740, disposed in the base module 14, to alternatively close the first working air conduit 704, between the suction nozzle 34 and the air/water separator lid 700, and the second working air conduit 706 between the hose mounting 702 and the air/water separator lid 700, as best shown in FIGS. 12 and 14. The valve 114 seats on a gasket 113 about the junction 740. When the user is cleaning floors, the flapper valve 114 is in position to direct all of the working air generated by the vacuum source 40 to the suction nozzle 34. However, when the user desires to use the accessory hose 22, the flapper valve 114 is pivoted to an accessory hose position, as shown in phantom lines in FIG. 12. In this position, the flapper valve 114 seals the working air conduit 704 and connects the accessory hose 22 to the vacuum source 40. Regardless of whether the machine is operating for on-the-floor cleaning or accessory hose cleaning, all of the dirt and water recovered are directed into the recovery chamber 48.

An over-center diverter valve assembly 110 including a movable flapper valve 114 in the junction 740 between working air conduits 704, 706, and actuable by an actuator knob 180, on the extraction cleaner housing controls the diversion between the conduits 704, 706. More specifically, the actuator knob 180 to flapper valve 114 linkage assembly, as shown best in FIGS. 12 and 13, includes an arm 160 attached at an upper end to the flapper valve 114, which includes a transversely extending support axle 162, and at a lower end to a cup-shaped bearing 170 on the end of a piston 172. The support axle 162 is mounted for rotation in the junction 740 between the working air conduits 704, 706, whereupon the valve can pivot between two extreme positions, as shown in FIG. 12. At a lower end, the arm 160 ends in a transversely extending leg 164, which moves relative the center of the actuator knob 180 depending on the position of the actuator knob 180 when turned by the user.

The actuator knob 180 includes a handle 184, and a piston assembly 190 on a back face. The piston assembly 190 includes piston housing 176, piston 172, and a compression spring 174. The piston 172 slides coaxially in the housing 176, and is biased upwardly by the spring 174 mounted therein. Specifically, the spring 174 biases the piston 172 out of an opening 196 in a top portion of a tubular piston housing 176.

When the actuator knob 180 is turned by the user, the lower leg 164 moves closer or farther from the knob rotation axis, thereby increasing or decreasing the distance between the lower leg 164 and the axis. As this distance increases, the spring-biased piston 172 forces the lower leg 164 upwardly. The arcuate path of the lower leg 164 as it travels over the center of the knob axis rotation imparts rotation to the flapper valve 114 about the fixed support axle 162. The rotation is in response to the changed distance of the mounting of the piston assembly 190 from the actuator knob 180 rotation center. As it moves away from the center, the piston 172 expands at an angle relative to the support axle 162. The lower leg 164 of the L-shaped arm 160 must rotate in the cup-shaped bearing 170 at the end of the piston 172 because the axle 162 is fixed. Thus, the flapper valve 114 rotates in response to the angle of the joint between the expanded piston 172 and the lower leg 164 (not shown). Tabs formed on the back face of the knob 180 limit the rotation of the knob so as to effectively define two positions correlating to the open conduit 704/closed conduit 706 position and the open conduit 706/closed conduit 704 positions.

The diverter valve assembly 110 described above permits the upright extraction cleaner fluid dispensing mechanism to be used as a pre-spray applicator. That is, by diverting the suction to the accessory hose 22, and applying solution through the fluid dispensing nozzles 100 adjacent the agitation brush 206, the upright extraction cleaner 12 can be used to dispense fluid and agitate the carpet without having the applied solution immediately extracted from the carpet through the suction nozzle 34 adjacent the agitation brush 206 and fluid dispensing nozzles 100. Thus, the fluid application system 950 remains operable regardless of the position of the flapper valve 114.

As best seen in FIGS. 12-14, 14A and 14B, the working air conduit 704 terminates at the junction 740 with the working air conduit 706. The junction 740 connects the selected conduit 704, 706 to a U-shaped inlet 780 to the air/water separator lid 700, which is secured to the tank assembly 50 by the rotatable handle 790. Thus, from the U-shaped inlet 780 to the air inlet 764, the air path entering the lid 700, as shown in FIG. 14, is substantially horizontal.

From the tank air inlet 764, the air/water/debris mixture is conducted into a center portion of a tank lid separation chamber 750, where the cross-sectional area is greater than the flow conduits 704, 706, junction 740, and inlets 780, 764 to slow down the velocity of the air stream for gravity separation of the air from the liquid, dirt and debris. Because the lid 700 is formed of a transparent plastic material, the user can easily observe the dirt and water passing up through the intermediate flow conduit and the fluid level inside the tank assembly 50.

The substantially rectangular chamber 750 is defined by a transparent lower portion 752 substantially surrounded on all sides by a transparent side wall integral with the underside of the air/water separation lid 700. The chamber 750 is further defined upwardly by a transparent face 756 of the lid 700. The air inlet opening 764 is disposed adjacent an air outlet opening 764. The underside of the face 756 further includes a circular downwardly extending shroud 770 adapted to surround in part the open flexible bladder filling spout 124, which is retained by the baffle plate 800 and positioned adjacent the separation chamber 750.

The working air flow enters the hollow interior of the separation chamber 750 via the air and water inlet 764 and passes horizontally beneath the transparent face 756 to a rear wall defining a first diverter baffle 755 at which it is redirected 180 degrees forwardly through an opening 751 to a rectangular, extended outlet passage 757 formed in a lower, intermediately disposed portion of the bottom wall 752 at which it is again redirected 180 degrees by a second diverter baffle 759 defined by a front wall disposed forward, transverse, and beneath the opening 751. The air flow then exits the separation chamber 750 through an inlet outlet 760, whose position is dictated by tank geometry, as the preferred position is a "dead spot" in tank air flow to maximize air/water separation. From here, the water is directed into the interior of the tank between the 750 and the baffle 800, and away from the separation chamber 750 to the air exit 762. It is significant that all air/water separation occurs above the baffle plate 800, thus minimizing interference with the recovered water (i.e., no foaming) in the area disposed below the baffle plate 800. This characteristic is necessitated by the inclusion of a flexible bladder disposed in the tank recovery chamber.

In summary, air and water enters the inlet 764, from where it is channeled to the air/water separation chamber 750 in which it strikes the first diverter baffle 755, is redirected approximately 180 degrees and through the opening 751 to the outlet passage 757, where it is again redirected approximately 180 degrees by second diverter baffle 759, and then passes into the interior of the recovery chamber 48. The multiple changes in direction as well as the expansion in volume in the separation chamber 750 facilitate the separation of water and debris from the air. As best seen in FIG. 14, the air, free of water and debris, exits the tank via rectangular outlet 762, and traverses a horizontal conduit 774 to a vertical outlet conduit 776, which is disposed adjacent the horizontal inlet 780 leading air into the separation lid 700 via air inlet opening 764. Thus, the air inlet 780 and air exit conduit 776 are vertically adjacent. The air exit conduit 776 feeds the U-shaped conduit 540, which is connected to the vacuum source 40, as best seen in FIGS. 1 and 14.

As best shown in FIG. 3, a fluid containment baffle 800 is mounted inside the hollow interior of the tank assembly 50 immediately below the separation lid 700, and is intended to prevent the excessive sloshing of the recovered dirt and liquid and also contain any foam generated inside the tank assembly 50. The planar baffle 800 comprises a flat body 810 mated to snap fit within the tank housing 46. Further, apertures 820 are formed through the plate 800 for receiving the recovered fluid into the recovery chamber 48 of the tank assembly 50. A circular aperture 826 retains the bladder filling spout 124 in position by preventing it from floating upwardly in the tank and further locking the bladder in place while giving it mechanical support.

The baffle plate 800 is snapped into place by retainers 830 that are received on tabs 836 formed on the interior of tank housing 46 to secure the baffle plate 800 in the tank assembly 50. The apertures are centrally mounted in the baffle plate 800 to prevent air movement, while facilitating fluid and debris deposits, into a lower portion of tank assembly 50 so that the recovered fluid remains undisturbed. Further, the baffle plate 800 is closed at the edges to prevent sloshing of the recovered fluid into an upper portion of the tank assembly 50 during movement of the cleaning machine 12.

Figure 14A:
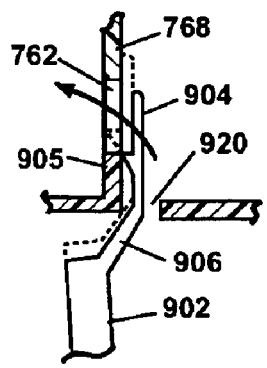
FIG. 14A is a partial side view of a closure plate in three positions relative an air exit from the air/water separator lid of FIGS. 13 and 14.
Figure 14B:
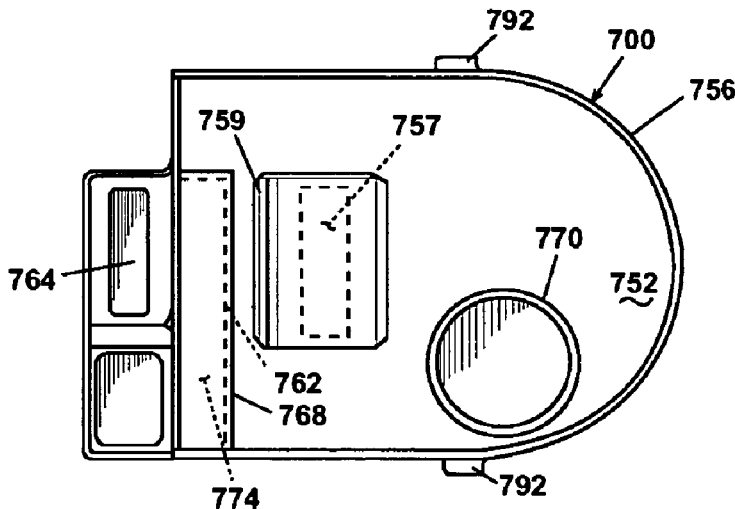
FIG. 14B is a partial sectional view taken along lines 14B-14B of FIG. 14.

As shown best in FIGS. 14 and 14A, a float assembly 900 extends through the baffle plate 800 for moving an integral door across the exit port of the tank to prevent recovered solution from entering the tank exhaust in an overfill condition. As best shown in FIG. 3, the flag-shaped float assembly 900 comprises a buoyant base 902 and a closure plate 904 interconnected to one another by a support plate 906. The closure plate 904 is dimensioned to fully seal an exit to the tank to prevent recovered solution from entering the tank exhaust in an overfill condition. The closure plate 904 further includes a pair of triangular projections 905 extending transversely from a substantially vertical front face. The front face engages the wall 768 defining the air exit 762 from the tank, and the projections 905 cam along that wall 768 to prevent premature and partial closing of the exit 762 as the plate 904 is drawn against the exit by the suction therethrough.

The float assembly 900 is limited primarily to vertical movement with respect to the tank assembly 50, with the closure plate 904 positioned above the fluid containment baffle 800 and the buoyant base 902 positioned below the baffle 800. A narrow slot 920 is provided in a front portion of the baffle 800 through which the support plate 906 of the float extends. Further, a housing 910 secured to the interior of the tank housing 46 guides the buoyant base, and thus the float assembly 900, in a vertical direction. In the assembled position, the closure plate 904 is positioned above the baffle 800 and the buoyant base 902 is positioned below the baffle 800.

As the recovered fluid within the tank assembly 50 rises, the float assembly 900 will also rise until, eventually, the closure plate 904 nears the tank exhaust exit opening, at which point the closure plate 904 is sufficiently drawn against the exit 762 opening by the suction from the vacuum motor to close the airflow therethrough. As discussed above and illustrated in FIG. 14A, the triangular projection 905 extending from the front face 907 ensure the closure plate is not drawn against the exit 762 prematurely, which would result in a partial closure of the opening. Rather, the projections 905 ride the housing defining the opening until drawn into total closure of the exit 762. Once this happens, the pitch of the operating vacuum changes sufficiently to warn the user that the fluid recovery chamber 48 is full and must be emptied.

As best shown in FIG. 3, a drain plug 850 seals an aperture through a wall in a lower portion of the rigid housing 46 of the tank assembly 50 through which recovered fluid can be removed without tipping the tank assembly 50, and also through which the tank assembly 50 can be cleaned by flow-through rinsing. More specifically, a rounded wall of the rigid tank housing 46 includes the drain plug 850 mounted in an aperture 854. A bottom portion of the aperture 854 is substantially planar with a bottom wall 860 of the tank housing 46. Thus, any recovered fluid will flow through the aperture 854 when the drain plug 850 is removed therefrom. Further, the tank assembly 50 can be cleaned without having to tip the tank assembly 50 since the drain plug 850 can be removed for flow-through rinsing. This feature is particularly important because the flexible bladder 120 defining the fluid supply chamber 49 remains in place while the recovered fluid is drained from the recovery chamber 48. The drain plug 850 eases cleaning of both the interior of the rigid housing 46 and the exterior of the flexible bladder 120.

Figure 21:
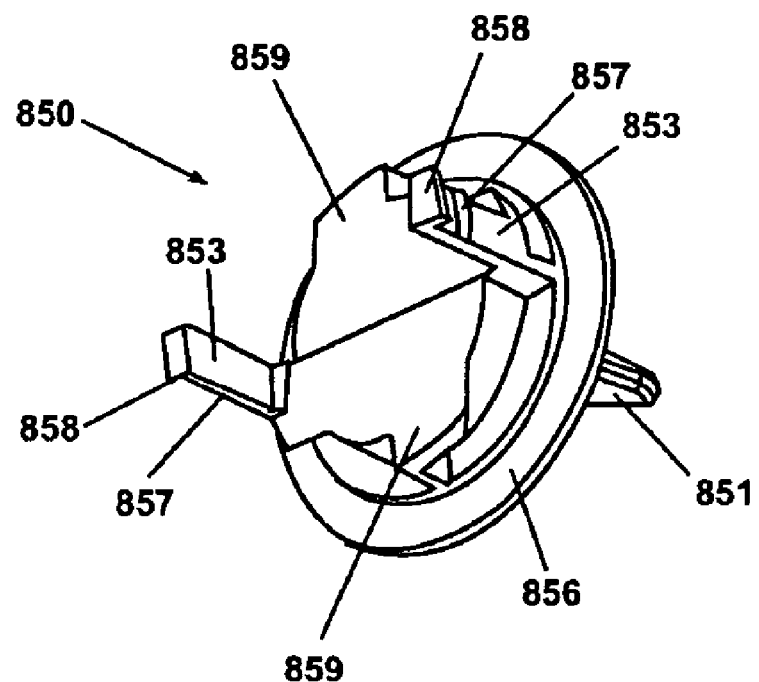
FIG. 21 is a bottom perspective view of a drain plug of the base module and tank assembly of FIG. 3.
Figure 22:
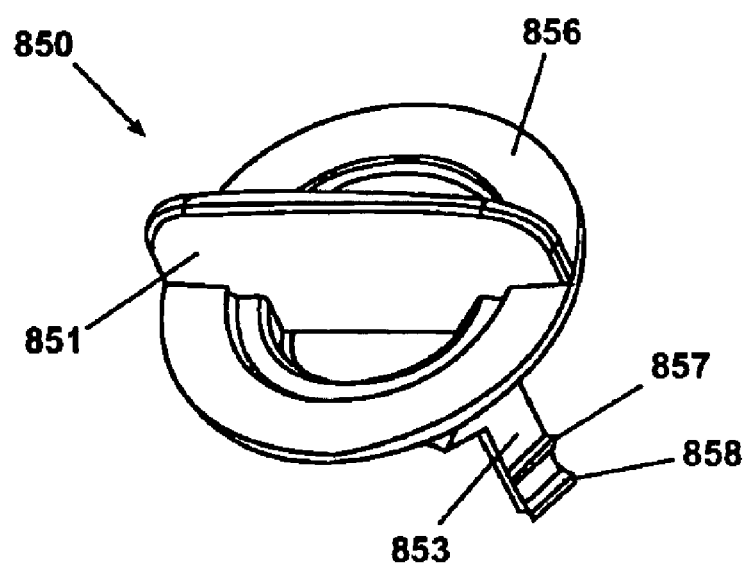
FIG. 22 is a top perspective view of the drain plug of the base module and tank assembly of FIG. 3 and illustrated in FIG. 21.

As best shown in FIGS. 21 and 22, the drain plug 850 comprises a knob 851 extending through a circular washer 856 which mounts two resilient legs 853. The resilient legs 853 are located diametrically on a lower face of the washer 856 and comprise, on an outer face of each leg 853, an upper ridged protrusion 857 and a lower ridged protrusion 858. The lower ridged protrusion 857 is rounded so that it forms a detent mechanism with the opening in the tank wall. The upper ridged protrusion 857 has a slanted outer surface so that the legs are resiliently deflected as the drain plug is installed into the aperture 854, and has a sharp return inner surface so that the return inner surface will bear against the inner surface of the wall of the tank housing as the drain plug 850 is pulled outwardly of the tank. Thus, the drain plug is easily installed into the aperture 854, but is retained therein by the inner surface when the plug is removed from the aperture 854 for draining the tank. In the normal, closed position of the drain plug 850, the lower face of the washer 856 abuts the rear wall of the tank housing 46. The drain plug further has a pair of retaining flanges 859 which fit behind the wall of the tank adjacent the aperture 854. To this end the aperture has indented slots to receive the flanges 859. To drain fluid through the aperture 854, the drain plug 850 is rotated a quarter turn counterclockwise and pulled toward the rear of the upright extraction cleaning machine 12 a suitable distance such that the upper ridged protrusion 857 of the resilient legs 853 moves past the rear wall of the tank housing 46 and the lower ridged protrusion 858 of the resilient legs 853 abuts the inner wall of the tank housing 46. The diameter of the aperture 854 is less than the normal distance between the resilient legs 853 so that the legs 853 are pressed inwardly and thereby prevent the drain plug 850 from separating from the tank housing 46. The drain plug 850 is restored to its normal, closed position by pressing the drain plug 850 toward the front of the upright extraction cleaning machine 12 to cause the washer 856 to abut the rear of the tank housing 46 and turning the drain plug 850 one-quarter turn clockwise.

In use, the operator removes the tank assembly 50 from the well 36 in the base module 14, and further removes the lid 750 from the tank housing 46 to expose the open filling spout 124 of the flexible bladder 120, whereupon the bladder 120 can be filled with water from a source such as a household tap. Next, the user replaces the lid 750 and swings the handle 790 upwardly to seal the lid 750 to the tank housing 46, whereupon the tank assembly 50 can be carried to the well 36 of the base module 14 and replaced therein for use. Upon replacement, the valve member 82 in the valve mechanism 80 mounted in the bottom surface 862 of the tank housing 46 is displaced by the projection 94 in the valve seat 88, whereupon the clean water in the fluid supply chamber 49 is in fluid communication with the fluid application system 950. The detergent supply tank 870 is removed from its well 884, and then its cap 880 is removed so that the tank 870 can be filled with concentrated detergent. Once the supply tank 870 is filled and the cap 880 is replaced thereon, the supply tank 870 is replaced in its well 884, whereupon its valve mechanism 882 permits the flow of concentrated detergent through the conduit 318 to the mixing valve assembly 310.

The extraction cleaning machine 12 can then be powered by activating an main power switch 534 disposed on the handle assembly 16, whereby the motor 196 is activated, and the vacuum source 40 for the working air flow conduits 704, 708 are operable. Further, the heater 54 is separately operable by a heater power switch 536 when the main power switch 534 is in the "on" position. The user then supplies pressurized cleaning solution to the agitation brush 206 by depressing the switch 432 in the closed loop grip 18, whereupon solution flows to and through the fluid dispensing nozzles 100. As the user applies cleaning fluid and agitates the surface being cleaned with the brush 206, the user pushes the cleaning machine 12 forward and rearward, with the forward strokes being defined as wet cycles and the rearward strokes being defined as dry cycles. During the wet cycles, the cleaning solution is applied to the surface via the fluid dispensing nozzles 100 and the agitation brush 206 scrubs the subjacent surface. During the dry cycles, the suction nozzle 34 removes applied solution, as well as dirt and debris, from the surface being cleaned and carries it to the recovery chamber 49 via the working air conduit 704.

The cleaning machine 12 can also be used as a pre-spray applicator and agitator by simply diverting the air from working air conduit 704 to the working air conduit 708, which connects the vacuum source 40 to the accessory hose 22. In this use, the accessory hose 22 functions solely as a bypass aperture for the working air supplied by the vacuum source 40. Thus, fluid is applied via the fluid dispensing nozzles 100 and agitated into the surface being cleaned by the brush 206, but there is no suction at the suction nozzle 34, and thus no dry cycle. When the solution has been adequately applied and the surface adequately agitated, the user can divert suction back to the working air conduit 704, whereupon the applied solution and other debris can be removed from the surface without application of solution, which is controlled by the user through trigger 432.

To use the accessory cleaning tool (not shown), the user diverts working air flow from the conduit 704 to the conduit 708, whereupon the accessory hose 22 is fluidly connected to the vacuum source 40. Furthermore, the user can apply pressurized cleaning fluid to the surface to be cleaned by pressing the grip valve 132 on the accessory cleaning tool. In sum, cleaning solution can be applied by actuating the grip valve 132 and removed via the suction nozzle (not shown) in communication with the vacuum source 40 via the working conduit 708. Also, the accessory tool may further include an agitation brush driven by an impeller that is driven by ambient air drawn through an aperture distinct from the suction nozzle in the accessory tool, but towards the same vacuum source 40.

Once the surfaces have been cleaned, or the recovery chamber 48 has become filled and the float assembly 900 has blocked the air exit 762 from the air/water separator lid 750, power to the cleaning machine 12 is turned off and the tank assembly 50 is removed from the well in the base module 14 and carried by its handle 790, which seals the lid 750 to the tank housing 46, and carried to a point of disposal, such as a sink drain, whereupon the contents of the recovery chamber 48 can be emptied by removing the drain plug 850 from the aperture 854 through wall 852. Once removed, the contents of the recovery chamber 48 flow through the aperture 854. Furthermore, the tank assembly 50 can be rinsed with clean water, which also flows through the aperture 854 in the wall 852 of the tank housing 46.

Figure 23A:
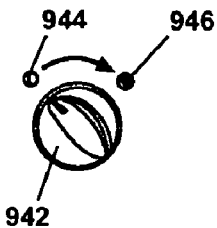
FIG. 23A is a top plan view of a control knob 42 according to the invention.
Figure 23B:
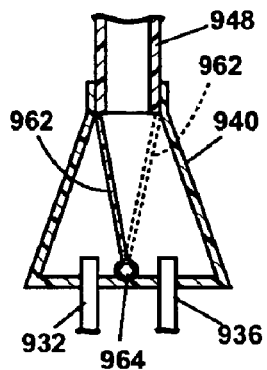
FIG. 23B is an enlarged view of a control valve illustrated in FIG. 23 for controlling the flow of cleaning solution and heated vapor to a surface.
Figure 23:
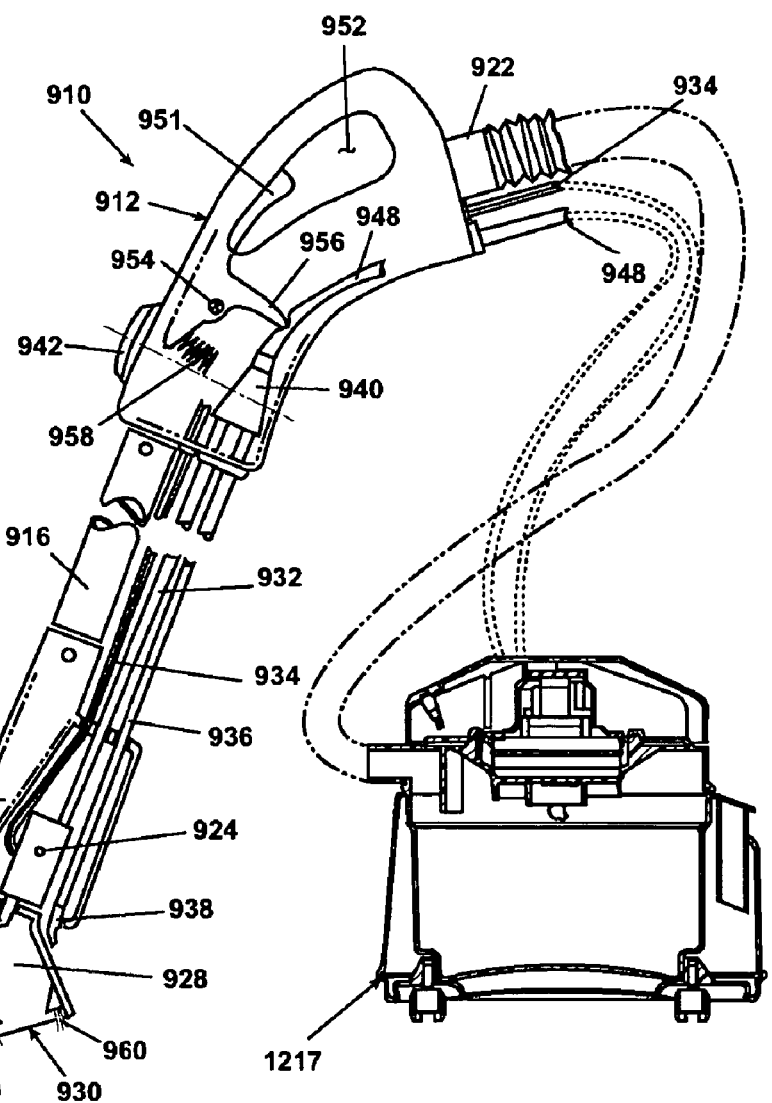
FIG. 23 is a side elevational view of a cleaning wand according to a second embodiment of the present invention with a nozzle assembly shown in partial cross section.

With reference now to FIG. 23, a cleaning wand according to a further embodiment of the invention includes a cleaning module 910 having an upper end that terminates in a handle assembly 912 and a lower end that terminates in a nozzle assembly 914. An extension tube 916 extends between the handle assembly 912 and the nozzle assembly 914. The nozzle assembly 914 includes an inner conduit 918 that extends between and is in fluid communication with a vacuum inlet 921 and the extension tube 916. A working air flow path connected to a vacuum source is provided by a vacuum supply tube 922 attached to the handle assembly 912 and fluidly connected to the extension tube 916, conduit 918 and inlet 921 to provide suction to a surface to be cleaned. Preferably, the vacuum supply tube 922 is connected to a remotely located base module such as a canister-type carpet extraction cleaner 1217 having a motor and impeller for creating the vacuum source as well as a pump for supplying cleaning fluid or water under pressure to the cleaning module 910 and a liquid recovery tank for storing recovered fluid. This type of canister is disclosed in U.S. Pat. No. 5,287,587, and therefore will not be described in further detail.

A heater including a heating element 924 is located within the nozzle assembly 914 and includes a nozzle 926 that projects into a heated vapor (commonly heated vapor) chamber 928. The heated vapor chamber 928 is open at a lower end 930 of the nozzle assembly 914 so that heated vapor projected from the nozzle 926 can be applied to a surface to be cleaned. The heating element 924 is connected to a water tank (not shown) through a water delivery tube 932 and a water supply tube 948. The heating element receives power from the canister through electrical wires 934 and generates heated vapor (steam) from the water in a well known manner. A second water delivery tube 936 is arranged in the nozzle assembly 914 and is adapted to bypass the heating element 924 to thereby supply water directly to the surface to be cleaned. Preferably, a lower end of the second supply tube 936 is connected to a spray nozzle 938 to evenly distribute cleaning fluid over a predefined area of the surface to cleaned. The water tank (not shown) which supplies fluid to the heating element 924 and the spray nozzle 928 can contain a cleaning solution, if desired.

The water delivery tubes 932 and 936 are connected to a selector valve 940 located within the handle assembly 912. A selector control knob 942 (FIG. 23A) is attached to the selector valve 940 and is adjustable between a first normal position 944 for directing the cleaning water from the supply tube 948 to the supply tube 936 and a second heated vapor position 946 for directing cleaning water to the supply tube 932 and into the heating element 924 for producing heated vapor. As illustrated in FIG. 23B, the selector valve 940 comprises a pivotal valve 962 that is pivotally mounted to a pivot pin 964 for movement between a fluid supply position shown in solid lines in FIG. 23B and a heated vapor supply position shown in phantom lines in FIG. 23B or to an in-between position (not shown) for delivery of both fluid and heated vapor to a surface to be cleaned. The selector control valve 942 is directly linked to the pivot pin 964 to move the pivotal valve 962 between the fluid supply position and the heated vapor supply position. An aqueous cleaning solution is preferably supplied to the selector valve 948 under pressure from a fluid pump (not shown) located on the canister. A trigger 951 is accessible by a user in an opening 952 of the handle assembly 912. The trigger 951 is pivotally attached to the handle 912 through a pivot pin 954 and includes a finger 956 that is normally biased against the supply tube 948 by a spring 958. The finger 956 in a closed position pinches the tube 948 closed under biasing force of the spring 958. The biasing force is overcome when a user squeezes the trigger 951 to thereby rotate the finger 956 out of contact with the tube 948 and opens the supply tube 948 so that water can flow to the valve 940.

A pair of brushes 960 are mounted in the heated vapor chamber 928 and project below the lower end 930 of the nozzle assembly 914 to thereby assist in loosening debris from the surface being cleaned.

Figure 24:
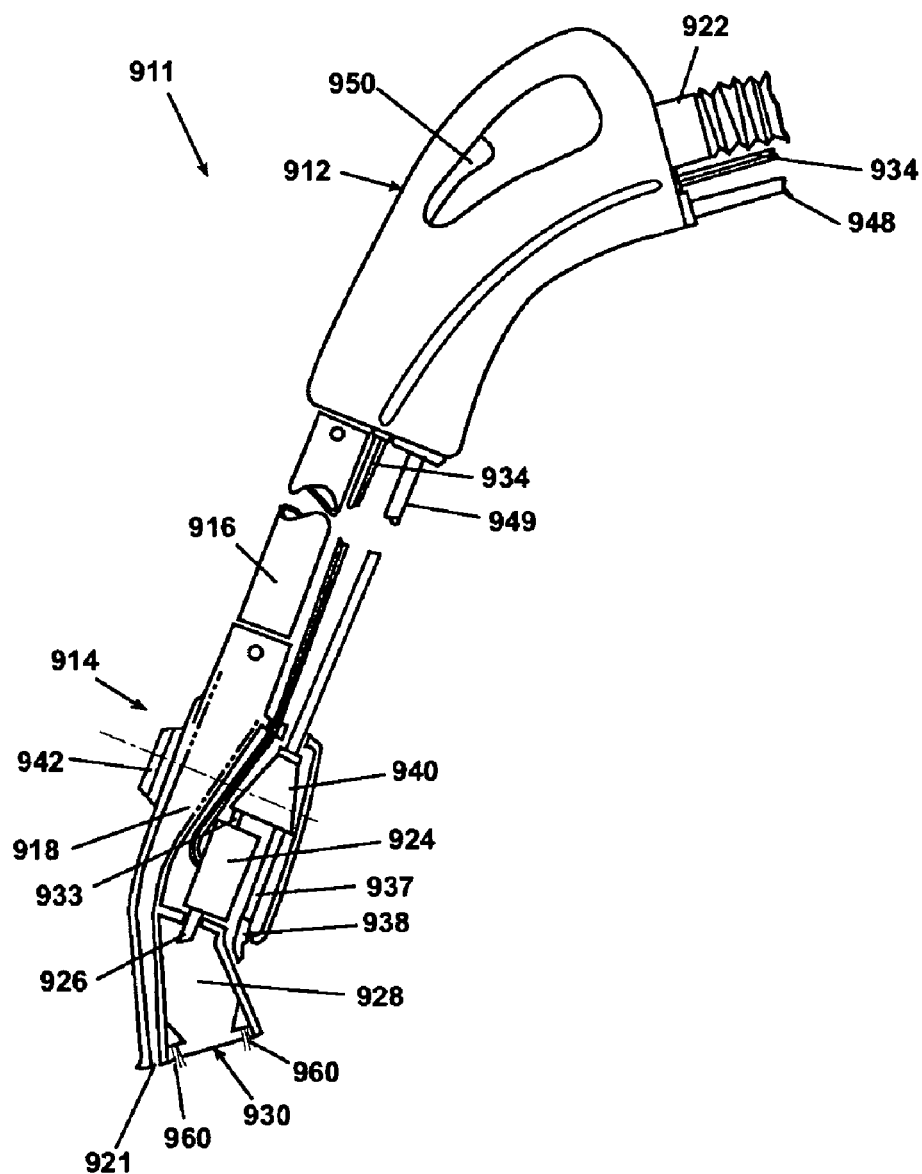
FIG. 24 is a side elevational view of a cleaning wand according to a third embodiment of the invention with a nozzle assembly illustrated in partial cross section.

With reference now to FIG. 24, a further embodiment of the invention is shown wherein like parts in the previous cleaning wand embodiment are represented by like numerals. This embodiment is similar to the previous embodiment with the exception that a cleaning module 911 including a selector valve 940 is positioned within the nozzle assembly 914. A cleaning fluid supply tube 949 is longer than the supply tube 948 in the previous embodiment, while fluid delivery tubes 933, 937 are shorter than the fluid delivery tubes 932, 936, respectively, in the previous embodiment. The selector control knob 942 is also positioned on the nozzle assembly 914 instead of the handle assembly for selecting between normal and heated vapor applications. With this embodiment, the entire heated vapor generating and selector unit can be supplied as a separate accessory independent of the handle assembly 912.

In use, the vacuum hose 922, electrical wires 934 and supply tube 948, 949 are connected to a base module such as a canister-type carpet extraction cleaner. Alternatively, the cleaning wand 910, 911 can form part of a self-contained upright unit having cleaning solution and dirty water tanks, a motor and impeller, liquid pump, etc. In any event, vacuuming can be performed by turning on the motor and impeller to create suction at the vacuum inlet 921 to thereby remove dry or wet debris from the surface being cleaned without applying cleaning solution. When it is desired to apply cleaning solution to the surface, the trigger 951 is squeezed with the selector control knob 942 in the normal position 944. As the trigger is squeezed, liquid in the supply tube 948, 949 passes into the selector valve 940 and through the delivery tube 936, 937 and out of the nozzle 938 onto the surface being cleaned. When it is desired to apply heated vapor to the surface, the selector control knob 942 is rotated to the heated vapor position 946 with or without pulling the trigger 951. Thus, heated vapor can selectively be applied to the surface for heating the surface to be cleaned. Alternatively, the heated vapor can be applied to the surface to clean difficult spots while continuously squeezing the trigger 951. This feature provides a user with an option to alternate between heated vapor and liquid without releasing the trigger 951. When the selector control knob is adjusted to the heated vapor position 946 and the trigger 951 is pulled, cleaning liquid flows through the delivery line 932, 933 and into the heating element 924 in which it is rapidly heated into heated vapor, projected out of nozzle 926, into heated vapor chamber 928, and onto the surface being cleaned. Any liquid on the surface generated either by the heated vapor or the cleaning liquid is collected at the vacuum inlet and deposited in a dirty solution tank (not shown) in the canister or upright.

Alternatively, a continuous delivery of heated vapor can be applied to the surface to pre-heat the surface which, in turn, will heat any cleaning solution that might be applied at a later time to the extent that the cleaning solution is at a lower temperature than the temperature of the carpet or other surface to be cleaned. At the very least, the heated carpet will decrease any heat loss of a heated cleaning solution that is applied to the carpet due to the elevated temperature of the solution as applied to the carpet. In yet another embodiment, the brush can be driven by a motor separate from the vacuum motor 196 and can be separately controlled so that they can be operated independently of the heated vapor generator. Furthermore, the vacuum motor 196 and the brush motor can be shut off, resulting in the application of heated vapor only. Removing the working air generated by the vacuum motor 196 and additional air circulation created by the rotating brush 216 results in higher surface temperatures which enhance cleaning.

Figure 25:
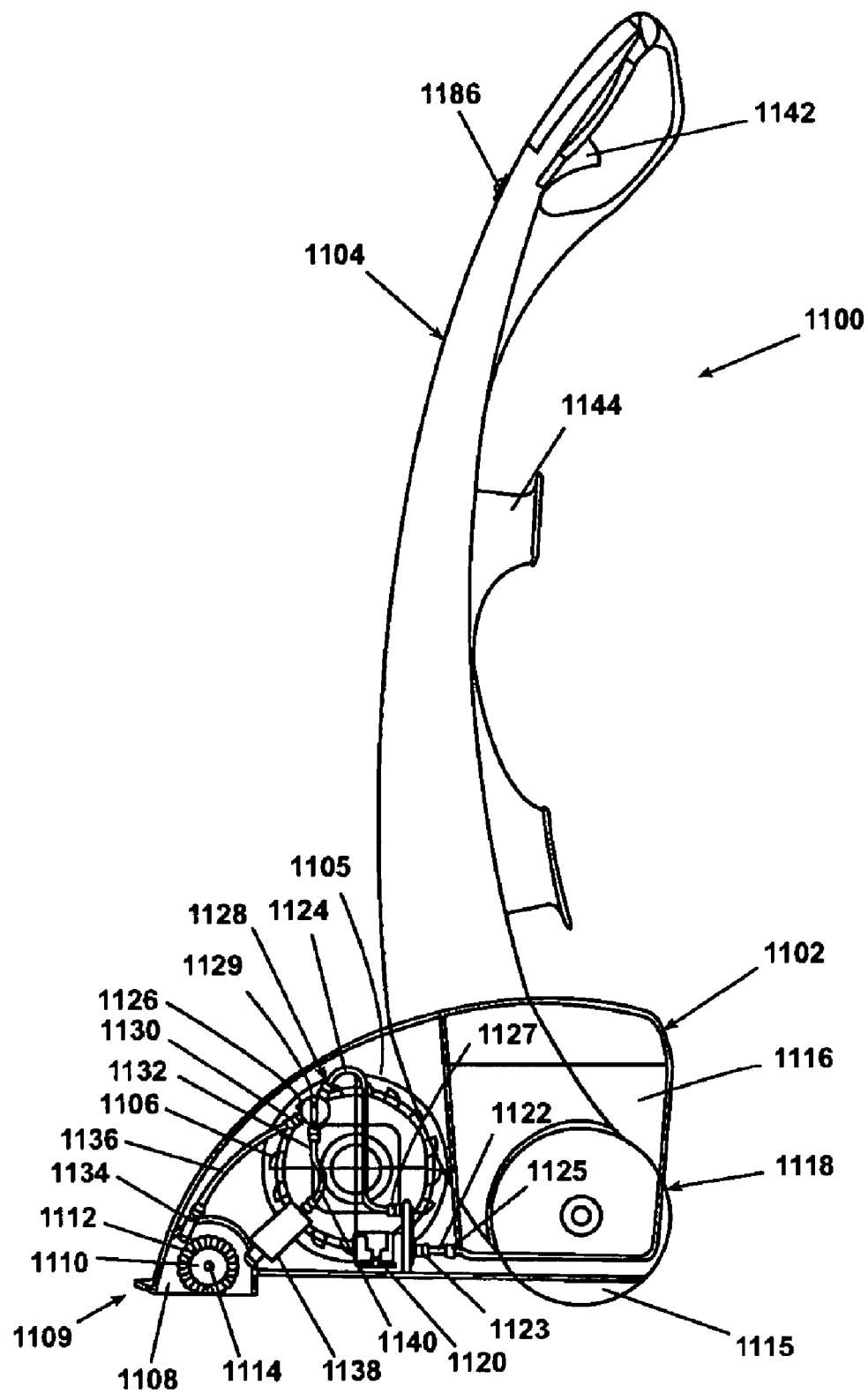
FIG. 25 is a side elevational view of an upright extraction cleaning machine according to a fourth embodiment of the invention.

With reference now to FIG. 25, a floor scrubber 1100 according to another embodiment of the present invention includes a base module 1102 and a handle assembly 1104 pivotally attached to the base module 1102. The base module 1102 includes a vacuum motor 1105 and impeller 1106 attached to a shaft (not shown) of the motor for generating a vacuum source. A nozzle 1108 is located at a forward end 1109 of the base module 1102 and is in fluid communication with the impeller 1106 for connecting the vacuum source with the nozzle 1108. An elongate agitation brush 1110 having radially extending bristles 1112 is connected to the motor shaft through a drive belt (not shown) or other well known arrangement for rotating the agitation brush around its longitudinal axis 1114. The base module 1102 also includes a pair of spaced-apart wheels 115 (only one of which is shown) to facilitate manipulation of the floor scrubber along a surface.

A fluid supply tank 1116 is located at a rearward end 1118 of the base module 1102. A solution pump 1120 is fluidly connected to the fluid supply tank 1116 through a hose 1122 that extends between an inlet port 1123 of the pump 1120 and an outlet port 1125 of the fluid supply tank 1116. The pump 1120 is preferably powered independently of the vacuum motor 1105 through appropriate electrical connections and a pump switch (not shown). Alternatively, the pump 1120 can be powered from the vacuum motor 1105 through a suitable transmission arrangement. A hose 1124 extends between an outlet port 1127 of the pump and an inlet port 1128 of a diverter valve 1126. The diverter valve 1126 includes a manually rotatable switch 1129 that diverts cleaning fluid under pressure from the hose 1124 to one of two outlet ports 1130, 1132. The switch 1129 also includes electrical contacts (not shown) for turning on and off the vacuum motor 1105. The first outlet port 1130 is fluidly connected to a dispensing nozzle 1134 via a hose 1136. The second outlet port 1132 is fluidly connected to a flash vapor generator 1138 via a hose 1140.

The handle assembly 1104 includes a trigger 1142 for selectively activating the fluid pump 1120. An electrical cord holder 1144 is attached to a rearward portion of the handle assembly 1104.

Figure 25A:
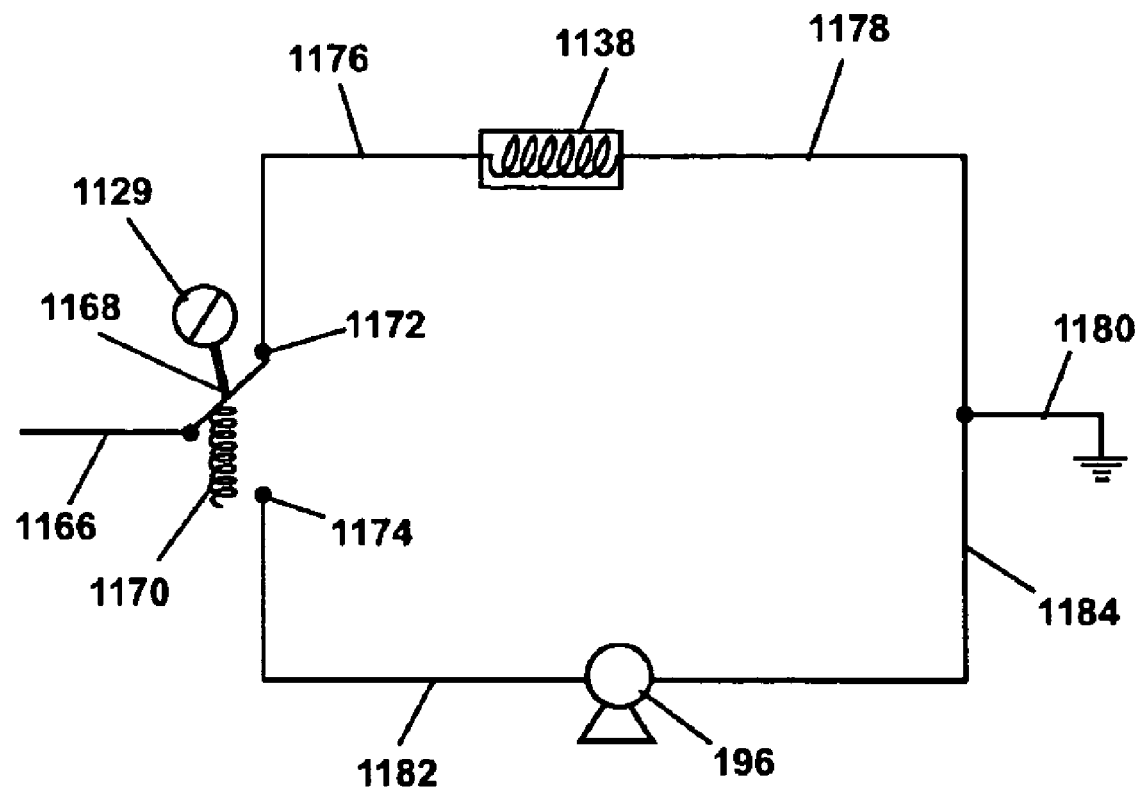
FIG. 25A is a schematic electrical diagram of an electrical circuit for controlling the power alternately to an electrical heater and to a vacuum motor.

Referring to FIG. 25A, an electrical schematic is shown of a control circuit for controlling the electrical energy to the vacuum motor 196 and the heated vapor generator 1138. Electrical energy, typically in the form of 120 volt alternating current, is supplied to the extractor through line 1166 to a switch 1168 that is biased by spring 1170 to a pole 1172 and alternatively can be pushed by switch 1129 to pole 1174. The pole 1172 is connected to the vapor heater 1138 though line 1176. The heated vapor generator is grounded through line 1178 and ground line 1180. Pole 1174 is connected to vacuum motor 196 through line 1182. Vacuum motor 196 is grounded through line 1184 and ground 1180.

In use, fluid under pressure from the fluid supply tank 1116 is diverted to either the dispensing nozzle 1134 or the heated vapor generator 1138 to alternatively apply cleaning fluid or heated vapor to a floor or other surface being cleaned depending on the position of switch 1129. When the switch 1129 is rotated to supply cleaning fluid to the dispensing nozzle 1134, the switch 1129 also turns on the vacuum motor and turns off the heated vapor generator 1138 through a mechanical connection to electrical switch 1168. The agitation brush rotates to loosen particles from the surface, and fluid along with any entrained dirt is then picked up by vacuum force at the nozzle 1108 and diverted to a recovery tank (not shown) in a well-known manner. Conversely, when the switch 1129 is rotated to a second position to supply cleaning fluid to the heated vapor generator 1138, the vacuum motor is automatically turned off through the connection to electrical switch 1168 and the heated vapor generator is simultaneously activated.

Although the switch 1168 is disclosed as controlled by switch 1129 through a mechanical connection, the connection can be electrical. In addition, the switch 1168 can be electrically controlled by a thumb button switch 1186 on the handle assembly 1104 upper portion adjacent to the trigger 1142.

Figure 26:
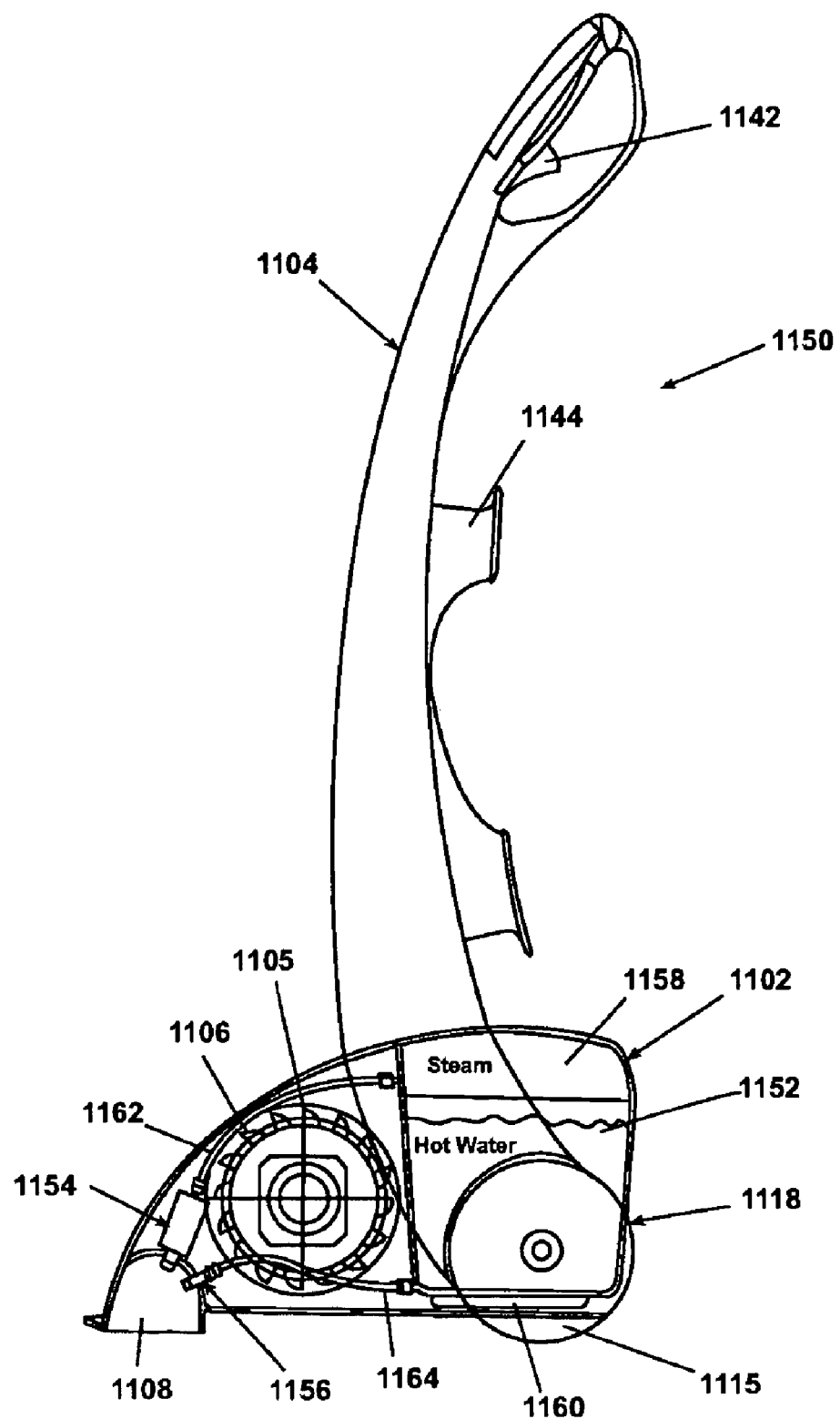
FIG. 26 is a side elevational view of an upright extraction cleaning machine according to a fifth embodiment of the invention.

Referring now to FIG. 26, a floor scrubber 1150 according to another embodiment of the invention is shown, wherein like parts in the previous floor scrubber embodiment are represented by like numerals. The base module 1102 of the floor scrubber 1150 includes a heated vapor pump 1152, a heated vapor nozzle 1154, and a liquid spray nozzle 1156. The heated vapor pump 1152 has a pressure tank 1158 made of stainless steel or other material and a heater 1160. The heated vapor pump 1152 is positioned in the rearward end 1118 of the base module 1102 and the heater 1160 is located adjacent to a lower portion of the tank 1158. The pressure tank 1158 holds cleaning solution or other fluid. A hose 1162 extends from an upper portion of the tank to the heated vapor dispensing nozzle 1154 and a hose 1164 extends from the lower portion of the tank to the liquid dispensing nozzle 1156. A pair of valves (not shown) is preferably located at the upper and lower portions of the tank 1158, but can be located at the heated vapor and spray dispensing nozzles 1152, 1154, to selectively supply heated vapor or hot solution under pressure to the surface to be cleaned.

In operation, the heater 1160 heats the solution within the tank 1158 to approximately 212 degrees F. (boiling point). With the valves closed, heated vapor is generated under pressure to a superheated state. The generated heated vapor applies pressure to the hot solution and forces the solution to the surface to be cleaned when the hot solution valve is opened. Once in equilibrium, the volumetric flow of hot solution is replaced by the same volume of generated heated vapor under the same pressure. The heated vapor thus serves as a hot solution delivery pump to thereby eliminate a mechanical solution delivery pump. With the hot solution valve closed and the heated vapor valve open, heated vapor is supplied under pressure to the surface to be cleaned. During surface cleaning with heated vapor, the vacuum motor can be turned off or can be on. Although not illustrated, an agitation brush, like the agitation brush 1110 shown in FIG. 25, can be provided and operated as the hot solution is applied to the surface.

Figure 27:
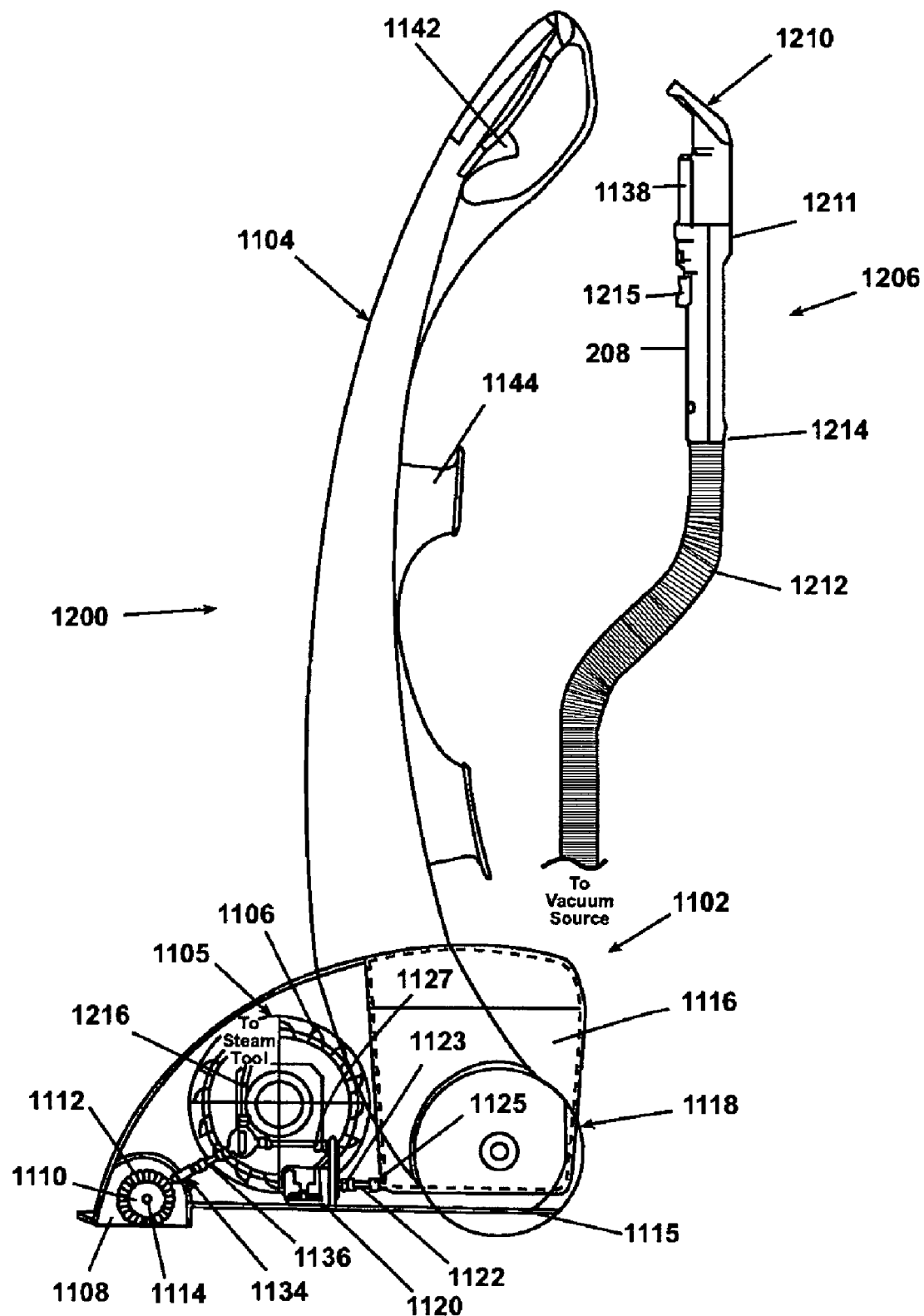
FIG. 27 is a side elevational view of an upright extraction cleaning machine according to a sixth embodiment of the invention.
Figure 28:
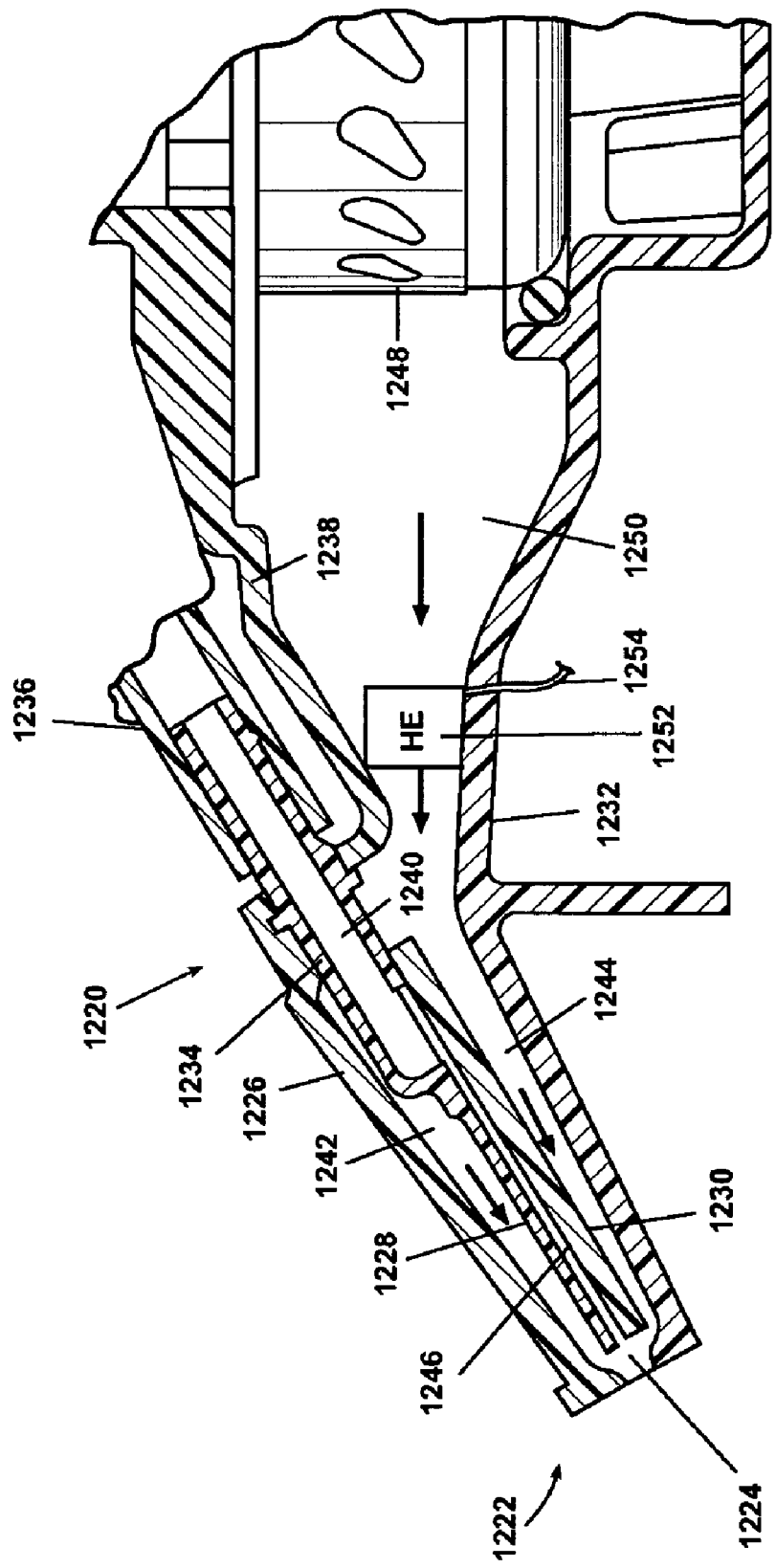
FIG. 28 is a partial sectional view of a liquid delivery nozzle assembly according to a seventh embodiment of the invention.

With reference now to FIG. 27, a floor scrubber 1200 according to yet another embodiment of the invention is illustrated, wherein like parts in the previous floor scrubber embodiments are represented by like numerals. The floor scrubber 1200 is very similar to the floor scrubber 1100 in FIG. 25, with the exception that the heated vapor generator 1138 is removed from the base unit 1102 and positioned in a hand-held hollow wand 1206.

The wand 1206 includes a grip portion 1208 and a nozzle portion 1210 attached to an outer end 1211 of the grip portion. A flexible, corrugated vacuum hose 1212 is attached to an inner end 1214 of the grip portion 1208. The vacuum hose 1212 is fluidly connected to the impeller 1106 for connecting a vacuum source to the nozzle portion 1210. A trigger 1215 in the grip portion 1208 serves to both open a valve and provide electrical power to the heated vapor generator 1138 in the wand when the trigger is pressed.

A supply hose 1216 extends between the diverter valve 1126 and heated vapor generator 1138 to supply solution under pressure to the heater when the pump is activated and the trigger is pressed. If desired, the trigger 1215 may also serve as a switch for activating the pump.

In use, the heated vapor generator and pump are preferably activated with the vacuum motor turned off so that heated vapor can be applied to pre-treat a surface to be cleaned. When the vacuum motor is turned on, the heated vapor generator is preferably turned off. Liquid solution can then be applied either through the wand or through the spray nozzle 1134 and then vacuumed up by the wand or nozzle 1108.

Figure 29:
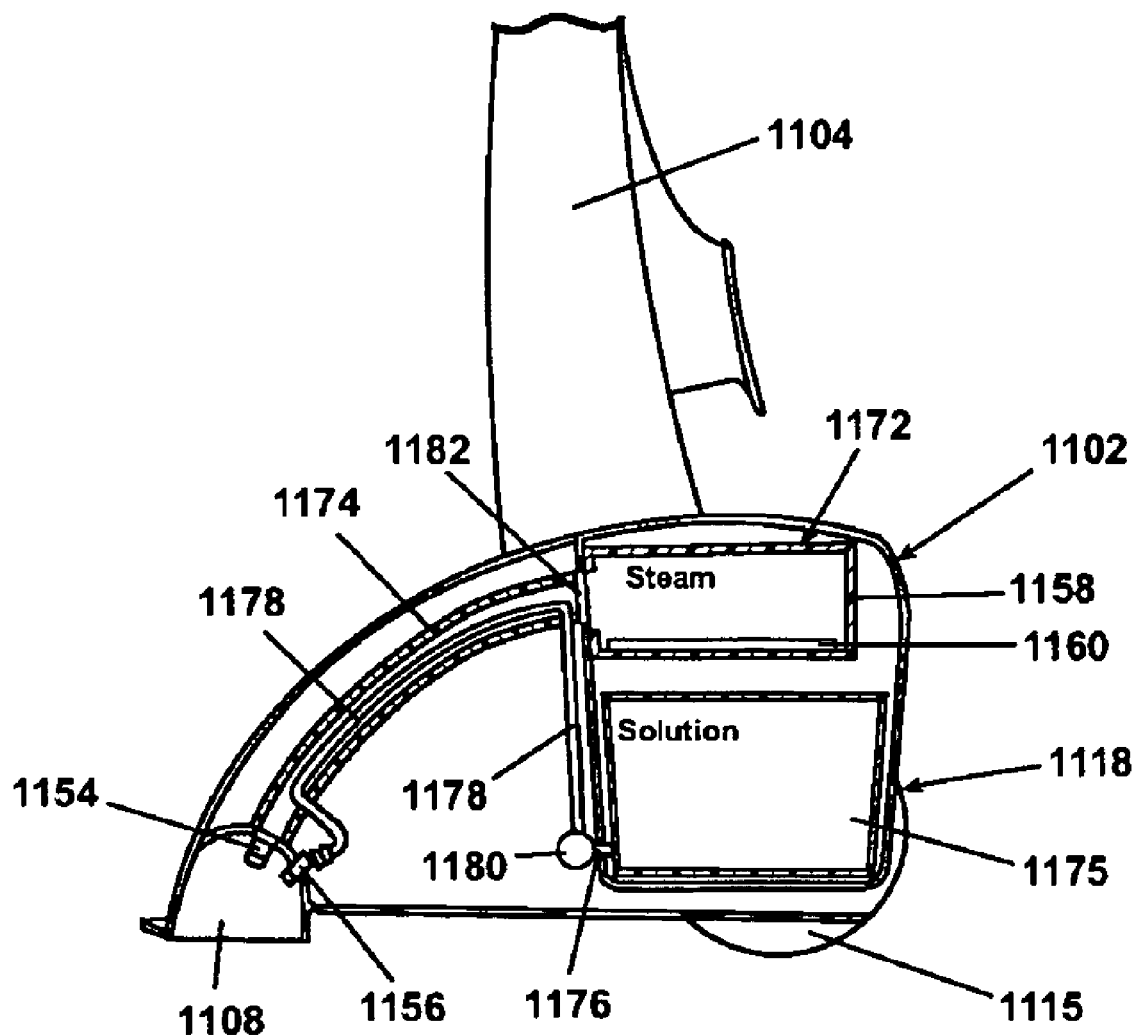
FIG. 29 is a partial sectional view, like FIG. 26, of an upright extraction cleaning machine according to an eighth embodiment of the invention.

Referring now to FIG. 29, a floor scrubber 1170 according to another embodiment of the invention is shown, wherein like parts are used to describe like numerals. The base module 1102 of the floor scrubber 1170 includes a vapor generator 1172, a vapor nozzle 1154 and a vapor conduit 1174. The vapor generator 1172 comprises a vessel 1158 made of stainless steel or other suitable non corrosive materials and a heater element 1160. The heater element 1160 is preferably an electrical heating element but other heating elements can be used in lieu of an electrical heating element. In a preferred embodiment of the invention, water is used in the vapor generator 1172 to generate heated vapor. The vapor generator 1172 is positioned in the rearward end 1118 of the base module 1102. A solution tank 1175 is also mounted at the rearward end 1118 of base module 1102 and has, at a lower end thereof, an outlet 1176 connected to the inlet of a pump 1180. A solution conduit 1176 is connected to the outlet of pump 1180, passes through the vapor conduit 1174 in heat exchange relationship therewith and is connected at another end to a spray nozzle 1156. A valve 1182 is positioned between the inlet to the vapor conduit 1174 and the outlet of the vapor generator 1172. The pump 1180 is connected to a source of electrical power through an electrical circuit (not shown) which includes a switch (not shown) in the handle for controlling the supply of electricity to the pump 1180. Further, the heater 1160 preferably comprises an electrical heating element which is connected in a circuit (not shown) to a switch (not shown) in the handle. A temperature sensor 1184 is mounted within the vapor generator 1172 to detect the temperature of the vapor therein. The temperature sensor 1182 is connected into a control circuit (not shown) within the electrical circuit for the heater element 1160 to open a switch which connects the electrical energy to the heater element 1160 when the temperature within the vapor generator 1172 reaches a predetermined level to prevent overheating of the vapor generator 1172.

The valve 1182 controls the opening between the vapor generator 1172 and the vapor conduit 1174. The valve 1182 can take a number of forms, including a variable valve which is solenoid controlled to adjust the size of the opening in the valve 1182 between the vapor generator 1172 and the vapor conduit 1174. These valves are well known in the art of vapor heating and generation. The valve can be electrically controlled in a circuit (not shown) which has a control knob or switch on the handle 1104. In a preferred embodiment of the invention, water is placed in the vapor generator 1172 and heated vapor is generated in the vapor generator but other liquids can be used in the vapor generator in lieu of water in the vapor generator.

In operation, the electrical heating element 1160 is connected to the supply of power to heat liquid in the vapor generator 1172 to produce heated vapor. The valve 1182 can be closed until such time as the heated vapor reaches a predetermined temperature or pressure at which time it is opened to deliver vapor to the conduit 1174. When the vapor has sufficient pressure, it is sprayed onto the carpet or other surface to be cleaned through the vapor nozzle 1154. The heated vapor released from the vapor nozzle 1154 contacts the surface to be cleaned and heats the surface to be cleaned. Cleaning solution, which can include water or an aqueous detergent solution, fills the solution tank 1175. If it is desired to spray the cleaning solution onto the carpet, a switch is operated for the pump 1180 which begins to pump solution through the conduit 1178 in heat exchange with the vapor conduit 1174 and to the solution spray nozzle 1156. The solution in the solution tank 1175 can be sprayed onto the carpet, with or without heating by heat exchange with the heated vapor and with or without spray of the heated vapor from the vapor spray nozzle 1154. In this case, the solution is heated after being applied to the surface by a heat transfer from the surface caused by the heated vapor. Alternatively, the heated vapor can be sprayed onto the carpet 1154 without spraying the solution from the spray nozzle 1156. The vapor generator and the solution spray can operate independently of each other so that the cleaning solution can be at ambient temperature or above ambient temperature after being heated in heat exchange relationship with the vapor in the vapor conduit 1174. Further, the temperature of the vapor in the conduit 1174 can be controlled by controlling the valve 1182 between the vapor generator 1172 and the vapor conduit 1174.

Figure 30:
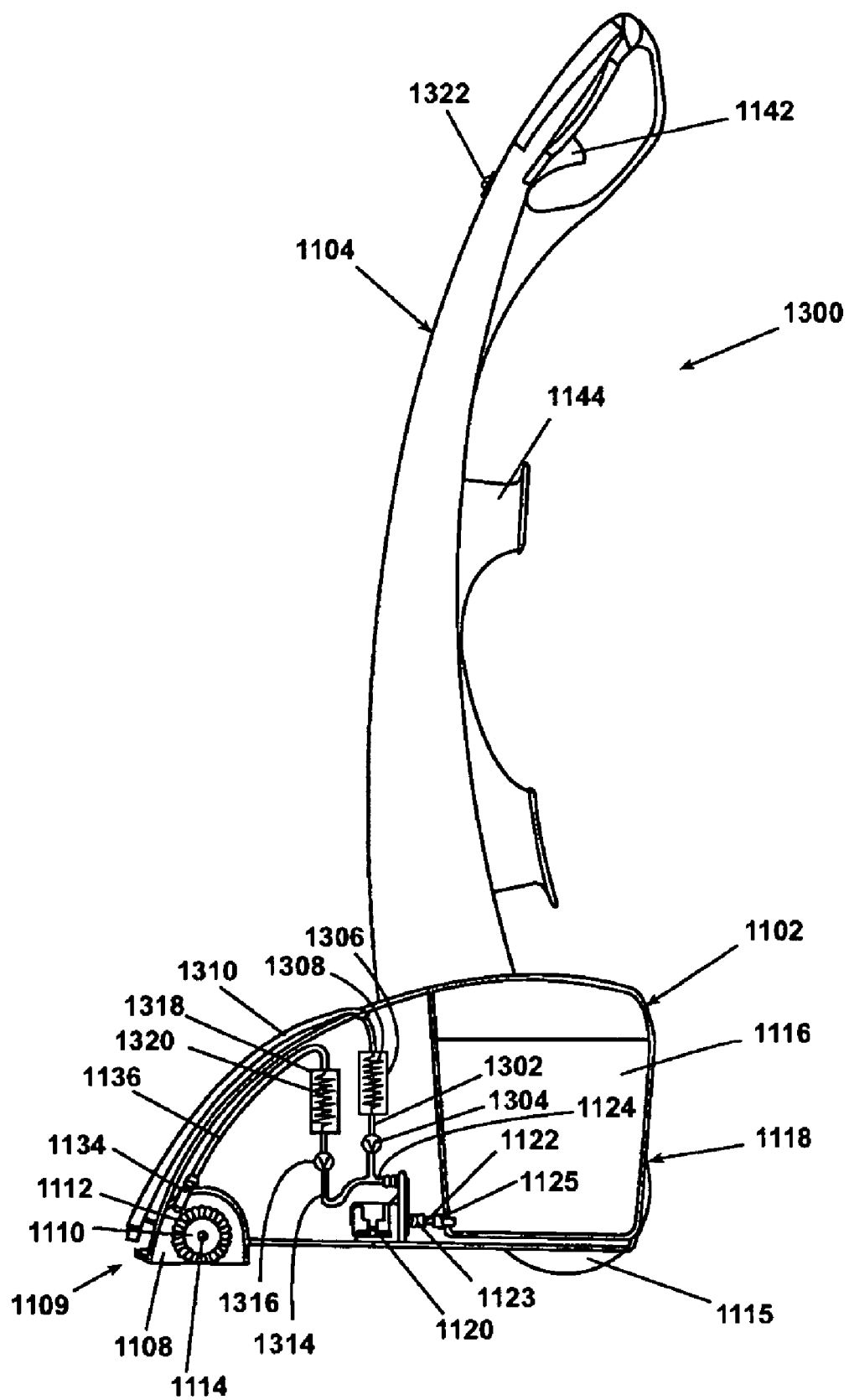
FIG. 30 is a partial sectional view, like 26, of an upright extraction cleaning machine according to a ninth embodiment of the invention.
Figure 31:
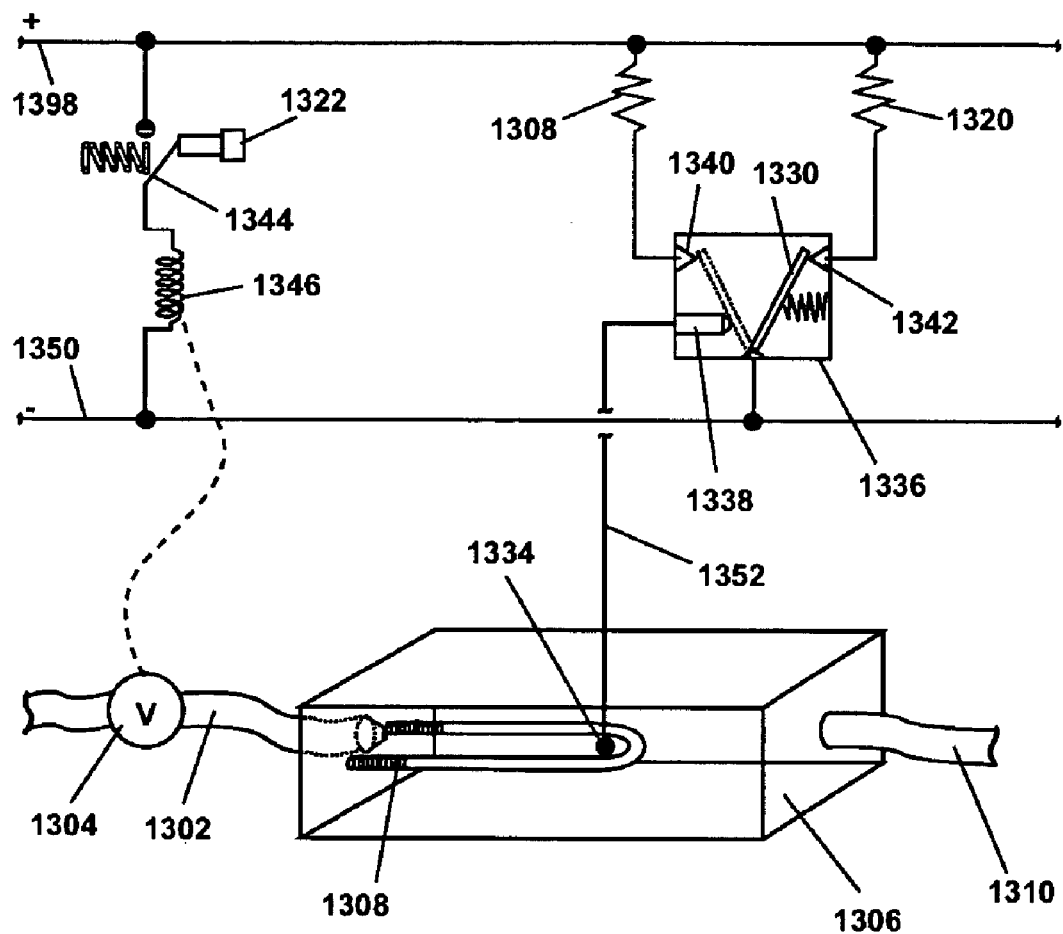
FIG. 31 is a schematic view of an electrical system used in the embodiment of FIG. 30.

Referring now to FIGS. 30 and 31, there is illustrated a ninth embodiment of the invention where like numerals are used to designate like parts. An extraction cleaner 1300 has a base 1102 that is adapted to move along a floor surface to be cleaned. A handle 1104 is pivotally mounted to the base 1102. A solution tank 1116 is mounted to a rear portion 1118 of the base 1102 and has a solution outlet 1122 which is connected to the input 1123 of pump 1120. The output 1127 of pump 1120 is connected to a solution conduit 1124 which splits in a Y to a solution conduit 1302 and a solution conduit 1314. Valves 1304 and 1316, respectively, are positioned in conduits 1302 and 1316 to control the flow of fluids through these conduits. Solution conduit 1302 is connected to a heated vapor generator 1306 that has an electrical heating element 1308 positioned therein. A heated vapor conduit 1310 is connected to an outlet of the heated vapor generator 1306 and extends along the front face of the base, terminating in a nozzle 1312 adjacent to the surface to be cleaned. The heated vapor conduit 1310 is positioned on the front of the base 1102 so that the operator can coordinate the heated vapor nozzle 1312 with spots on the floor that need particular cleaning.

A heated vapor button 1322 is positioned on the handle adjacent to a trigger 1142 for convenient operation with the thumb of a user. The button 1322 is spring biased to an outward position so that the button springs back when pressure is released on it.

As illustrated in FIG. 31, the button 1322 is connected to a switch 1344 in an electrical system that includes power lines 1348 and 1350. The switch 1344 is connected in series with a solenoid coil 1346 which operates the opening and closing of the valve 1304. Thus, depression of the heated vapor valve button 1322 against the spring of the valve 1344 closes the electrical circuit between lines 1348 and 1350 through coil 1346 to open valve 1304. Solution then flows through the valve 1304 to the heated vapor generator 1306 wherein it is vaporized with the heater element 1308 and is dispensed through the conduit 1312.

A thermal sensor 1334 is mounted in the heated vapor generator 1306 adjacent to the heating element 1308. This thermal sensor 1334 is connected through an electrical line 1352 to an induction coil 1338 in a power relay 1336. The power relay 1336 has pivotal switch element 1330 that pivots between electrical contacts 1340 and 1342. Thermal switch 1334 is set at a predetermined temperature to move the switch element 1330 from contact 1342 to contact 1340, thereby resulting in current flow between power line 1348 through electrical heating element 1308 to power line 1350. When the temperature rises to a second predetermined level in the heated vapor generator 1306, then the coil 1338 releases the switch element 1330 to move to contact 1342, thereby resulting in current flow between power line 1348 and 1350 through the electrical heating element 1320. Thus, thermal switch 1334 controls the temperature in the heated vapor generator 1306 between predetermined points, preferably around 220° Fahrenheit. For example, the switch can open at 225° F. and close at 215° F. degrees.

In operation, the trigger 1142 operates the flow of solution through the pump 1120. Cleaning solution can flow continuously or intermittently through the solution heater 1318 and dispense heated cleaning fluid onto the surface to be cleaned through the spray nozzle 1134. When it is desirable to clean a spot on the floor that is particularly soiled, the user presses the thumb button 1322 to open the valve 1304 and generates heated vapor within the heated vapor generator 1306. Heated vapor will be dispensed through the heated vapor nozzle 1312 onto the floor surface in full view of the operator who is able to control the amount of heated vapor as well as the location of the heated vapor on the surface to be cleaned.

Figure 32:
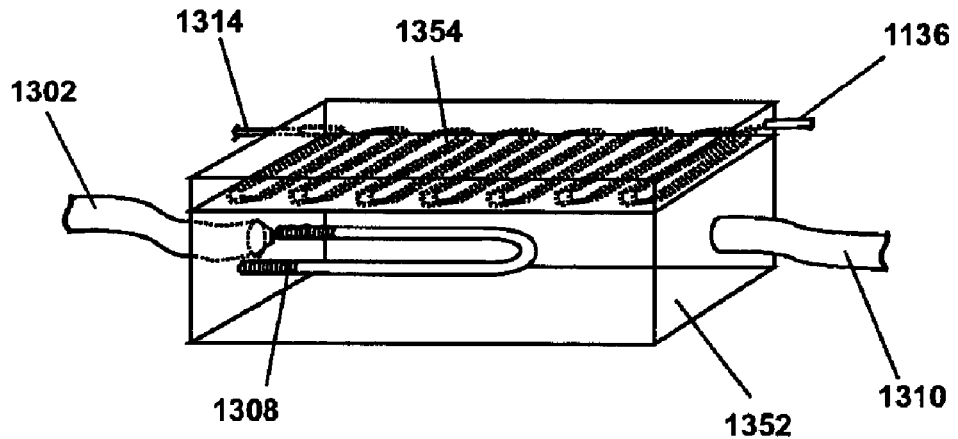
FIG. 32 is a schematic view of an alternative combined heated vapor generator and solution heater in accordance with the embodiment of FIGS. 30 and 31.

Referring now to FIG. 32, there is shown in an alternate embodiment of a heated vapor generator and a solution heater, which are combined into a single alternate heated vapor generator 1352. In this drawing, like numbers have been used to designate like parts. The elements of heated vapor generator 1306 are essentially the same as in the embodiment of FIG. 32 but the solution conduit 1314 has a heat exchange coil 1354 that extends through the alternate heated vapor generator 1352. Cleaning solution within the coil 1354 is heated by radiant energy from the electrical heating element 1308 and, in addition, by conduction through heated vapor which is generated from time to time in alternate heated vapor generator 1352.

Preferably, the heat exchange conduit 1354 is wound around the electrical heating element 1308 or it can coiled directly above the heating element 1308. In any case, the cleaning solution sprayed into the heated vapor generator 1306 is vaporized by the electrical heating element 1308 to generate heated vapor as described in the embodiment of FIGS. 30 and 31.

While particular embodiments of the invention have been shown, the invention is not limited thereto since modifications may be made by those skilled in the art, particularly in light of the foregoing teachings. Reasonable variation and modification are possible within the scope of the foregoing disclosure of the invention without departing from the spirit of the invention which is defined in the appended claims.

The invention claimed is:

1. A unitary portable surface cleaning apparatus, comprising:
    a fluid dispensing system including at least one fluid supply tank, a liquid dispenser connected to the fluid supply tank for applying a liquid cleaning fluid to a surface to be cleaned;
    a fluid recovery tank for holding recovered fluid;
    a suction nozzle;
    a working air conduit extending between the recovery tank and the suction nozzle; and
    a vacuum source in fluid communication with the recovery tank and the suction nozzle for generating a flow of working air from the suction nozzle through the working air conduit and to the recovery tank to thereby recover fluid from the surface to be cleaned through the suction nozzle and working air conduit and into the recovery tank;
    the improvement which comprises:
        a vapor generator connected to a source of liquid and to a vapor dispenser for dispensing a heated vapor to the surface to be cleaned.

2. A portable surface cleaning apparatus according to claim 1 wherein the vapor generator is associated with the fluid dispensing system and is adapted to heat at least a portion of the cleaning fluid above its boiling point to form the heated vapor in the vapor generator.

3. A portable surface cleaning apparatus according to claim 2 and further comprising a control element associated with the vapor generator for selectively controlling the delivery of heated vapor to the surface to be cleaned.

4. A portable surface cleaning apparatus according to claim 3 wherein the control element includes a valve having an inlet connected to the at least one fluid supply tank and a pair of outlets, one of the outlets is connected to the vapor generator and the other of the outlets is connected to the liquid dispenser, the valve is adapted to selectively control the flow of cleaning fluid from the at least one fluid supply tank to the vapor generator and to the liquid dispenser.

5. A portable surface cleaning apparatus according to claim 4 and further comprising a canister and wherein the at least one fluid supply tank, the recovery tank and the vacuum source are mounted in the canister; and the working air conduit comprises a wand and a hose that are connected to the vacuum source.

6. A portable surface cleaning apparatus according to claim 5 wherein the valve is mounted on the wand.

7. A portable surface cleaning apparatus according to claim 6 wherein the wand has a handle and the valve is mounted on the handle.

8. A portable surface cleaning apparatus according to claim 7 wherein the control element further includes a control knob that is mounted to the handle and is connected to the valve.

9. A portable surface cleaning apparatus according to claim 8 and further comprising a fluid control valve for selectively controlling the flow of cleaning fluid to the valve inlet.

10. A portable surface cleaning apparatus according to claim 9 and further comprising a trigger pivotally mounted on the handle and connected to the fluid control valve for selective operation thereof.

11. A portable surface cleaning apparatus according to claim 6 wherein the valve is mounted to a lower portion of the wand.

12. A portable surface cleaning apparatus according to claim 11 and further comprising a control knob mounted to a lower portion of the wand and connected to the valve for control thereof.

13. A portable surface cleaning apparatus according to claim 2 wherein the vapor generator includes an electrical heating element.

14. A portable surface cleaning apparatus according to claim 13 wherein the vapor generator and the vacuum source are connected to a common electrical input and are adapted to be powered by a common power source.

15. A portable surface cleaning apparatus according to claim 14 wherein the power source is a standard 120 volt line.

16. A portable surface cleaning apparatus according to claim 2 and further comprising a base that is adapted to move across a surface to be cleaned and a handle pivotally mounted to the base for manipulating the base across the surface to be cleaned, and wherein the fluid dispensing system, the recovery tank, the fluid dispenser, the suction nozzle, the vacuum source and the vapor generator are mounted individually to one of the handle and the base.

17. A portable surface cleaning apparatus according to claim 16 wherein the valve, the liquid dispenser and the vapor dispenser are mounted on the base.

18. A portable surface cleaning apparatus according to claim 17 and further comprising a pump between the at least one fluid supply tank and the valve inlet.

19. A portable surface cleaning apparatus according to claim 1 and further comprising a heater associated with the fluid dispensing system for heating at least a portion of the cleaning fluid before it is applied to the surface to be cleaned.

20. A portable surface cleaning apparatus according to claim 19 and further comprising a base that is adapted to move across a surface to be cleaned and a handle pivotally mounted to the base for manipulating the base across the surface to be cleaned, and wherein the fluid dispensing system, the recovery tank, the fluid dispenser, the suction nozzle, the vacuum source, the vapor generator and the heater are mounted individually to one of the handle and the base.

21. A portable surface cleaning apparatus according to claim 20 wherein the valve, the liquid dispenser and the vapor dispenser are mounted on the base.

22. A portable surface cleaning apparatus according to claim 21 wherein the heater is associated with the at least one fluid supply tank and the vapor generator is in the at least one fluid supply tank, whereby the vapor generated in the at least one fluid supply tank forms a vapor pump for dispensing heated liquid from the fluid supply tank to the liquid dispenser.

23. A portable surface cleaning apparatus according to claim 22 wherein the fluid dispensing system further includes a control element associated with the vapor generator for selectively controlling the delivery of heated vapor to the surface to be cleaned.

24. A portable surface cleaning apparatus according to claim 23 wherein the vapor is aqueous.

25. A portable surface cleaning apparatus according to claim 19 wherein the heater is an electrical heating element.

26. A portable surface cleaning apparatus according to claim 19 wherein the heater, the vapor generator and the vacuum source are connected to a common electrical input and are adapted to be powered by a common power source.

27. A portable surface cleaning apparatus according to claim 26 wherein the power source is a standard 120 volt line.

28. A portable surface cleaning apparatus according to claim 1 and further comprising a base that is adapted to move across a surface to be cleaned and a handle pivotally mounted to the base for manipulating the base across the surface to be cleaned, and wherein the fluid dispensing system, the recovery tank, the fluid dispenser, the suction nozzle and the vacuum source are individually mounted to one of the handle and the base; and wherein an above floor hose is attached at one end to the base, a wand is mounted to another end of the hose, and the vapor generator is mounted to the wand for pre-treating the surface to be cleaned with the heated vapor.

29. A portable surface cleaning apparatus according to claim 28 and further comprising a heater associated with the fluid dispensing system for heating at least a portion of the cleaning fluid before it is applied to the surface to be cleaned.

30. A portable surface cleaning apparatus according to claim 1 wherein the fluid dispensing system includes a valve having an inlet connected to the at least one fluid supply tank and having a first outlet connected to the vapor generator and a second outlet connected to the liquid dispenser, whereby the valve can selectively direct cleaning fluid to the vapor generator, to the liquid dispenser, or to a combination thereof for application to the surface to be cleaned.

31. A portable surface cleaning apparatus according to claim 1 wherein the fluid dispensing system further comprises a pump to deliver the cleaning fluid to the surface to be cleaned at the predetermined rate.

32. A portable surface cleaning apparatus according to claim 1 wherein the fluid dispensing system further includes a control element associated with the vapor generator for selectively controlling the delivery of heated vapor to the surface to be cleaned.

33. A portable surface cleaning apparatus according to claim 1 wherein the vapor is aqueous.

34. A portable surface cleaning apparatus according to claim 1 wherein a vapor conduit is provided between the vapor generator and the vapor dispenser, and the fluid dispensing system includes a fluid conduit between the at least one fluid supply tank and the fluid dispenser, and the fluid conduit passes through the vapor conduit in heat exchange relationship therewith for heating the cleaning fluid in the fluid conduit.

35. A portable surface cleaning apparatus according to claim 34 and further comprising a controllable valve between the vapor generator and the vapor conduit for controlling the temperature of the cleaning fluid in heat exchange with the vapor conduit.

36. A portable surface cleaning apparatus according to claim 1 and further comprising a base that is adapted to move across a surface to be cleaned and a handle pivotally mounted to the base for manipulating the base across the surface to be cleaned, and wherein the fluid dispensing system, the recovery tank, the fluid dispenser, the suction nozzle, the vacuum source and the vapor generator are mounted individually to one of the handle and the base.

37. A unitary portable surface cleaning apparatus, comprising:

a fluid dispensing system including at least one fluid supply tank, a liquid dispensing nozzle connected to the fluid supply tank through a fluid supply conduit for applying a cleaning fluid to a surface to be cleaned at a predetermined rate;

a fluid recovery tank for holding recovered fluid;

a suction nozzle;

a working air conduit extending between the recovery tank and the suction nozzle;

a vacuum source in fluid communication with the recovery tank for generating a flow of working air from the suction nozzle through the working air conduit and to the recovery tank to thereby recover fluid from the surface to be cleaned through the suction nozzle and working air conduit and into the recovery tank; and at least one heater associated with the fluid dispensing system for heating at least a portion of the cleaning fluid before it is applied to the surface to be cleaned; and the improvement which comprises:

the at least one heater is adapted to heat a first portion of the cleaning fluid to a temperature below the boiling point and to heat a second portion of the cleaning fluid to a temperature above the vaporization temperature of the cleaning fluid;

a vapor dispenser connected to the at least one heater to dispense vaporized cleaning fluid to the surface to be cleaned; and a mechanism to selectively deliver at least one of vaporized cleaning fluid and heated liquid cleaning fluid to the surface to be cleaned.

38. A unitary portable surface cleaning apparatus according to claim 37 wherein the mechanism includes a valve.

\* \* \* \* \*